US 11,762,517 B2

(12) United States Patent
Watazu et al.

(10) Patent No.: US 11,762,517 B2
(45) Date of Patent: Sep. 19, 2023

(54) TOUCH PANEL

(71) Applicant: NISSHA CO., LTD., Kyoto (JP)

(72) Inventors: Yuji Watazu, Kyoto (JP); Takashi Yokoyama, Kyoto (JP); Yuichiro Yonemura, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 140 days.

(21) Appl. No.: 17/596,190

(22) PCT Filed: Jun. 10, 2020

(86) PCT No.: PCT/JP2020/022805
§ 371 (c)(1),
(2) Date: Dec. 3, 2021

(87) PCT Pub. No.: WO2020/255816
PCT Pub. Date: Dec. 24, 2020

(65) Prior Publication Data
US 2022/0236832 A1    Jul. 28, 2022

(30) Foreign Application Priority Data

Jun. 19, 2019   (JP) .................. 2019-113963
Jun. 2, 2020    (JP) .................. 2020-096131
Jun. 5, 2020    (JP) .................. 2020-098638

(51) Int. Cl.
G06F 3/044     (2006.01)
G06F 3/041     (2006.01)
G06F 3/045     (2006.01)

(52) U.S. Cl.
CPC ............ G06F 3/0446 (2019.05); G06F 3/045 (2013.01); G06F 3/04144 (2019.05); *G06F 2203/04112* (2013.01)

(58) Field of Classification Search
CPC .... G06F 3/0446; G06F 3/04144; G06F 3/045; G06F 2203/04112; G06F 3/0418; G06F 3/04166; G06F 3/044; G06F 3/04164
See application file for complete search history.

(56) References Cited

U.S. PATENT DOCUMENTS 5,915,285 A      6/1999  Sommer
2016/0342257 A1* 11/2016 Watazu .................. G01L 1/146
2019/0317641 A1* 10/2019 Maruyama ............ G06F 3/0446

FOREIGN PATENT DOCUMENTS

EP      2685358 A1      1/2014
JP      H05061592 A     3/1993
(Continued)

OTHER PUBLICATIONS https://unacademy.com/content/jee/difference-between/ntp-and-stp/ (Year: 2023).*

*Primary Examiner* — Patrick N Edouard
*Assistant Examiner* — Joseph P Fox
(74) *Attorney, Agent, or Firm* — Alleman Hall Creasman & Tuttle LLP

(57) ABSTRACT

A touch panel includes: first electrodes disposed in parallel at a position corresponding to a viewing area of a panel member and have a capacitance changing according to a proximity of an object to be detected; second electrodes that intersect with the first electrodes, are disposed in parallel, and similarly change in capacitance; third electrodes disposed in parallel between the first or second electrodes and have electrical resistances changing according to posture and temperature; and fourth electrodes extending along the respective third electrodes and similarly change in electrical resistance. A resistance change rate of the fourth electrodes due to temperature is the same as for the third electrodes. The resistance change rate of the fourth electrodes due to the posture change is 90% or less than for the third electrodes (Continued)

due to the posture change. This allows a pressing force to be accurately measured.

19 Claims, 37 Drawing Sheets

(56) References Cited

FOREIGN PATENT DOCUMENTS

| | | |
|---|---|---|
| JP | 2015041160 A | 3/2015 |
| JP | 2015170178 A | 9/2015 |
| WO | 2018043588 A1 | 3/2018 |

* cited by examiner

TOUCH PANEL

TECHNICAL FIELD

The present invention relates to a touch panel (a touch panel with pressure sensitive function) that can detect a pressing force, in addition to a pressed position on an operating surface when a user touches the operating surface with, for example, a finger and a stylus.

BACKGROUND ART

As the touch panel described above, a device described in Patent Document 1 has been known. The device of Patent Document 1 includes a touch panel having a configuration in which a pair of polyester film substrates including electrodes formed in a stripe shape are disposed opposed to one another via a dot-shaped spacer (see FIG. 2 of Patent Document 1). The touch panel having flexibility is overlapped and disposed so as to be in close contact with a planar pressure sensitive sensor (see FIG. 1 of Patent Document 1).

In the device of Patent Document 1, when a user touches an operating surface of the touch panel with, for example, a finger, the electrodes located at the touch panel portion are brought into contact with one another and become electrically conducted. By the use of this, the intersection point position of the electrodes is detected as a pressed position on the operating surface. Then, since the touch panel having the flexibility partially deforms only at the pressed position and presses the pressure sensitive sensor, a pressing force on the operating surface is detected according to an output value from the pressure sensitive sensor. This allows simultaneously inputting position information and pressing force information on the operating surface.

However, in the device of Patent Document 1, the touch panel for detecting the pressed position on the operating surface and the pressure sensitive sensor for detecting the pressing force on the operating surface are configured as different components, and further the touch panel and the pressure sensitive sensor 1 are layered in series in a thickness direction. As a result, there is a problem in which the thickness of the entire device is large.

Therefore, a thin touch panel having a pressure sensitive function has been proposed (Patent Document 2). The touch panel of Patent Document 2 includes an elastically deformable panel member, first electrodes that are disposed to be arranged in an X-axis direction and have a self-capacitance or a relative capacitance changing according to proximity/separation of an object to be detected, second electrodes that are disposed to be arranged in a Y-axis direction and have a self-capacitance or a relative capacitance changing according to the proximity/separation of the object to be detected, and third electrodes that are disposed between the first electrodes or between the second electrodes and have an electrical resistance changing according to a posture change (see FIG. 3 of Patent Document 2).

According to the configuration of Patent Document 2, the third electrodes for detecting a pressing force on an operating surface are disposed between any of the first electrodes and the second electrodes for detecting a pressed position on the operating surface. In other words, by effectively using regions between the first electrodes adjacent to one another in the X-axis direction, or regions between the second electrodes adjacent to one another in the Y-axis direction, the third electrodes are disposed in the same shape as any of the first electrodes and the second electrodes. Thus, even in a case where the third electrodes are added to provide a pressure sensitive function to a capacitive touch panel including the first electrodes and the second electrodes, the thickness of the entire device does not increase.

CITATION LIST

Patent Literature

Patent Document 1: JP5-61592A
Patent Document 2: JP2015-041160A

SUMMARY OF INVENTION

Technical Problem

However, in the touch panel of Patent Document 2, when a temperature changes, the electrical resistance of the third electrodes 42 for detecting the pressing force on the operating surface also changes due to this temperature change. Therefore, even when the pressing not accompanied by the posture change of the third electrodes 42 occurs, the pressing force is detected, thus leading to a problem in which accurate pressing cannot be detected.

The temperature change is caused by transmission of heat of a finger when the finger contacts the operating surface to the third electrodes 42.

An object of the present invention is to solve a problem in a resistance change caused by a temperature change in a touch panel with pressure sensitive function to ensure accurate measurement of a pressing force.

Solution to Problem

Some aspects will be described below as means to solve the problems. These aspects can be combined arbitrarily as necessary.

A touch panel according to one aspect of the present invention includes a panel member, first electrodes, second electrodes, third electrodes, and fourth electrodes.

The elastically deformable panel member has an operating surface.

The plurality of first electrodes are disposed in parallel to one another to be arranged at predetermined intervals in a first direction (for example, an X-axis direction) on a side opposite to the operating surface of the panel member. The plurality of first electrodes have a self-capacitance or a mutual capacitance changing according to a proximity or separation of an object to be detected.

The second electrodes are opposed to the plurality of first electrodes and disposed in parallel to one another to be arranged at predetermined intervals in a second direction (for example, the Y-axis direction) intersecting with the first direction. The second electrodes have a self-capacitance or a mutual capacitance changing according to the proximity or separation of the object to be detected.

The third electrodes are disposed in parallel to one another to be arranged in the first direction between the plurality of first electrodes, or disposed in parallel to one another to be arranged in the second direction between a plurality of the second electrodes. The third electrodes have electrical resistances changing according to a posture change and a temperature change.

The fourth electrodes are disposed so as to extend along the plurality of respective third electrodes. The fourth electrodes have electrical resistances changing according to the posture change and the temperature change.

A resistance change rate of each fourth electrode due to the temperature change is the same as a resistance change rate of each third electrode due to the temperature change.

The resistance change rate of the fourth electrode due to the posture change is 90% or less of the resistance change rate of the third electrode due to the posture change during the posture change at a normal temperature.

In the present application, the "self-capacitance" of the first electrode and the second electrode represents the capacitance (the self-capacitance) of each electrode alone. The "mutual capacitance" represents the capacitance (the mutual capacitance) between the first electrode and the second electrode.

According to this characteristic configuration, a position (referred to as a "touch position") of, for example, a finger of a user that contacts or is in proximity to the operating surface of the panel member can be determined similarly to the conventional capacitive touch panel. In other words, the touch position on an X-Y coordinate system on the operating surface can be appropriately determined based on a change in the self-capacitance of each of the first electrodes and the second electrodes or a change in the mutual capacitance between the first electrode and the second electrode.

When the user touches the operating surface of the panel member with, for example, the finger, the panel member elastically deforms, and in accordance with the deformation, one or more of the third electrodes and the fourth electrodes also deform. At this time, the electrical resistances of the third electrode and the fourth electrode change according to the deformation (the posture change), and the electrical resistances also change according to the temperature change at the same time.

However, the resistance change rate of the fourth electrode due to the temperature change is the same as the resistance change rate of the third electrode due to the temperature change, and the resistance change rate of the fourth electrode due to the posture change is 90% or less of the resistance change rate of the third electrode due to the posture change during the posture change at the normal temperature. Therefore, a detection result including the change in the electrical resistance of the third electrode caused by the temperature change can be corrected (temperature compensation). That is, the change in the electrical resistance of the third electrode and the change in the electrical resistance of the fourth electrode disposed so as to extend along each of the third electrodes are detected. By obtaining a difference between the resistance change rate of the third electrode and the resistance change rate of the fourth electrode positioned near the third electrode and having the resistance change rate smaller than the resistance change rate of the third electrode during pressing, a magnitude of a pressing force on the operating surface can be appropriately determined according to the difference.

By identifying the third electrode in which the resistance change is detected, the pressing force at each pressed position in the X-axis direction or the Y-axis direction on the operating surface can be determined.

Preferred aspects of the present invention will be described below.

In one aspect, it is preferred that the third electrodes and the fourth electrodes have the following patterns.

Namely, a pattern of the third electrodes is a linear pattern.

On the other hand, a pattern of the fourth electrodes is a pattern in which a resistance line constituting the fourth electrode is folded back in a zigzag shape in plan view. The pattern of the fourth electrodes includes a plurality of overlapping portions formed in parallel to one another. An arrangement direction of the plurality of overlapping portions matches an extension direction of the fourth electrodes.

According to this configuration, in the plurality of overlapping portions perpendicular to the extension direction of the fourth electrodes, the electrical resistance does not change according to the posture change in the fourth electrodes, and the electrical resistance changes according to the posture change only in folded-back portions, which connect the overlapping portions. Thus, even when the third electrode and the fourth electrode are the same material, the resistance change rate of the fourth electrode detected becomes smaller than the resistance change rate of the third electrode in the linear pattern during pressing. In other words, only the difference in pattern can cause the difference between the resistance change rate of the third electrode and the resistance change rate of the fourth electrode during pressing.

Note that since the third electrodes have the widths in the direction orthogonal to the extension direction that are not as wide as those of the fourth electrodes, the second electrodes, the third electrodes, and the fourth electrodes can be arranged closely. As a result, the detection accuracy of the pressed position and the pressing force can be increased.

In one aspect, it is preferred that the resistance line folded back in the zigzag shape in plan view constituting the fourth electrodes has a width that narrows at the overlapping portion and widens at a folded-back portion that connects the overlapping portions.

According to this configuration, by widening the width of the folded-back portion of the resistance line constituting the fourth electrodes than the overlapping portion, the resistance change rate of the fourth electrode detected during pressing becomes smaller than that in a case where the overlapping portion and the folded-back portion have the same width. Thus, since the difference between the resistance change rate of the third electrode and the resistance change rate of the fourth electrode during pressing increases, more accurate detection becomes easy further.

On the other hand, since the width of the resistance line constituting the fourth electrodes widens at the folded-back portion, durability of the folded-back portion against stress concentration increases.

In one aspect, it is preferred that the first electrode to the fourth electrode have the following patterns.

In other words, among the first electrodes and the second electrodes, a pattern of electrodes formed on a same surface as the third electrodes and the fourth electrodes is a mesh pattern. Specifically, the mesh pattern has rectangular lattices formed of thin lines in the X-axis direction and the Y-axis direction. A rectangular region having one set of the adjacent overlapping portions of the pattern of the fourth electrode as opposed sides and the lattice in the mesh pattern have a same shape or an approximate shape and a same or an approximate size.

The electrodes having the mesh pattern, the third electrodes, and the fourth electrodes are in proximity.

Furthermore, the lattices and the rectangular regions are regularly arrayed as a whole.

According to this configuration, among the first electrodes and the second electrodes, a pattern of electrodes formed on a same surface as the third electrodes and the fourth electrodes is the mesh pattern. Accordingly, visibility of the touch panel is excellent.

In addition, the rectangular region having one set of the adjacent overlapping portions of the pattern of the fourth electrode as the opposed sides is visually assimilated with the lattice of the mesh pattern. Thus, a phenomenon in which the pattern of electrodes is visible, so-called a see-through phenomenon, can be suppressed.

In one aspect, it is preferred that the first electrode to the fourth electrode have the following patterns.

In other words, a pattern of the third electrodes is a pattern in which a resistance line constituting the third electrodes is folded back in a zigzag shape in plan view. The pattern of the third electrodes includes a plurality of overlapping portions formed in parallel to one another. An arrangement direction of the plurality of overlapping portions matches an extension direction of the third electrodes.

On the other hand, a pattern of the fourth electrodes is a pattern in which a resistance line constituting the fourth electrodes is folded back in a zigzag shape in plan view. The pattern of the fourth electrodes includes a plurality of overlapping portions formed in parallel to one another. An arrangement direction of the plurality of overlapping portions matches an extension direction of the fourth electrodes in the pattern. The pattern of the third electrodes and the pattern of the fourth electrodes have a cycle in which foldings are in synchronization.

Furthermore, among the first electrodes and the second electrodes, a pattern of electrodes formed on a same surface as the third electrodes and the fourth electrodes is a mesh pattern. Specifically, the mesh pattern has rectangular lattices formed of thin lines in the X-axis direction and the Y-axis direction. Rectangular regions having respective one sets of the adjacent overlapping portions of the patterns of the third electrode and the fourth electrode as opposed sides and the lattice in the mesh pattern have a same shape or an approximate shape and a same or an approximate size.

The electrodes having the mesh pattern, the third electrodes, and the fourth electrodes are in proximity. Further, the lattices and the rectangular regions are regularly arrayed in the X-axis direction and the Y-axis direction as a whole.

According to this configuration, among the first electrodes and the second electrodes, a pattern of the electrodes formed on a same surface as the third electrodes and the fourth electrodes is the mesh pattern. Accordingly, visibility of the touch panel is excellent.

In addition, the rectangular regions having respective one sets of the adjacent overlapping portions of the patterns of the third electrode and the fourth electrode as the opposed sides are visually assimilated with the lattice of the mesh pattern. Thus, a phenomenon in which the pattern of the electrodes is visible, so-called a see-through phenomenon, can be suppressed.

Compared to the above-described aspect of the third electrodes in the linear pattern, in the present aspect, the fourth electrode and the third electrode do not constitute a double line (a triple line including the thin line of the mesh pattern) near the folded-back portion that connects the overlapping portions of the pattern of the fourth electrodes. Thus, the assimilation with the lattices in the mesh pattern is more natural.

In one aspect, in the configuration in which the above-described see-through phenomenon is suppressed, it is preferred that the line widths of the resistance lines folded back in a zigzag shape in plan view constituting the respective third electrodes and fourth electrodes are in the following relationships.

In other words, a line width of the resistance line constituting the third electrodes widens at the overlapping portion and narrow at a folded-back portion that connects the overlapping portions. On the other hand, a line width of the resistance line constituting the fourth electrodes narrows at the overlapping portion and widens at a folded-back portion that connects the overlapping portions.

According to this configuration, since the width of the resistance line constituting the third electrodes narrows at the folded-back portion, conversely to the fourth electrodes, a cross-sectional area of the folded-back portion is reduced. As described above, in the resistance line folded back in the zigzag shape in plan view, the electrical resistance does not change according to the posture change in the plurality of overlapping portions, and the electrical resistance changes according to the posture change only in folded-back portions, which connect the overlapping portions. Thus, even when the third electrode and the fourth electrode are the same material, the resistance change rate of the fourth electrode having the wide folded-back portion becomes smaller than the resistance change rate of the third electrode having the narrow folded-back portion detected during pressing. In other words, only the difference in pattern can cause the difference between the resistance change rate of the third electrode and the resistance change rate of the fourth electrode during pressing.

In addition, in any of the third electrodes and the fourth electrodes described in the paragraph before last, the electrodes may be replaced by ones in which the line width of the resistance line constituting the electrodes has the same width between the overlapping portion and the folded-back portion.

When any of the third electrodes and the fourth electrodes are replaced by the ones having the same width in this way, even when the third electrode and the fourth electrode are the same material, the resistance change rate of the fourth electrode is still smaller than the resistance change rate of the third electrode detected during pressing. In other words, in this case as well, only the difference in pattern can cause the difference between the resistance change rate of the third electrode and the resistance change rate of the fourth electrode during pressing.

In one aspect, it is preferred that the folded-back portions of the resistance lines folded back in a zigzag shape in plan view constituting the respective third electrodes and fourth electrodes are folded back in a curved manner.

According to this configuration, stress concentration when an elongation force is applied to the third electrode and the fourth electrode can be reduced, and cracks can be suppressed.

In one aspect, it is preferred that the folded-back portions of the resistance lines folded back in a zigzag shape in plan view constituting the respective third electrodes and fourth electrodes are folded back linearly.

According to this configuration, the widths in the direction orthogonal to the extension directions of the third electrodes and the fourth electrodes become smaller than that in the configuration in which the folded-back portions are folded back in the curved manner, and therefore the second electrodes, the third electrodes, and the fourth electrodes can be arranged closely. As a result, the detection accuracy of the pressed position and the pressing force can be increased.

In one aspect, it is preferred that the fourth electrode is configured using a same material as the third electrode having a pattern different from a pattern of the fourth electrode.

According to this configuration, the third electrodes and the fourth electrodes can be formed simultaneously, making the process simple.

In one aspect, it is preferred that the plurality of third electrodes and the plurality of fourth electrodes are each formed in a zigzag shape as a whole in plan view.

That is, the plurality of third electrodes disposed adjacent to one another are connected in alternation by one side end portions and the other side end portions in the extension direction of the plurality of third electrodes.

On the other hand, the plurality of fourth electrodes disposed adjacent to one another are connected in alternation by one side end portions and the other side end portions in the extension direction of the plurality of fourth electrodes.

According to this configuration, the plurality of third electrodes are connected to one another and connected to one as a whole. Therefore, by setting the entire as a detection target, the magnitude of the pressing force on the operating surface can be easily determined. In particular, in the case of a single touch in which the operating surface is contacted by only one point, the magnitude of the pressing force at the one point can be easily determined. When a pressure sensitive function needs to be exhibited only during the single touch in the specification, a circuit to detect the electrical resistance of the third electrode can be significantly simplified and the cost can be reduced.

Note that the plurality of fourth electrodes are for temperature compensation of the detection result of the third electrode based on the detection result of the fourth electrode, and thus the connection similar to that of the plurality of third electrodes is performed.

In one aspect, it is preferred that the third electrodes and the fourth electrodes are formed on a same surface as electrodes disposed on a side opposite to the panel member among the first electrodes and the second electrodes.

According to this configuration, the third electrode and the fourth electrode are disposed at the positions further away from the first electrode, the second electrode, and a neutral axis of the entire panel member. As a result, a degree of deformation (the posture change) of the third electrode and the fourth electrode when the pressing force is applied to the operating surface and the first electrode, the second electrode, the third electrode, the fourth electrode, and the panel member are elastically deformed integrally is relatively large. Thus, the detection sensitivity of the pressing force can be increased, and as a result, the detection accuracy of the pressing force can be increased.

As one aspect it is preferred that a first resistance detection unit, a second resistance detection unit, a temperature compensation unit, a pressing force determination unit, and a storage unit are further provided. The first resistance detection unit detects an electrical resistance of a plurality of third electrodes. The second resistance detection unit detects an electrical resistance of a plurality of fourth electrodes. The temperature compensation unit corrects a detection result by the first resistance detection unit based on a detection result by the second resistance detection unit. The pressing force determination unit determines a pressing force on the operating surface based on a value after the correction of the detection result by the first resistance detection unit by the temperature compensation unit. The storage unit preliminarily stores relationship information that defines a correlation between a pressing force on the operating surface and an amount of change in an electrical resistance from the non-pressed state. The pressing force determination unit determines a pressing force according to an actual amount of change in an electrical resistance based on the relationship information and the actual amount of change in the electrical resistance.

According to this configuration, cooperation between the first resistance detection unit, the second resistance detection unit, the temperature compensation unit, and the pressing force determination unit allows appropriately and simply determining the pressing force on the operating surface based on the relationship information preliminarily overhauled in the storage unit.

In one aspect, it is preferred that the pressing force determining portion determines the pressing force according to an amount of change in the resistance of the third electrode that gives a local maximum resistance change among the plurality of third electrodes during the pressing operation on the operating surface with an electric resistance in the non-pressed state as a reference value (=0).

According to this configuration, the pressing force on the operating surface can be appropriately determined by relatively simple arithmetic processing. In other words, the pressing force can be determined simply and appropriately.

In one aspect, it is preferred that the pressing force determination unit obtains estimated resistances at respective positions in the X-axis direction or the Y-axis direction from the relationship between positions in the X-axis direction or the Y-axis direction of the plurality of third electrodes and the resistances actually detected during the pressing operations, and determines the pressing force according to peak values of the estimated resistances.

According to this configuration, the pressing force on the operating surface can be determined more minutely. In other words, the pressing force can be determined with high accuracy.

The touch panel according to one aspect of the present invention can also be configured to include a panel member that includes a viewing area and an outer peripheral area outside the viewing area, a plurality of first electrodes, a plurality of second electrodes, a third electrode, and a fourth electrode as described as follows.

That is, the plurality of first electrodes are disposed in parallel to one another to be arranged at predetermined intervals in a first direction at a position corresponding to the viewing area. The plurality of first electrodes have a self-capacitance or a mutual capacitance changing according to a proximity or separation of an object to be detected.

The plurality of second electrodes are opposed to the plurality of first electrodes and disposed in parallel to one another to be arranged at predetermined intervals in a second direction intersecting with the first direction at a position corresponding the viewing area. The plurality of second electrodes have a self-capacitance or a mutual capacitance changing according to the proximity or separation of the object to be detected.

The third electrode extends at a position corresponding to the outer peripheral area. The third electrode have an electrical resistance changing according to a posture change and a temperature change.

The fourth electrode extends along the third electrode at a position corresponding to the outer peripheral area. The fourth electrode have an electrical resistance changing according to the posture change and the temperature change.

A resistance change rate of each fourth electrode due to the temperature change is the same as a resistance change rate of each third electrode due to the temperature change.

The resistance change rate of each fourth electrode due to the posture change is 90% or less of the resistance change rate of each third electrode due to the posture change during the posture change at a normal temperature.

According to this configuration, a position (referred to as a "touch position") of, for example, a finger of a user that contacts or is in proximity to the operating surface of the panel member can be determined similarly to the conventional capacitive touch panel. In other words, the touch position on an X-Y coordinate system on the operating surface can be appropriately determined based on a change in the self-capacitance of each of the first electrodes and the second electrodes or a change in the mutual capacitance between the first electrode and the second electrode.

When the user touches the panel member with, for example, a finger, the panel member elastically deforms, and in accordance with the deformation, the third electrode and the fourth electrode also deform. At this time, the electrical resistances of the third electrode and the fourth electrode change according to the deformation (the posture change), and the electrical resistances also change according to the temperature change at the same time.

However, the resistance change rate of the fourth electrode due to the temperature change is the same as the resistance change rate of the third electrode due to the temperature change, and the resistance change rate of the fourth electrode due to the posture change is 90% or less of the resistance change rate of the third electrode due to the posture change during the posture change at the normal temperature. Therefore, a detection result including the change in the electrical resistance of the third electrode caused by the temperature change can be corrected (temperature compensation). As a result, the magnitude of the pressing force on the operating surface can be appropriately determined.

A further preferred aspect in a configuration including the third electrode and the fourth electrode at a position corresponding to the outer peripheral area of the panel member (hereinafter referred to as an outer peripheral area type) will be described below.

In one aspect of the outer peripheral area type, the third electrode and the fourth electrode may be disposed in proximity to one another.

According to this configuration, a temperature gradient is less likely to occur between the third electrode and the fourth electrode. Thus, the temperature compensation can be accurate.

In one aspect of the outer peripheral area type, the third electrode and the fourth electrode may have different pattern shapes.

According to this configuration, because of the difference in the pattern shapes of both, even when the third electrode and the fourth electrode are the same material, the resistance change rate of the fourth electrode becomes smaller than the resistance change rate of the third electrode detected during pressing.

In one aspect of the outer peripheral area type, in the pattern of the fourth electrode, a resistance line constituting the fourth electrode may have a zigzag shape in plan view.

According to this configuration, since the shape of the fourth electrode is the zigzag shape, changing the resistance change rate of the fourth electrode is easy.

In one aspect of the outer peripheral area type, in the pattern of the third electrode, a resistance line constituting the third electrode may have a zigzag shape in plan view.

According to this configuration, changing the resistance change rate of the third electrode is easy.

In one aspect of the outer peripheral area type, the resistance line of the third electrode may include first portions extending in an extension direction and second portions extending in a direction orthogonal to the extension direction in alternation.

The resistance line of the fourth electrode may include third portions extending in an extension direction and fourth portions extending in a direction orthogonal to the extension direction in alternation.

The third portion or the fourth portion may be wider than at least one of the first portion and the second portion.

According to this configuration, by configuring the width of the resistance line constituting the fourth electrode wider than the width of the resistance line constituting the third electrode, the resistance change rate of the fourth electrode with respect to the posture change is smaller than the resistance change rate of the third electrode.

In one aspect of the outer peripheral area type, the folded-back portions of the third electrode and the fourth electrode may be folded back in a curved manner. Note that the "folded-back portion" means a connecting portion between the third portion and the fourth portion.

According to this configuration, stress concentration when an elongation force acts on the third electrode and the fourth electrode can be reduced, and cracks can be suppressed.

In one aspect of the outer peripheral area type, the resistance line of the third electrode may include first portions and second portions that extend diagonally in alternation and form triangular wave shapes.

The resistance line of the fourth electrode may include third portions and fourth portions that extend diagonally in alternation and form triangular wave shapes.

According to this configuration, strain stress acting in a direction oblique to the extension direction of the third electrode and the fourth electrode can be measured.

In one aspect of the outer peripheral area type, the third electrode and the fourth electrode may constitute a part of a Wheatstone bridge.

The third electrode and the fourth electrode may be connected in series between an input voltage and a ground. An output unit that outputs an output voltage may be provided between the third electrode and the fourth electrode.

In one aspect of the outer peripheral area type, a part of the fourth electrode, at least a part of the third electrode, and another part of the fourth electrode may be arranged in the order in a direction orthogonal to an extension direction. Alternatively, a part of the third electrode, at least a part of the fourth electrode, and another of the third electrode may be arranged in the order in the direction orthogonal to the extension direction.

According to this configuration, for example, in a case where a local heat source is outside in the direction orthogonal to the extension direction of one of the part of the fourth electrode and the other part of the fourth electrode, an amount of change in the resistance value of the one closer to the local heat source among the parts of the fourth electrode is large and the amount of change in the resistance value of the one farther from the local heat source is small. Accordingly, the amount of change in the resistance value of the third electrode and the amount of change in the resistance value of the fourth electrode are around the same. As a result, the output signal caused by the temperature is zero or nearly zero. Consequently, the temperature-compensated detection result is output.

In one aspect of the outer peripheral area type, the fourth electrode may include a first resistor and a second resistor. The second resistor may be connected in series with the first resistor, folded back from the first resistor, and extend parallel to the first resistor.

The third electrode may include a third resistor and a fourth resistor. The fourth resistor may be connected in series with the third resistor, folded back from the third resistor, and extends parallel to the third resistor.

The first resistor and second resistor may be each disposed on both sides in the direction orthogonal to the extension direction of the third resistor and the fourth resistor.

According to this configuration, for example, in a case where a local heat source is outside in the direction orthogonal to the extension direction of one of the first resistor and the second resistor, an amount of change in the resistance value of the one closer to the local heat source among the first resistor and the second resistor is large and the amount of change in the resistance value of the one farther from the local heat source is small. Accordingly, the amount of change in the resistance value of the third electrode and the amount of change in the resistance value of the fourth electrode are around the same. As a result, the output signal caused by the temperature is zero or nearly zero. Consequently, the temperature-compensated detection result is output.

In one aspect of the outer peripheral area type, two sets of the third electrodes and the fourth electrodes may be provided.

The two sets may have pattern shapes of a line symmetry or a point symmetry in plan view.

According to this configuration, for example, in a case where the two sets are linearly symmetrical and the local heat source is outside in the direction orthogonal to the extension direction of one of the third resistor and the fourth resistor, the intensities of the signals generated by the local heat source are approximately the same magnitude in the two sets and become signals of opposite phases. Therefore, when they are added, the result becomes zero or nearly zero. Consequently, the temperature-compensated detection result is output.

In one aspect of the outer peripheral area type, two sets of the third electrodes and the fourth electrodes may be provided.

The two sets may be disposed at point symmetric positions on both surfaces of an insulating substrate.

In one aspect of the outer peripheral area type, the third electrode and the fourth electrode may be formed on a surface the same as a surface on which the first electrodes or the second electrodes are formed of an insulating substrate. According to this configuration, patterning can be performed simultaneously with a printing or an etching process, and the manufacturing process does not increase compared to that of the usual touch panel.

In one aspect of the outer peripheral area type, the touch panel may further include a metal plate provided at a position separated from the third electrode and the fourth electrode in a layered direction and a position corresponding to the third electrode and the fourth electrode in plan view.

According to this configuration, thermal diffusion is performed on heat from another configuration by the metal plate, and thus a temperature difference between the third electrode and the fourth electrode decreases. Thus, the temperature compensation is accurate.

Not limited to the outer peripheral area type, in one aspect of the present invention, the panel member may have a rectangular shape. An extension direction of the third electrode may be parallel to a short side of the panel member.

According to this configuration, the most pressing force applied in a vertical direction of the panel member is transmitted to supported ends of long sides of the panel member, that is, in the short side direction. Stress extending in the extension direction of third electrode and fourth electrode parallel to the short side of the panel member is effectively applied.

Advantageous Effects of Invention

The touch panel with pressure sensitive function according to the present invention solves a problem in the resistance change caused by the temperature change to ensure accurately measuring the pressing force.

DESCRIPTION OF EMBODIMENTS

1. First Embodiment (1) Basic Configuration of Touch Panel

Embodiments of the touch panel according to the present invention will be described below with reference to the drawings.

A touch panel 5 according to the present embodiment is provided with an electronic device 1, such as a mobile phone or a mobile gaming device, and an on-vehicle display used as an interior of an automobile, such as a Center Information Display (CID), a Cluster (Instrument Cluster), and a Rear Seat Entertainment (RSE), to function as a touch input device.

In the present embodiment, the touch panel 5 mounted on a multifunctional mobile phone (a smartphone) as one type of the electronic device 1 will be described as an example. Note that, in the following description, a side where an input surface (an operating surface 10*a* described later) of the touch panel 5 as a touch input device is positioned will be referred to as a "front surface side". This "front surface side" is also a side facing a user who operates the electronic device 1. Conversely, the far-side when viewed from the user who operates the electronic device 1 will be referred to as a "back surface side".

Figure 1:
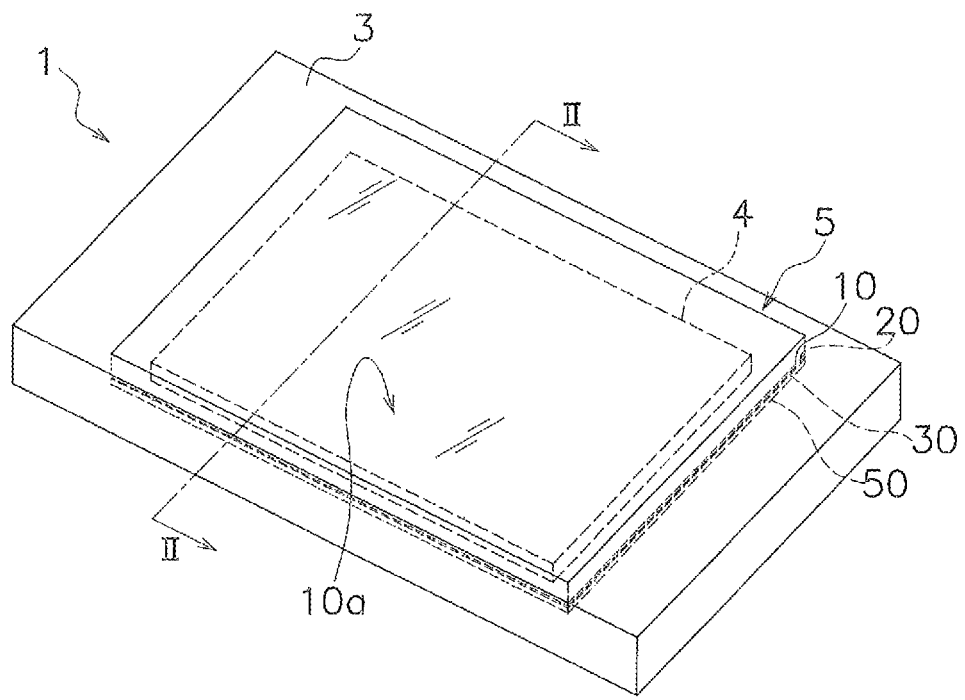
FIG. 1 is a perspective view of an electronic device on which a touch panel with pressure sensitive function is mounted.
Figure 2:
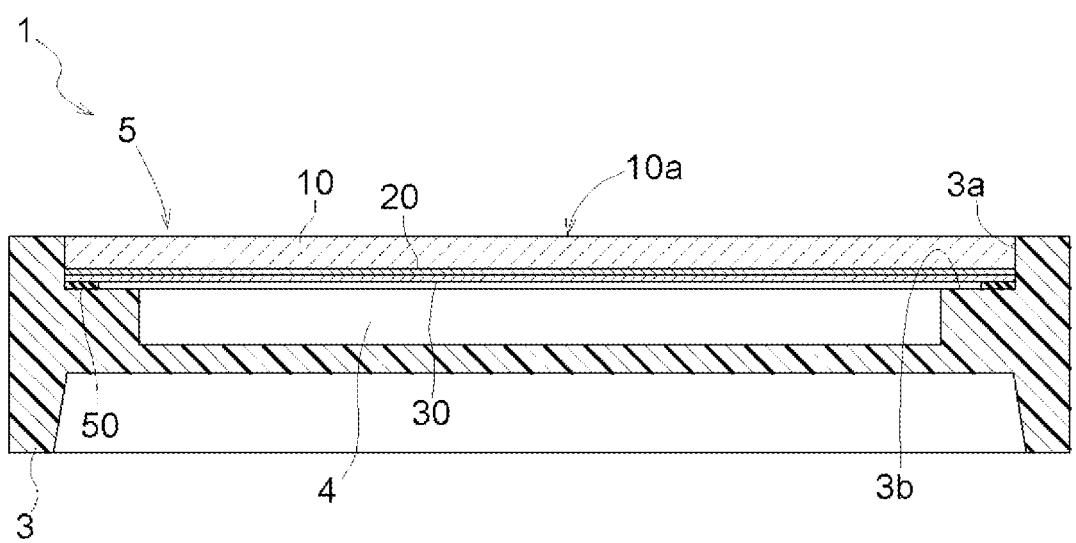
FIG. 2 is a cross-sectional view taken along II-II in FIG. 1.

As illustrated in FIG. 1 and FIG. 2, the electronic device 1 according to the present embodiment includes a substantially cuboid housing 3, a display device 4 built into the housing 3, and the rectangular touch panel 5 overlapped and disposed on the front surface side with respect to the display device 4. The housing 3 is made of a synthetic resin. The housing 3 includes a recessed portion 3*a* that opens in a rectangular shape to the front surface side. The recessed portion 3*a* is formed with a step, and the step portion functions as a support portion 3*b* that supports the touch panel 5 from the back surface side. The support portion 3*b* is formed in a rectangular frame shape (a frame shape) corresponding to the shape of the recessed portion 3*a*. The display device 4 is housed in a region on the back surface side with respect to the support portion 3*b*, and the touch panel 5 is housed in the region on the front surface side while being supported by the support portion 3*b*. Note that the display device 4 is constituted by, for example, a liquid crystal display panel or an organic EL display panel.

The shape and dimensions of the recessed portion 3*a* can be appropriately set according to the shapes and dimensions of the display device 4 and the touch panel 5. In the present embodiment, as an example, both the display device 4 and the touch panel 5 have substantially cuboid shapes, and the dimensions of the touch panel 5 are larger than those of the display device 4 in plan view (a state viewed from the front surface side). The recessed portion 3*a* is formed so that side surfaces of a first housing recessed portion contact side surfaces of the display device 4, side surfaces of a second housing recessed portion contact side surfaces of the touch panel 5, the surface of the display device 4 and the surface of the support portion 3b are substantially the same height, and the surface of the housing 3 and the surface of the touch panel 5 are substantially the same height.

In the present embodiment, the touch panel 5 is configured to detect a position corresponding to, for example, a finger of the user (referred to as a "touch position") when, for example, the finger of the user or a stylus operated by the user is in proximity to or in contact with the operating surface 10a. Additionally, the touch panel 5 is configured to simultaneously detect a magnitude of a pressing force on the operating surface 10a, in addition to the touch position (the pressed position on the operating surface 10a) when the user actually touches the operating surface 10a with, for example, the finger. In other words, the touch panel 5 according to the present embodiment is configured as a touch panel with pressure sensitive function.

Note that in the touch panel 5 according to the present embodiment, a portion that detects the touch position is referred to as a touch sensor 5a, and a portion that detects the magnitude of the pressing force is referred to as a pressure sensor 5b.

Figure 3:
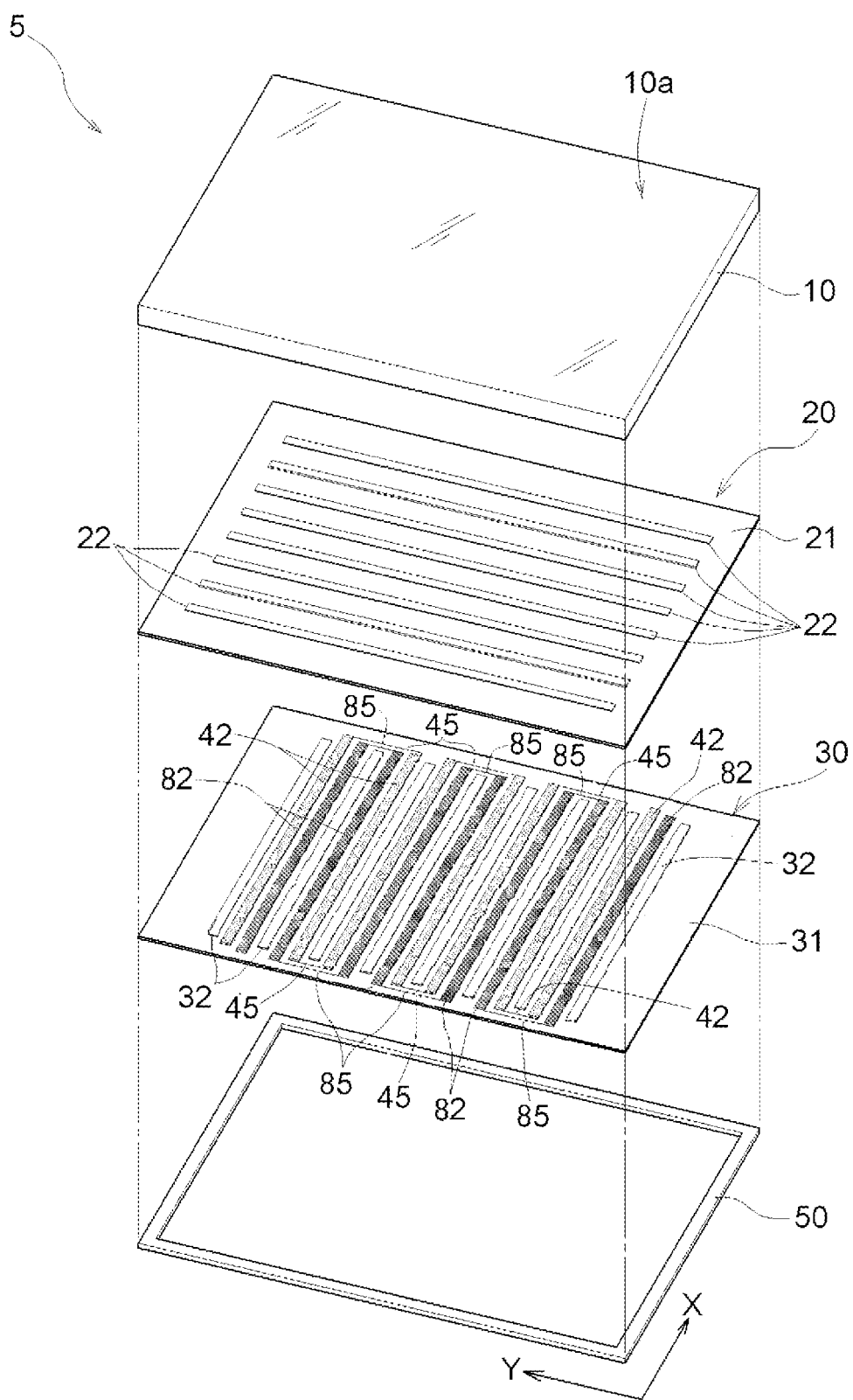
FIG. 3 is an exploded perspective view of the touch panel.

As illustrated in FIG. 3, the touch panel 5 includes a panel member 10, a first electrode forming member 20, a second electrode forming member 30, and a support member 50. They are layered in the described order from the front surface side to the back surface side. The support member 50 is disposed on the support portion 3b of the housing 3, the second electrode forming member 30 is disposed on the support member 50, the first electrode forming member 20 is disposed on the second electrode forming member 30, and the panel member 10 is disposed on the first electrode forming member 20 (see FIG. 2). They are bonded to one another with, for example, a pressure sensitive adhesive (PSA).

In the present embodiment, the panel member 10, the first electrode forming member 20, and the second electrode forming member 30 are formed in a rectangular shape in plan view and stacked. The direction along the short sides among the four sides forming the rectangle is defined as an "X-axis direction" in the present embodiment, and the direction along the long sides intersecting with (in the present example, orthogonal to) the short sides is defined as a "Y-axis direction" in the present embodiment. In the present embodiment, the X-Y coordinate system (the X-Y Cartesian coordinate system) is configured based on the X-axis direction and the Y-axis direction orthogonal to one another. Note that the X-Y coordinate system may be configured based on the X-axis direction and the Y-axis direction intersecting with one another at a non-right angle.

(2) Panel Member

The panel member 10 is a plate-shaped member disposed on the frontmost surface side in the touch panel 5. The panel member 10 has the operating surface 10a on the surface on the front surface side thereof. The operating surface 10a is a surface touched (to be an operation target) by, for example, the finger of the user when the user inputs a predetermined operation to the electronic device 1. The operating surface 10a functions as a viewing area of the display device 4. The outer periphery of the operating surface 10a is an outer peripheral area 10b.

In the present embodiment, the panel member 10 functions as a protective panel that protects the first electrode forming member 20 and the second electrode forming member 30. The panel member 10 preferably has, for example, transparency, a scratch resistance, and a stain resistance. The panel member 10 can be constituted by a glass plate using, for example, a soda glass and a tempered glass, and is a thin glass plate in the present embodiment. In addition to this, for example, a resin material, such as polymethyl methacrylate or polycarbonate, and an organic inorganic hybrid material may be used to configure the panel member 10. The use of a material excellent in strength allows the panel member 10 to be thinned. The thickness of the panel member 10 can be, for example, from 0.4 mm to 1.5 mm. In addition, while the panel member 10 is originally elastically deformable, the panel member 10 has the advantage of being easily elastically deformed by making it thinner.

According to this configuration, since the most pressing force applied in the vertical direction of the panel member is transmitted to the supported ends of the long sides of the panel member, that is, in the short side direction, stress extending in an extension direction of third electrodes and fourth electrodes is effectively applied. Thus, detection sensitivity of the pressing force can be increased. The transmission of stress in the two direction is around from 1.0 to 1.5 in the long side/short side, and when the long side/short side is elongated exceeding 2.0, the force flows only in the short side direction.

(3) Touch Sensor (3-1) First Electrode Forming Member

The first electrode forming member 20 includes a first substrate 21 and a plurality of (eight in the present example) first electrodes 22 formed on the first substrate 21.

(a) First Substrate

Preferably, the first substrate 21 is configured using a material excellent in, for example, transparency, flexibility, and an insulating property. Examples of the material that meets such requirements include, for example, general-purpose resin such as polyethylene terephthalate and acrylic resin; general-purpose engineering resin such as polyacetal-based resin and polycarbonate-based resin; super engineering resin such as polysulfone-based resin and polyphenylene sulfide-based resin; and the like. In addition, the material may be cycloolefin-based resin or polyamide resin. The thickness of the first substrate 21 can be, for example, from 25 μm to 100 μm. In the present embodiment, the first substrate 21 is composed of a polyethylene terephthalate film.

(b) First Electrode

In the present embodiment, the first electrodes 22 are formed corresponding to the operating surface 10a on the surface on the front surface side (the panel member 10 side) of the first substrate 21. The plurality of first electrodes 22 are disposed parallel to one another so as to be arranged with predetermined intervals in the X-axis direction. In the present embodiment, the first electrodes 22 are formed in a stripe shape (a linear shape having a constant width). Note that the first electrodes 22 may be formed in a wave shape or a zigzag shape, for example. In any case, each of the first electrodes 22 is formed so as to extend along the Y-axis direction as a whole. The first electrode 22 is configured using a material that has a capacitance changing according to proximity/separation of a non-sensing material (a conductor, such as the finger of the user). Note that the "capacitance" is a concept that includes both of self-capacitance and mutual capacitance. In other words, the first electrode 22 is configured using the material that has the self-capacitance or the mutual capacitance with the second electrode 32 changing according to the proximity/separation of the non-sensing material. Preferably, the first electrode 22 is configured using a material excellent in transparency. Examples of the material that meets such requirement include, for example, metal oxides such as tin oxide, indium oxide, antimony oxide, zinc oxide, cadmium oxide, and indium tin oxide (ITO), and silver nanowire, carbon nanotube, and conductive polymer. The first electrode 22 being a transparent conductive film configured using these materials can have the thickness of, for example, from 5 nm to 10,000 nm.

The first electrode 22 may be a mesh electrode. The mesh electrode has a mesh pattern or a lattice pattern formed of thin lines. For example, as the materials that can be used for the mesh electrode, the conductive material having excellent transparency described above, and also metals having a conductivity to the extent of ensuring sufficiently functioning as a touch panel electrode, such as gold, silver, copper, iron, nickel, and chromium, are used.

An example of the method of forming the first electrodes 22 includes a method of forming a conductive film made of the electrode material described above on the entire first substrate 21, and then removing the unnecessary portion by etching. The entire formation of the conductive film can be performed by, for example, a vacuum deposition method, a sputtering method, an ion plating method, a chemical vapor deposition (CVD) method, and a roll coater method. The etching can be performed by forming a resist by, for example, a photolithography method or a screen printing method in a portion desired to be left as an electrode, and then immersing it in an etching solution, such as hydrochloric acid. Furthermore, the etching can also be performed by spraying the etching solution after forming the resist to remove the conductive film at the portion where the resist is not formed, and then immersing it in a solvent to swell or dissolve the resist for removal. The etching can also be performed with a laser.

(3-2) Second Electrode Forming Member

The second electrode forming member 30 includes a second substrate 31 and a plurality of (eight in the present example) second electrodes 32 formed on the second substrate 31.

(a) Second Substrate

Preferably, the second substrate 31 is also configured using a material excellent in, for example, transparency, flexibility, and an insulating property. The material constituting the second substrate 31 and the thickness of the second substrate 31 can be considered similarly to the first substrate 21.

(b) Second Electrode

In the present embodiment, the second electrodes 32 are formed on the surface on the front surface side (the panel member 10 and the first electrode forming member 20 side) of the second substrate 31. The plurality of second electrodes 32 are disposed so as to be opposed to the plurality of first electrodes 22 at predetermined intervals in the thickness direction. The plurality of second electrodes 32 are disposed parallel to one another so as to be arranged with predetermined intervals in the Y-axis direction. In the present embodiment, the second electrodes 32 are formed in a stripe shape (a linear shape having a constant width). Note that the second electrodes 32 may be formed in a wave shape or a zigzag shape, for example. In any case, each of the second electrodes 32 is formed so as to extend along the X-axis direction as a whole. As a result, the first electrodes 22 and the second electrodes 32 are disposed so as to intersect with (in the present example, orthogonal to) one another in plan view. Similar to the first electrode 22, the second electrode 32 is configured using a material that has a capacitance changing according to the proximity or separation of the non-sensing material. The second electrode 32 is configured using the material that has the self-capacitance or the mutual capacitance with the first electrode 22 changing according to the proximity or separation of the non-sensing material. Preferably, the second electrode 32 is configured using a material excellent in transparency. The material constituting the second electrode 32 and the thickness of the second electrode 32 can be considered similarly to the first electrode 22. The method of forming the second electrodes 32 can also be considered similarly to the first electrodes 22.

In the present embodiment, the plurality of respective first electrodes 22 are disposed on the first substrate 21 to be separated in an island pattern without being connected to one another. Similarly, the plurality of respective second electrodes 32 are disposed on the second substrate 31 to be separated in an island pattern without being connected to one another. The plurality of first electrodes 22 and the plurality of second electrodes 32 are disposed so as to form a lattice shape as a whole in plan view (see FIG. 6). A typical capacitive touch panel is constituted by the plurality of first electrodes 22 and the plurality of second electrodes 32. Note that the first substrate 21 is present between the first electrodes 22 and the second electrodes 32, and the first electrodes 22 and the second electrodes 32 are disposed via the first substrate 21 in the thickness direction. In the present embodiment, an air gap is absent between the first electrodes 22 and the second electrodes 32, so optical characteristics can be improved. In other words, reflection of light can be suppressed and a decrease in transmittance can be suppressed.

(4) Pressure Sensor

The pressure sensor 5b will be described.

As illustrated in FIG. 3, the pressure sensor 5b further includes a plurality of (in the present example, seven, which corresponds to the number of spaces between the second electrodes 32) third electrodes 42 formed on the second substrate 31.

The third electrodes 42 are formed on the surface on the front surface side (the panel member 10 and the first electrode forming member 20 side) of the second substrate 31. The third electrodes 42 are disposed parallel to one another so as to be arranged with predetermined intervals in the Y-axis direction. One third electrode 42 is disposed between the second electrodes 32 adjacent to one another, and respective electrodes 42a to 42g of the third electrodes 42 are formed extending along the X-axis direction as a whole (see FIG. 4). Similar to the second electrodes 32, the plurality of third electrodes 42 are disposed so as to be opposed to the plurality of first electrodes 22 at predetermined intervals in the thickness direction.

Note that in FIG. 3, the short side of the panel member 10 is parallel to the extension direction of the third electrodes 42. According to this configuration, since the most pressing force applied in the vertical direction of the panel member 10 is transmitted to the supported ends of the long sides of the panel member 10, that is, in the short side direction, stress extending in the extension direction of the third electrodes 42 is effectively applied. Thus, detection sensitivity of the pressing force can be increased.

As illustrated in FIG. 3, the pressure sensor 5b further includes a plurality of (in the present example, seven, which corresponds to the number of spaces between the second electrodes 32) fourth electrodes 82 formed on the second substrate 31.

The fourth electrodes 82 are formed on the surface on the front surface side (the panel member 10 and the first electrode forming member 20 side) of the second substrate 31. The fourth electrodes 82 are disposed so as to extend along the third electrodes 42. One fourth electrode 82 is disposed between the second electrodes 32 adjacent to one another in a pair with the third electrode 42. In other words, the second electrodes 32 and the pairs of the third electrodes 42 and the fourth electrodes 82 formed in parallel to one another are disposed in alternation at predetermined intervals in the Y-axis direction. In the present embodiment, the fourth electrodes 82 are formed in a stripe shape (a linear shape having a constant width). Respective electrodes 82a to 82g of the fourth electrodes 82 are formed so as to extend along the X-axis direction as a whole (see FIG. 4). Similar to the second electrodes 32 and the third electrodes 42, the plurality of fourth electrodes 82 are disposed so as to be opposed to the plurality of first electrodes 22 at predetermined intervals in the thickness direction.

As described above, since the most pressing force applied in the vertical direction of the panel member 10 is transmitted to the supported ends of the long sides of the panel member 10, that is, in the short side direction, stress extending in an extension direction of the fourth electrodes 82 is effectively applied.

(4-1) Description of Outline of Third Electrode

The third electrode 42 is constituted by a resistance line using a material in which an electrical resistance changes according to a posture change and a temperature change. Preferably, the third electrode 42 is configured using a material excellent in transparency.

Examples of the material that meets such requirement include, for example, metal oxides such as tin oxide, indium oxide, antimony oxide, zinc oxide, cadmium oxide, and ITO, and silver nanowire, carbon nanotube, and conductive polymer. The third electrode 42 being a transparent conductive film configured using these materials can have the thickness of, for example, from 5 nm to 10,000 nm.

In addition, since the third electrode 42 is a thin line as described later, the third electrode 42 may be configured using an opaque material. As the materials, for example, metals such as gold, silver, copper, iron, nickel, and chromium, and an alloy such as nickel copper and nickel chromium, are used. Besides, carbon, conductive carbon ink, graphene, or carbon nanotube may also be used.

The method of forming the third electrodes 42 can also be considered similarly to the first electrodes 22 and the second electrodes 32.

(4-2) Description of Outline of Fourth Electrode

The fourth electrode 82 is constituted by a resistance line using a material in which an electrical resistance changes according to a posture change and a temperature change. Preferably, the fourth electrode 82 is configured using a material excellent in transparency.

Examples of the material that meets such requirement include, for example, metal oxides such as tin oxide, indium oxide, antimony oxide, zinc oxide, cadmium oxide, and ITO, and silver nanowire, carbon nanotube, and conductive polymer. The fourth electrode 82 being a transparent conductive film configured using these materials can have the thickness of, for example, from 5 nm to 10,000 nm.

Similar to the third electrode 42, the fourth electrode 82 may be configured using an opaque material. As the materials, for example, metals such as gold, silver, copper, iron, nickel, and chromium, and an alloy such as nickel copper and nickel chromium, are used. Besides, carbon, conductive carbon ink, graphene, or carbon nanotube may also be used.

In the present embodiment, the fourth electrode 82 is configured by selecting the same material as the third electrode 42 among the materials described above as examples. Therefore, a resistance change rate of each fourth electrode 82 due to the temperature change is the same as the resistance change rate of each third electrode 42 due to the temperature change.

The method of forming the fourth electrodes 82 can also be considered similarly to the first electrodes 22, the second electrodes 32, and the third electrodes 42.

(4-3) Patterns of Third and Fourth Electrodes

Figure 4:
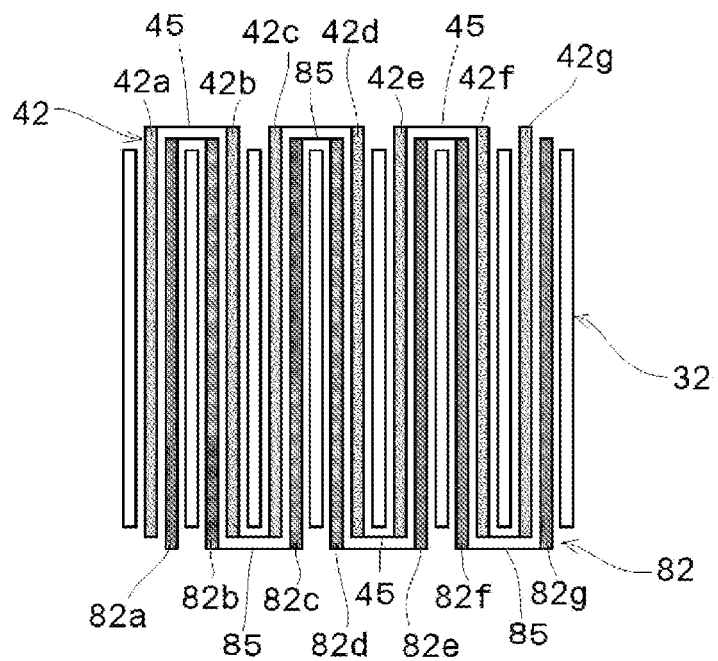
FIG. 4 is a schematic diagram illustrating one aspect of a connection configuration of a plurality of electrodes.

In FIG. 3 and FIG. 4, the third electrodes 42 are drawn in the stripe shape (the linear shape having the constant width), but this is not the actual pattern of the third electrodes 42 themselves. Since the plurality of respective electrodes 32, 42, and 82 are arranged on the second substrate 31, the third electrodes 42 are expressed in a simplified manner for ease of viewing the drawings.

Figure 5A:
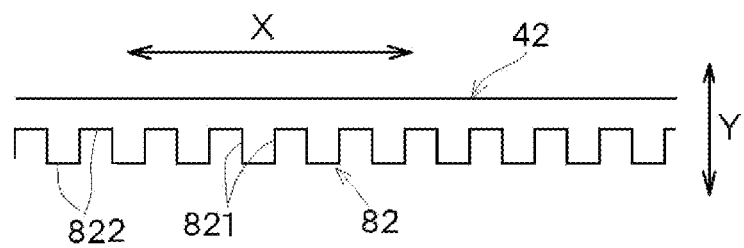
FIGS. 5(a) and 5(b) are enlarged views illustrating one aspect of a pair of patterns including a third electrode and a fourth electrode.
Figure 5B:
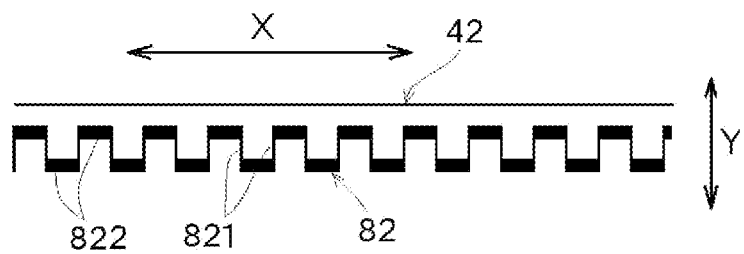

FIGS. 5(a) and 5(b) are enlarged views illustrating one aspect of a pair of patterns including the third electrode 42 and the fourth electrode 82. As illustrated in FIGS. 5(a) and 5(b), the actual pattern of the third electrode 42 in the present embodiment is a linear pattern. On the other hand, as illustrated in FIGS. 5(a) and 5(b), the actual pattern of the fourth electrodes 82 in the present embodiment is a pattern in which a plurality of overlapping portions 821 are formed by folding back a resistance line constituting the fourth electrodes 82 in a zigzag shape in plan view to be parallel to one another and the arrangement direction of the plurality of overlapping portions 821 matches the extension direction (the X-axis direction) of the fourth electrodes 82.

According to this configuration, in the plurality of overlapping portions 821 perpendicular to the extension direction of the fourth electrodes 82, the electrical resistance does not change according to the posture change in the fourth electrodes 82, and the electrical resistance changes according to the posture change only in folded-back portions 822, which connect the overlapping portions 821. Thus, even when the third electrode 42 and the fourth electrode 82 are the same material as described above, the resistance change rate of the fourth electrode 82 detected during pressing becomes smaller than the resistance change rate of the third electrode 42 in the linear pattern.

For example, as illustrated in FIG. 5(a), a case where a width of the fourth electrode 82 is the same width between the overlapping portion 821 and the folded-back portion 822, which connects the overlapping portions 821, will be considered.

An electrical resistance ($R_1'$) after the resistance change of the third electrodes 42 in the linear pattern has the relationship of the following equation with an original electrical resistance ($R_1$), a strain ($\varepsilon$), and a gauge factor ($Ks$).

$$R_1' = R_1(1 + Ks \times \varepsilon) \quad \text{(Equation 1)}$$

That is, the amount of change in the electrical resistance ($\Delta R_1$) and the resistance change rate ($\Delta R_1/R_1$) are each as in the following equation.

$$\Delta R_1 = R_1 \times Ks \times \varepsilon \quad \text{(Equation 2)}$$

$$\Delta R_1/R_1 = Ks \times \varepsilon \quad \text{(Equation 3)}$$

In contrast, an electrical resistance ($R_2'$) after the resistance change of the fourth electrodes 82 in the zigzag pattern having the same width has the relationship of the following equitation with an original electrical resistance ($R_2$), a strain ($\varepsilon$), and a gauge factor ($Ks$).

$$R_2' = R_2/2 + R_2/2(1 + Ks \times \varepsilon) \quad \text{(Equation 4)}$$

$R_2/2$ in the former term is the electrical resistance of the overlapping portion 821 and $R_2/2(1+Ks\times\varepsilon)$ of the latter term is the resistance of the folded-back portion 822. That is, the amount of change in the electrical resistance ($\Delta R_2$) and the resistance change rate ($\Delta R_2/R_2$) are each as in the following equation.

$$\Delta R_2 = R_2/2 \times Ks \times \varepsilon \quad \text{(Equation 5)}$$

$$\Delta R_2/R_2 = \frac{1}{2} \times Ks \times \varepsilon \quad \text{(Equation 6)}$$

Therefore, as apparent from Equation 3 and Equation 6, the resistance change rate of the fourth electrode 82 is equivalent to one-half of a half resistance rate of the third electrode 42. In other words, only the difference in pattern can cause a difference between the resistance change rate of the third electrode 42 and the resistance change rate of the fourth electrode 82 during pressing.

Note that since the third electrodes 42 have the widths in the direction orthogonal to the extension direction that are not as wide as those of the fourth electrodes 82, a second electrode 32, the third electrodes 42, and the fourth electrodes 82 can be arranged closely. As a result, the detection accuracy of the pressed position and the pressing force can be increased.

(4-4) Change in Thickness of Fourth Electrode

Additionally, as illustrated in FIG. 5(*b*), it is more preferred that the width of the resistance line constituting the fourth electrodes 82 is narrowed at the overlapping portions 821 and widened at the folded-back portions 822, which connect the overlapping portions 821.

By widening the width of the folded-back portion 822 of the resistance line constituting the fourth electrodes 82 than the overlapping portion 821, the resistance change rate of the fourth electrode 82 detected during pressing becomes smaller than that in the case where the overlapping portion 821 and the folded-back portion 822 have the same width.

For example, assume that a resistance ratio of the overlapping portions 821 to the folded-back portions 822 before pressing is 2:1, the electrical resistance ($R_2'$) after the resistance change of the fourth electrodes 82 having the zigzag pattern where the width of the folded-back portions 822 is wider than the overlapping portions 821 has the relationship of the following equation with the original electrical resistance ($R_2$), the strain ($\varepsilon$), and the gauge ratio (Ks).

$$R_2' = 2R_2/3 + R_2/3(1+Ks\times\varepsilon) \quad \text{(Equation 7)}$$

$2R_2/3$ in the former term is the electrical resistance of the overlapping portion 821 after pressing and $R_2/3(1+Ks\times\varepsilon)$ of the latter term is the resistance of the folded-back portion 822 after pressing. That is, the amount of change in the electrical resistance ($\Delta R_2$) and the resistance change rate ($\Delta R_2/R_2$) are each as in the following equation.

$$\Delta R_2 = R_2/3 \times Ks \times \varepsilon \quad \text{(Equation 8)}$$

$$\Delta R_2/R_2 = \frac{1}{3} \times Ks \times \varepsilon \quad \text{(Equation 9)}$$

Therefore, as apparent from Equation 3 and Equation 9, the resistance change rate of the fourth electrode 82 is equivalent to one-third of a half resistance rate of the third electrode 42. In other words, since the difference between the resistance change rate of the third electrode 42 and the resistance change rate of the fourth electrode 82 during pressing increases, more accurate detection becomes easy further.

Also, by widening the width in the folded-back portion 822 of the resistance line, durability of the folded-back portion 822 against stress concentration increases.

The fourth electrode 82 of the present invention is preferably configured using the same material as that of the third electrode 42 as in the present embodiment.

According to this configuration, matching the resistance change rates of the third electrode 42 and the fourth electrode 82 due to temperature change becomes extremely easy.

Furthermore, the third electrode 42 and the fourth electrode 82 are preferably configured using the same material as that of the second electrode 32.

According to this configuration, refractive indices of the second electrode 32, the third electrode 42, and the fourth electrode 82 are all the same. Similarly, reflectances of the second electrode 32, the third electrode 42, and the fourth electrode 82 are all the same. As a result, a problem of pattern visualization between the second electrode 32, the third electrode 42, and the fourth electrode 82 can be suppressed. In addition, since the second electrodes 32, the third electrodes 42, and the fourth electrodes 82 can be formed on the second substrate 21 simultaneously, the number of steps can be reduced and the manufacturing processes can be simplified.

In the present embodiment, the third electrodes 42 disposed adjacent to one another are connected on the second substrate 31. More specifically, the third electrodes 42 disposed adjacent to one another in the Y-axis direction are connected in alternation by one side end portions and the other side end portions in the X-axis direction via a connection wiring line 45, and the plurality of third electrodes 42 are formed in the zigzag shape as a whole in plan view (see FIG. 4 and FIG. 7). Note that the connection wiring line 45 is configured using a metal such as gold, silver, copper, and nickel, or a conductive paste such as carbon.

In the present embodiment, the fourth electrodes 82 disposed adjacent to one another are connected on the second substrate 31. More specifically, the fourth electrodes 82 disposed adjacent to one another in the Y-axis direction are connected in alternation by one side end portions and the other side end portions in the X-axis direction via a connection wiring line 85, and thus the plurality of fourth electrodes 82 are formed in the zigzag shape as a whole in plan view (see FIG. 4 and FIG. 7). Note that the connection wiring line 85 is configured using a metal such as gold, silver, copper, and nickel, or a conductive paste such as carbon, similar to the connection wiring line 45 of the third electrode 42.

(5) Support Member

The support member 50 supports the panel member 10 from the back surface side (the side on which the third electrodes 42 and the fourth electrodes 82 are provided). The support member 50 supports the panel member 10 from the back surface side via the first electrode forming member 20 in which the first electrodes 22 are formed and the second electrode forming member 30 in which the second electrodes 32, the third electrodes 42, and the fourth electrodes 82 are formed. The support member 50 is formed in a frame shape. The support member 50 is formed in a rectangular frame shape in plan view so as to correspond to the shape of the support portion 3*b* of the housing 3. The support member 50 is provided to support peripheral edge portions (near the respective sides) of the panel member 10 and the respective electrode forming members 20 and 30 formed in the rectangular shape. The support member 50 is preferably configured using a material having both elasticity or flexibility and a fixed shape property to the extent of ensuring appropriately supporting, for example, the panel member 10.

Here, in particular, the support member 50 is preferably constituted by a material softer than the material constituting the panel member 10. Note that "softness" is a measurement representing a magnitude of an amount of deformation against stress, and is evaluated based on the Young's modulus in the present application. In other words, the support member 50 is preferably constituted of a material having the Young's modulus smaller than that of the material constituting the panel member 10. For example, the material has the Young's modulus of 1 M·Pa or less, and preferably from 0.5 M·Pa to 1 M·Pa.

Examples of the material that meets such requirement include, for example, urethane foam, acrylic foam, silicon rubber, sponge, and gel. For example, a double-sided tape having an adhesive layer on both surfaces may be used. The width dimension of each side constituting the rectangular frame-shaped support member 50 in plan view is preferably set as narrow as possible within a range in which, for example, the panel member 10 can be appropriately supported. The width of the support member 50 can be, for example, from 0.4 mm to 2 mm. In addition, the thickness of the support member 50 is preferably set to be relatively thick such that a displacement width due to elastic deformation of the panel member 10 and the respective electrode forming members 20 and 30 can be absorbed. The thickness of the support member 50 is preferably, for example, from 0.1 mm to 0.4 mm.

The panel member 10 on which the first electrodes 22, the second electrodes 32, the third electrodes 42, and the fourth electrodes 82 are disposed is supported to the support portion 3b of the housing 3 via the soft and relatively thick frame-shaped support member 50. At this time, when the user touches the operating surface 10a of the panel member 10 with, for example, the finger, the panel member 10 elastically deforms so as to entirely protrude toward a counter operating surface side while the portion on the inner periphery side in the frame-shaped support member 50 deforms (see FIG. 7). In other words, the support configuration of the panel member 10 by the support member 50 is a simple support type. This allows suppressing local deformation of only a part of the panel member 10 (specifically, in the vicinity of the supported portion supported by the support member 50) and shrinkage deformation of the third electrode 42. In other words, the deformation (the posture change) of the third electrode 42 can be substantially only an elongation deformation.

(6) Control Device of Sensor

Figure 6:
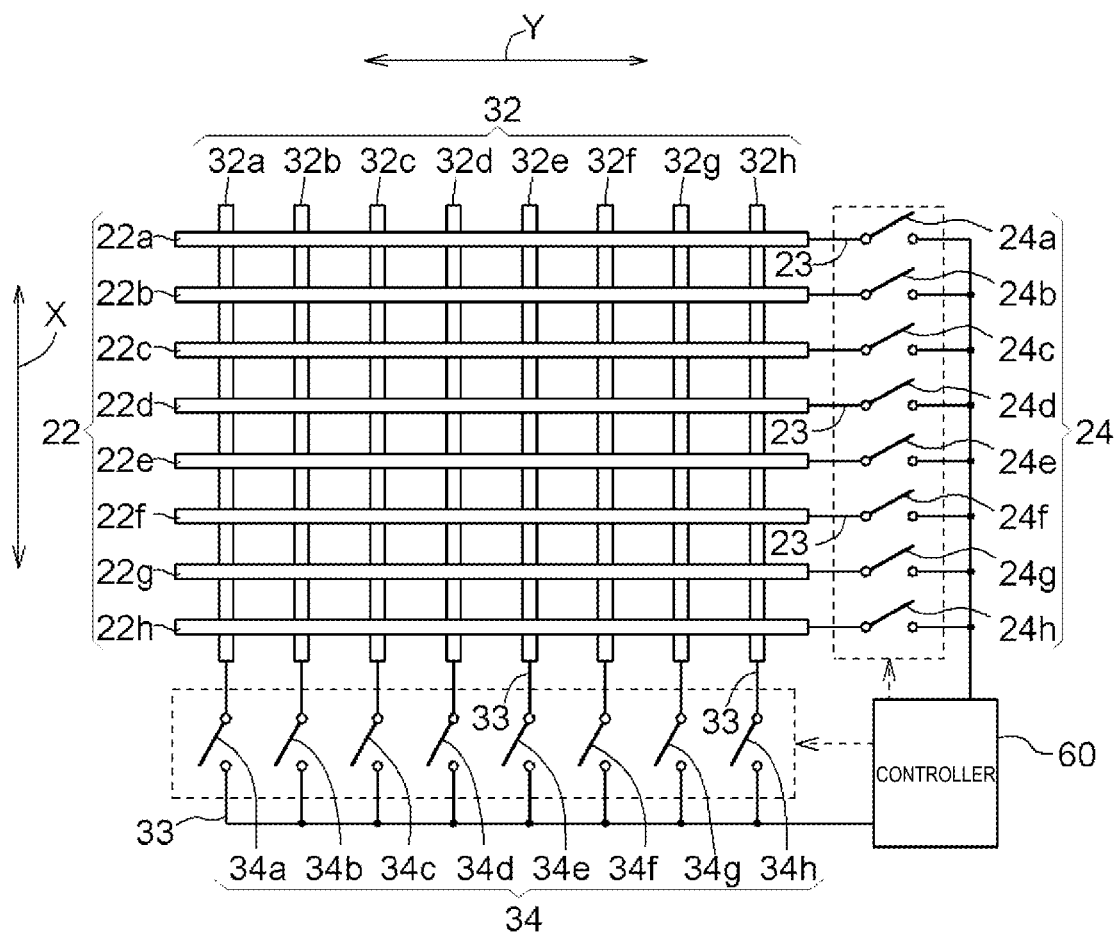
FIG. 6 is a schematic diagram illustrating a connection relationship between respective first electrodes and respective second electrodes and a controller.

As illustrated in FIG. 6, each of the plurality of first electrodes 22 is connected to a controller 60 via a lead wiring line 23. Switches 24 are provided on the respective lead wiring lines 23 extending from the plurality of first electrodes 22. The switch 24 is configured using a switching element in the present embodiment.

Each of the plurality of second electrodes 32 is connected to the controller 60 via a lead wiring line 33. Switches 34 are provided on the respective lead wiring lines 33 extending from the plurality of second electrodes 32. The switch 34 is configured using a switching element in the present embodiment.

Figure 7:
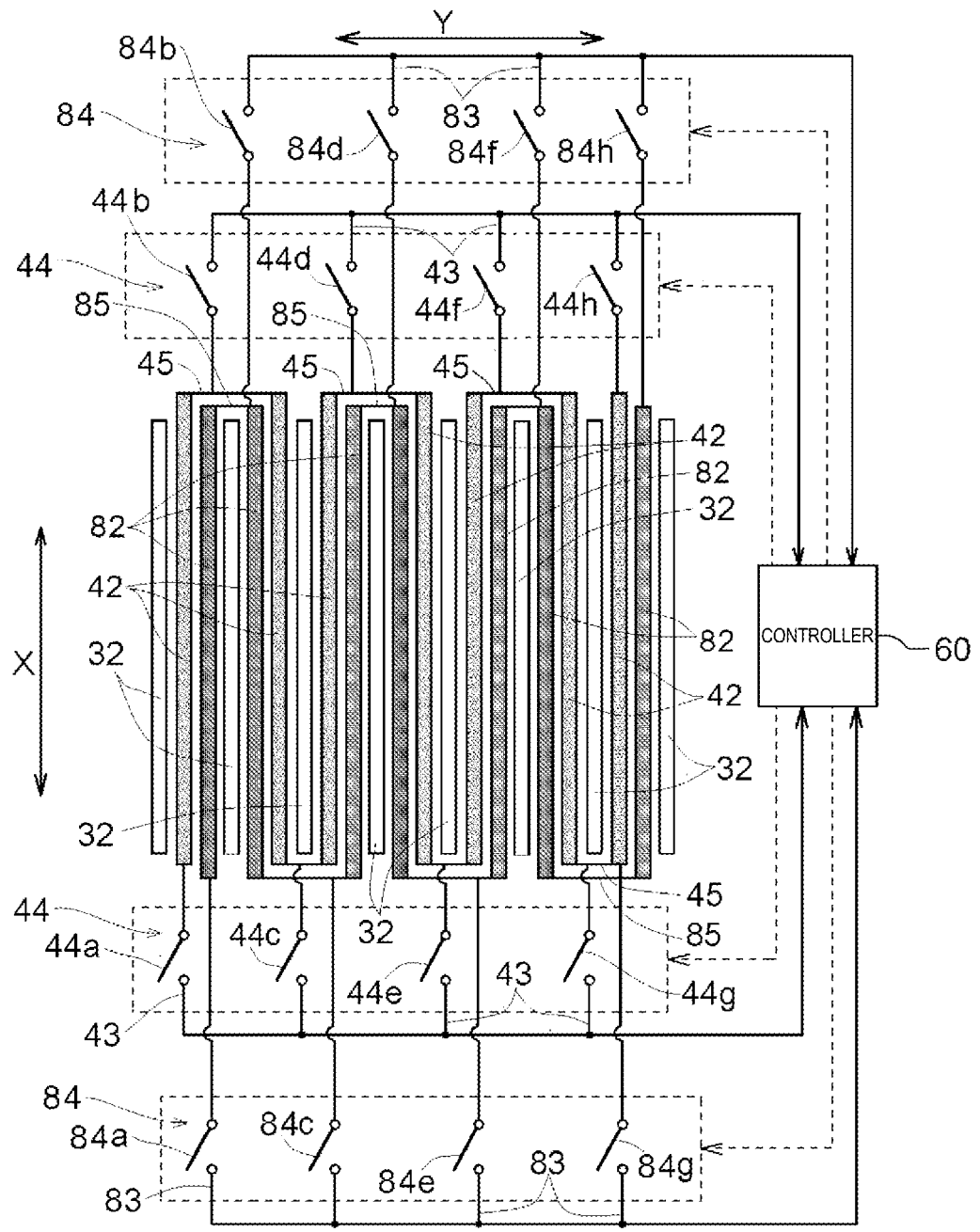
FIG. 7 is a schematic diagram illustrating a connection relationship between respective third electrodes and respective fourth electrodes and the controller.

As illustrated in FIG. 7, the respective both end portions of the plurality of third electrodes 42 connected to one as a whole are connected to the controller 60 via lead wiring lines 43. Further, the respective connection wiring lines 45 between the third electrodes 42 adjacent to one another are also connected to the controller 60 via the lead wiring lines 43. Switches 44 are provided on both end portions in the Y-axis direction of the third electrodes 42 and the respective lead wiring lines 43 extending from the respective connection wiring lines 45. The switch 44 is configured using a switching element in the present embodiment.

As illustrated in FIG. 7, the respective both end portions of the plurality of fourth electrodes 82 connected to one as a whole are connected to the controller 60 via lead wiring lines 83. Further, the respective connection wiring lines 85 between the fourth electrodes 82 adjacent to one another are also connected to the controller 60 via the lead wiring lines 83. Switches 84 are provided on both end portions in the Y-axis direction of the fourth electrodes 82 and the respective lead wiring lines 83 extending from the respective connection wiring lines 85. The switch 84 is configured using a switching element in the present embodiment.

(6-1) Switching Element

Examples of switching elements include an insulated gate bipolar transistor (IGBT), a metal oxide semiconductor field effect transistor (MOSFET), and a gate turn-off thyristor (GTO). Note that the lead wiring lines 23, 33, 43, and 83 are configured using a metal such as gold, silver, copper, and nickel, or a conductive paste such as carbon. Each switching element constituting the switch 24, 34, 44, or 84 is connected to the controller 60 via a control signal line.

(6-2) Controller

Figure 8:
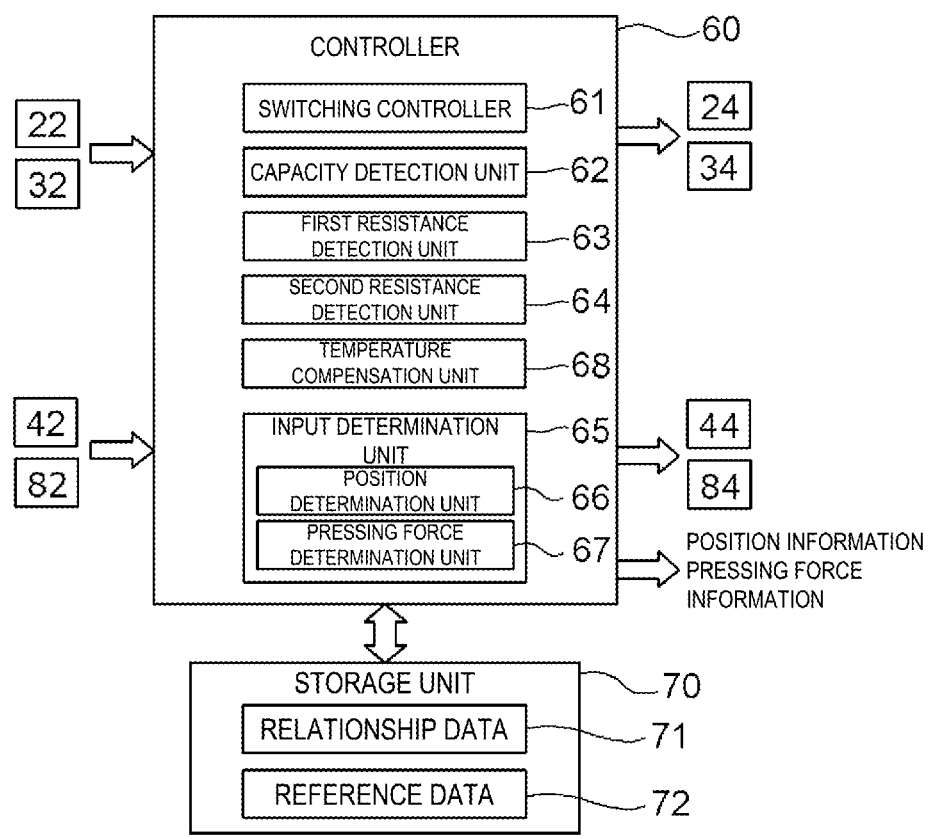
FIG. 8 is a block diagram illustrating a configuration of the controller.

The controller 60 includes an arithmetic processing device, such as a central processing unit (CPU), as a core member, and is configured by hardware or software (programs) or both of them as a function unit for performing various processes on input data. As illustrated in FIG. 8, the controller 60 includes a switching controller 61, a capacitance detection unit 62, a first resistance detection unit 63, a second resistance detection unit 64, a temperature compensation unit 68, and an input determination unit 65. The input determination unit 65 includes a position determination unit 66 and a pressing force determination unit 67. Furthermore, the controller 60 is connected to a storage unit 70 to ensure communications of information. The storage unit 70 is constituted of a memory, such as Random Access Memory (RAM) and Electrically Erasable Programmable Read Only Memory (EEPROM). The storage unit 70 stores relationship data 71 and reference data 72.

(6-2-1) Switching Controller

The switching controller 61 controls on/off of the switching elements constituting the switches 24 and 34. For example, with the switches 24 and 34 configured by IGBTs, the switching controller 61 individually generates a gate drive signal for each IGBT to control on/off of each IGBT. The case of using the other switching elements can be considered similarly. For example, the switching controller 61 sets the IGBT constituting a switch 24a corresponding to a first electrode 22a to the on state to selectively connect the first electrode 22a to the capacitance detection unit 62. For example, the switching controller 61 sets the IGBT constituting a switch 24b corresponding to a first electrode 22b to the on state to selectively connect the first electrode 22b to the capacitance detection unit 62. The other first electrodes 22c to 22h (switches 24c to 24h) can be considered similarly. The other second electrodes 32a to 32h (switches 34a to 34h) can be considered similarly.

In the present embodiment, the switching controller 61 controls each of the switches 24a to 24h such that any one of the switches 24a to 24h is sequentially in an on state. It is performed successively and repeatedly. As a result, the first electrodes 22a to 22h are each sequentially and selectively connected to the capacitance detection unit 62. The switching controller 61 controls each of the switches 34a to 34h such that any one of the switches 34a to 34h is sequentially in an on state. It is performed successively and repeatedly. As a result, the second electrodes 32a to 32h are each sequentially and selectively connected to the capacitance detection unit 62.

The switching controller 61 controls on/off of the switching elements constituting the switches 44 and 84. For example, with the switches 44 and 84 configured by IGBTs, the switching controller 61 individually generates a gate drive signal for each IGBT to control on/off of each IGBT. In the present embodiment, the switching controller 61 controls respective switches 44a to 44h such that any two of the switches 44a to 44h are in the on state. The switching controller 61 sets, for example, the IGBTs constituting the switch 44a corresponding to the third electrode 42a and the switch 44h corresponding to the third electrode 42g to the on state to collectively connect the plurality of third electrodes 42 connected to one as a whole to the resistance detection unit 63. For example, the switching controller 61 sets the IGBTs constituting the switch 44a and the switch 44b corresponding to both ends of the third electrode 42a to the on state to selectively connect the third electrode 42a to the resistance detection unit 63. For example, the switching controller 61 sets the IGBTs constituting the switch 44b and the switch 44c corresponding to both ends of the third electrode 42b to the on state to selectively connect the third electrode 42b to the resistance detection unit 63. The other third electrodes 42c to 42g (switches 44c to 44h) can be considered similarly. The fourth electrodes 82a to 82g (switches 84a to 84h) can be considered similarly.

(6-2-2) Capacitance Detection Unit

In the present embodiment, the capacitance detection unit 62 detects a capacitance (a self-capacitance) of each of the plurality of first electrodes 22 and the plurality of second electrodes 32. As such, the capacitance detection unit 62 is configured including the known capacitance detection circuit. The capacitance detection unit 62 sequentially detects the capacitance of each of the first electrodes 22a to 22h selectively connected by the switching controller 61. The capacitance detection unit 62 sequentially detects the capacitance of each of the second electrodes 32a to 32h selectively connected by the switching controller 61. Scanning of each of the first electrodes 22 and scanning of each of the second electrodes 32 may be performed in synchronization or in alternation. Note that a detection method of a mutual method may be employed. In this case, the capacitance detection unit 62 detects a capacitance (a mutual capacitance) between each of the first electrodes 22 and each of the second electrodes 32. The use of the mutual method allows multi-touch correspondence. The information of the detected value by the capacitance detection unit 62 is transmitted to the input determination unit 65 (the position determination unit 66).

(6-2-3) First/Second Resistance Detection Units

The first resistance detection unit 63 detects electrical resistances of the plurality of third electrodes 42. The second resistance detection unit 64 detects electrical resistances of the plurality of fourth electrodes 82. Thus, the first resistance detection unit 63 and the second resistance detection unit 64 are configured to include resistance detection circuits. The resistance detection circuit is constituted by the known bridge circuit (a Wheatstone bridge circuit). The first resistance detection unit 63 detects the electrical resistance (the resistance) based on the entire or individual voltage between both ends of the third electrodes 42 selectively connected by the switching controller 61. The second resistance detection unit 64 detects the electrical resistance (the resistance) based on the entire or individual voltage between the both ends of the fourth electrodes 82 selectively connected by the switching controller 61. The first resistance detection unit 63 detects the resistance of the third electrode 42 provided between the two switches 44 that are set to the on state. In the case where there are a plurality of the third electrodes 42 between the two switches 44 that are set to the on state, the first resistance detection unit 63 detects the entire resistance of them. The second resistance detection unit 64 detects the resistance of the fourth electrode 82 provided between the two switches 84 that are set to the on state. In the case where there are a plurality of the fourth electrodes 82 between the two switches 84 that are set to the on state, the second resistance detection unit 64 detects the entire resistance of them. The information of the detected values by the first resistance detection unit 63 and the second resistance detection unit 64 is transmitted to the temperature compensation unit 68.

(6-2-4) Temperature Compensation Unit

The temperature compensation unit 68 corrects the detection result by the first resistance detection unit 63 based on the detection result by the second resistance detection unit 64. The information of the corrected value by the temperature compensation unit 68 is transmitted to the input determination unit 65 (the pressing force determination unit 67).

Figure 9A:
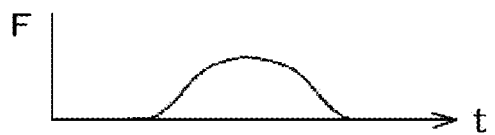
FIGS. 9(a) to 9(e) are graphs illustrating examples of corrections in a temperature compensation unit.
Figure 9B:
Figure 9C:
Figure 9D:
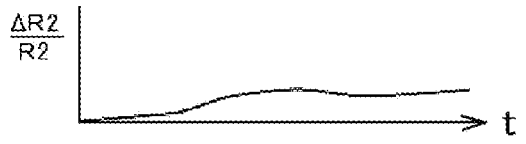
Figure 9E:
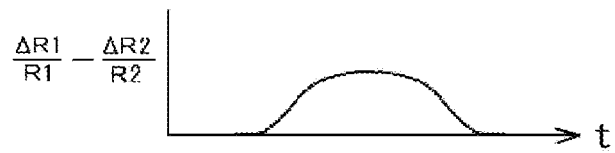

An operation of the temperature compensation unit 68 will be described below using FIGS. 9(a) to 9(e). FIGS. 9(a) to 9(e) are graphs for describing temperature compensation control. In detail, FIG. 9(a) is a graph of a pressing force F with respect to a time course. FIG. 9(b) is a graph of a temperature change ΔT due to heat of the finger when the finger contacts the operating surface with respect to a time course. FIG. 9(c) is a graph illustrating a change in a resistance change rate $\Delta R_1/R_1$ of the third electrode 42 output from the first resistance detection unit 63 with respect to a time course. FIG. 9(d) is a graph illustrating a change in a resistance change rate $\Delta R_2/R_2$ of the fourth electrode 82 output from the second resistance detection unit 64 with respect to a time course. FIG. 9(e) is a graph illustrating a change in a resistance $\Delta R_1/R_1 - \Delta R_2/R_2$ output from the temperature compensation unit 68 with respect to a time course.

As illustrated in FIG. 9(c), the resistance change rate $\Delta R_1/R_1$ of the third electrode 42 measured by the first resistance detection unit 63 changes in an upper projection shape that especially rapidly increases while gradually increasing over time wholly. However, as illustrated in FIG. 9(a), the actual pressing force F changes in an upper projection shape that rapidly increases from zero and further rapidly decreases to zero. As illustrated in FIG. 9(b), the temperature change ΔT caused by the transmission of heat of the finger when the finger contacts the operating surface increases proportionally to the time course during pressing. Therefore, not only the amount of the change in the resistance according to the posture change of the third electrode 42, but also the amount of the change in the resistance according to the temperature change is added, making a change in resistance $\Delta R_1$ [Ω] of the third electrode 42.

On the other hand, as illustrated in FIG. 9(d), the resistance change rate $\Delta R_2/R_2$ of the fourth electrode 82 measured by the second resistance detection unit 64 changes in an upper projection shape that especially gradually increases while increasing over time wholly. In this case as well, similarly to the third electrode 42, not only the amount of the change in the resistance according to the posture change of the fourth electrode 82, but also the amount of the change in the resistance according to the temperature change is added, making a change in resistance $\Delta R_2$ [Ω] of the fourth electrode 82.

Note that the resistance change rate of the fourth electrode 82 due to the temperature change is the same as the resistance change rate of the third electrode 42 due to the temperature change, and the resistance change rate of the fourth electrode 82 due to the posture change is 90% or less of the resistance change rate of the third electrode 42 due to the posture change during posture change at the normal temperature.

Thus, the temperature compensation unit 68 corrects the resistance change rate $\Delta R_1/R_1$ of the third electrode 42 illustrated in FIG. 9(c) based on the resistance change rate $\Delta R_2/R_2$ of the fourth electrode 82 illustrated in FIG. 9(d). More specifically, the temperature compensation unit 68 subtracts the resistance change rate $\Delta R_2/R_2$ of the fourth electrode 82 from the resistance change rate $\Delta R_1/R_1$ of the third electrode 42 before correction. As a result, as illustrated in FIG. 9(e), an output signal indicating a change of the upper projection shape that rapidly increases from zero and further rapidly decreases to zero is obtained.

More preferably, the resistance change rate of the fourth electrode 82 due to the posture change is 50% or less of the resistance change rate of the third electrode 42 due to the posture change during posture change at the normal temperature. More preferably, it is 10% or less.

(6-2-5) Position Determination Unit

The position determination unit 66 included in the input determination unit 65 determines the pressed position on the X-Y coordinate system on the operating surface 10a based on the detection result by the capacitance detection unit 62. In the present embodiment, the position determination unit 66 identifies the first electrode 22 that gives the maximum (the local maximum when the touch operation is performed on a plurality of positions) change in the capacitance among the plurality of first electrodes 22 during the touch operation on the operating surface 10a with the capacitance in a state where, for example, the finger of the user is sufficiently separated as a criterion to determine the X coordinate of the touch position.

The position determination unit 66 identifies the second electrode 32 that gives the maximum (or the local maximum) change in the capacitance among the plurality of second electrodes 32 during the touch operation on the operating surface 10a with the capacitance in a state where, for example, the finger of the user is sufficiently separated as a criterion to determine the Y coordinate of the touch position. In the mutual method, the position determination unit 66 determines the X coordinate and the Y coordinate of the touch position based on the amount of change in mutual capacitance between each first electrode 22 and each second electrode 32. Note that the position determination unit 66 preferably performs an interpolation calculation using the capacitance actually detected by the capacitance detection unit 62 to identify the touch position more minutely based on the calculation result.

(6-2-6) Pressing Force Determination Unit

Figure 10:
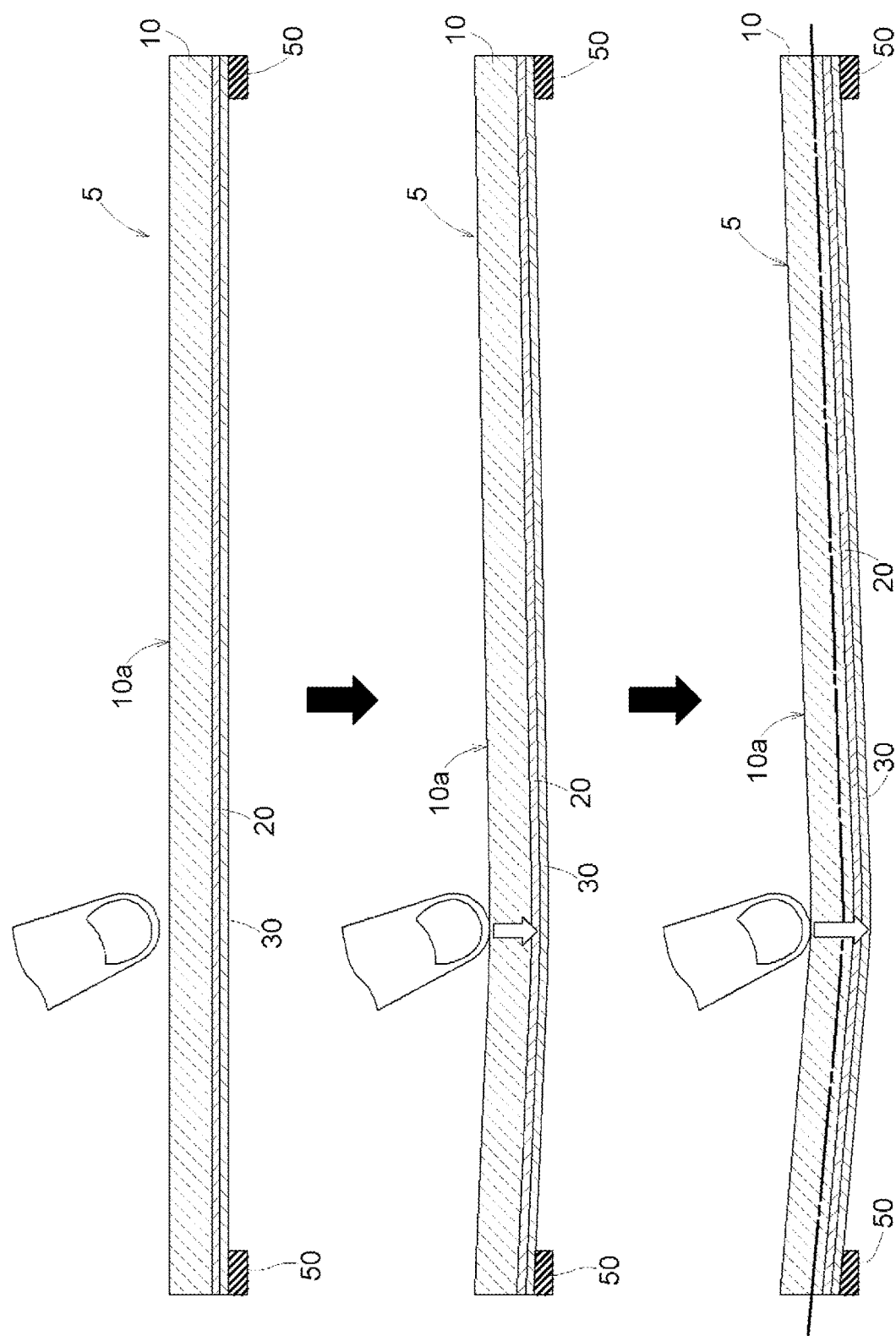
FIG. 10 includes schematic views illustrating a deformation of the touch panel accompanied by a pressing operation.
Figure 11:
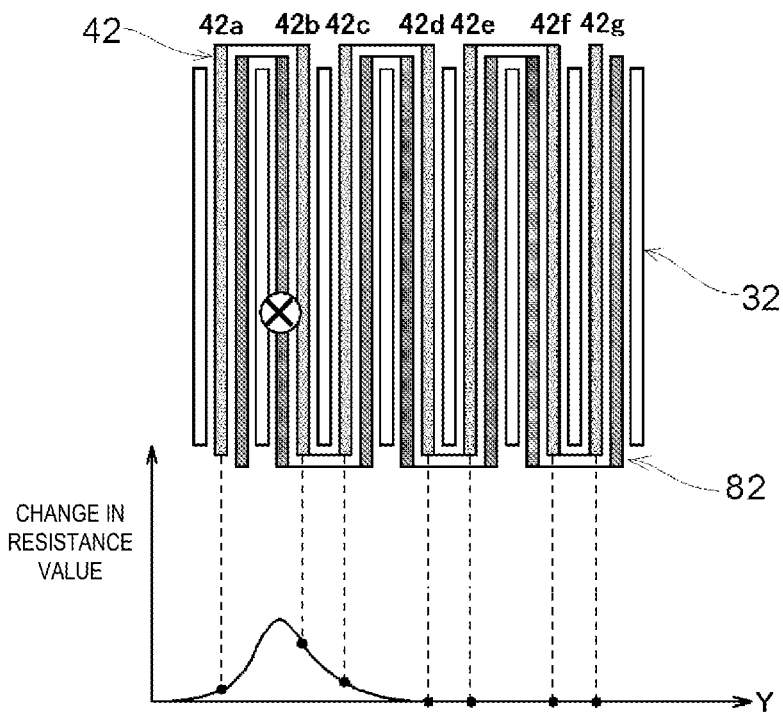
FIG. 11 is a schematic view illustrating an example of a resistance detected at each third electrode accompanied by the pressing operation.
Figure 12:
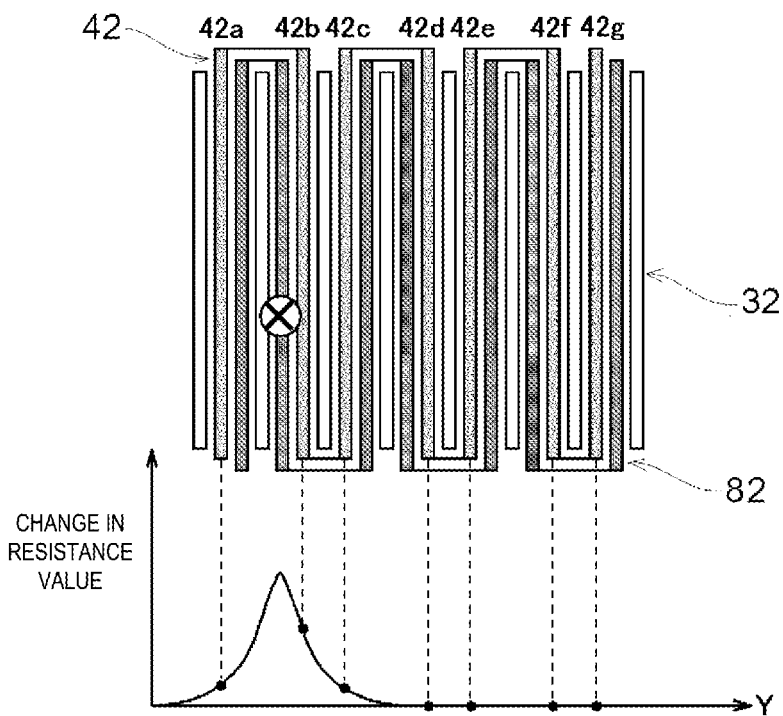
FIG. 12 is a schematic view illustrating an example of a resistance detected at each third electrode accompanied by the pressing operation.

The pressing force determination unit 67 included in the input determination unit 65 determines the pressing force on the operating surface 10a based on a value after correction of the detection result by the first resistance detection unit 63 by the temperature compensation unit 68. Here, FIG. 10 schematically illustrates a state in which the finger of the user gradually approaches the operating surface 10a and then pressing the operating surface 10a by a gradually increasing force. FIG. 11 schematically illustrates a relationship between the pressed position (the position denoted by "X") in the state of the middle stage in FIG. 10 and the resistance change after correction by the temperature compensation unit 68 in each of the third electrodes 42a to 42g detected by the first resistance detection unit 63. FIG. 12 schematically illustrates a relationship between the pressed position in the state of the lower stage in FIG. 10 and the resistance change after correction by the temperature compensation unit 68 in each of the third electrodes 42a to 42g detected by the first resistance detection unit 63. For the sake of convenience of explanation, an example in which the resistance of each of the third electrodes 42a to 42g is individually detected even in a single touch is described here.

As can be readily understood from these drawings, the resistance change is large at the third electrode 42 closer to the pressed position in the Y-axis direction and where the degree of deformation (the posture change) is large, and the resistance change is small at the third electrode 42 farther from the pressed position. The resistance change of the third electrode 42 separated by a predetermined distance or greater from the pressed position in the Y-axis direction is converged on approximately zero. Note that the change in the resistance value is a difference between a resistance (a reference resistance) of each of the third electrodes 42 in a state where the operating surface 10a is not pressed at all (a non-pressed state) and the actually measured resistance of each of the third electrodes 42 in a state where a part of the operating surface 10a is pressed (a pressed state). In other words, the resistance change represents a change in an absolute amount of the resistance of the third electrode 42 when the pressing force is applied, and the value may be positive or negative. In addition, as can be readily understood from the comparison between FIG. 11 and FIG. 12, as the force of pressing the operating surface 10a increases and the degree of deformation (the posture change) of the touch panel 5 increases, the resistance change at each third electrode 42 increases. Therefore, obtaining the relationship between the pressing force on the operating surface 10a and the resistance change in advance allows quantitatively evaluating the pressing force on the operating surface 10a from the actual amount of change in the resistance.

(6-2-7) Storage Unit

Figure 13:
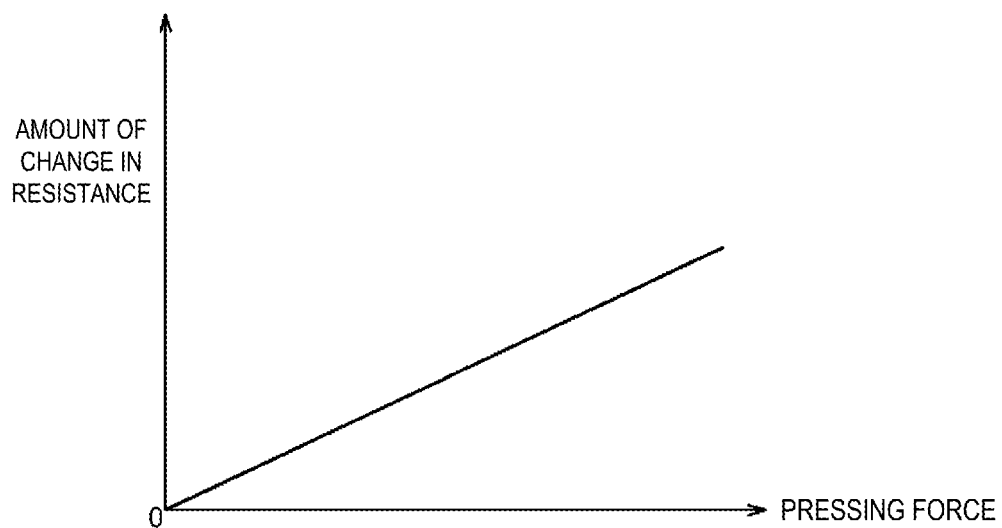
FIG. 13 is a relationship map illustrating a relationship between an amount of change in a resistance and a pressing force.

In the present embodiment, the relationship data 71 that defines a correlation between the pressing force on the operating surface 10a and the amount of change in the resistance from the non-pressed state is provided by being preliminarily stored in the storage unit 70. The relationship data 71 may be, for example, in the form of a relationship map illustrated in FIG. 13, or may be a form of a predetermined relational expression. The reference data 72 obtained by preliminarily measuring the resistance (the reference resistance) of each of the third electrodes 42 in the non-pressed state is provided by being stored in the storage unit 70. The pressing force determination unit 67 determines the pressing force according to the actual amount of change in the resistance based on the relationship data 71 and the actually detected resistance change (the difference between the actual resistance value and the reference resistance). Note that "the actual amount of change in the resistance" is an amount of change at each position when the pressing operation is performed on a plurality of positions. As a result, the pressing force at each pressed position can be individually determined. In other words, multi-force correspondence is possible.

Additionally, "the actual amount of change in the resistance" may be selected among the values detected actually (the actually detected values), or may be an estimated value calculated based on the actually detected values. For example, the pressing force determination unit 67 may determine the pressing force according to the amount of change in the resistance of the third electrode 42 that gives the maximum (the local maximum when the pressing operation is performed on a plurality of positions) resistance change among the plurality of third electrodes 42 during pressing operation on the operating surface 10*a* with the electrical resistance detected in the non-pressed state as a criterion. With such a configuration, the pressing force on the operating surface 10*a* can be determined by relatively simple arithmetic processing. Alternatively, the pressing force determination unit 67 may obtain estimated resistances at respective positions in the Y-axis direction from the relationship between the positions in the Y-axis direction of the plurality of third electrodes 42 and the resistances actually detected during pressing operations, and determine the pressing force according to the peak values of the estimated resistances. This allows determining the pressing force on the operating surface 10*a* more minutely.

(7). Others

In the present embodiment, the third electrodes 42 and the fourth electrodes 82 are formed on the second electrode forming member 30, which is the member disposed on the side opposite to the panel member 10 among the first electrode forming member 20 and the second electrode forming member 30. In other words, the third electrodes 42 and the fourth electrodes 82 are disposed between the second electrodes 32, which are the electrodes disposed on the side opposite to the panel member 10 among the first electrodes 22 and the second electrodes 32. Compared to the first electrodes 22, the second electrodes 32 are disposed at positions further away from a neutral axis (indicated by the thick dash-dotted line in the lower stage in FIG. 10) of a touch panel body portion formed of the panel member 10, the first electrode forming member 20, and the second electrode forming member 30. As a result, the degree of deformation (posture change) when the pressing force is applied on the operating surface 10*a* and the touch panel body portion is elastically deformed integrally is larger in the second electrodes 32 than in the first electrodes 22. Thus, disposing the third electrodes 42 and the fourth electrodes 82 between the second electrodes 32, not between the first electrodes 22, allows relatively increasing the degree of deformation (posture change) of the third electrodes 42 and the fourth electrodes 82. As a result, the detection sensitivity can be increased and the detection accuracy of the pressing force can be increased.

Figure 14:
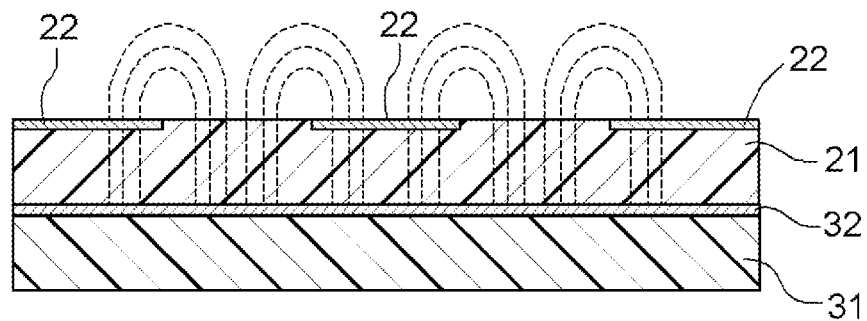
FIG. 14 is a conceptual diagram illustrating a state of electric lines of force between a second electrode and first electrodes.

In addition, the arrangement configuration of the third electrodes 42 is also advantageous in the case where the mutual method is employed as the detection method in detecting the touch position by the position determination unit 66. As illustrated in FIG. 14, it has been known that the electric lines of force from the second electrode 32 as a transmitting electrode to the first electrodes 22 as receiving electrodes pass between the first electrodes 22. On the other hand, such electric lines of forces do not pass between the second electrodes 32. Thus, disposing the third electrodes 42 between the second electrodes 32, not between the first electrodes 22, allows avoiding a negative effect on the detection of the touch position by the position determination unit 66.

In addition, as described above, in the present embodiment, the panel member 10 on which the respective electrodes 22, 32, 42, and 82 are disposed is supported via the soft and thick frame-shaped support member 50. Thus, the support configuration of the panel member 10 by the support member 50 is the simple support type, and the deformation (the posture change) of the third electrodes 42 can be substantially only the elongation deformation. As a result, the detection accuracy of the pressing force can be further increased.

In this way, the input determination unit 65 determines the pressed position on the X-Y coordinate system on the operating surface 10*a* based on the detection result by the capacitance detection unit 62, and determines the pressing force on the operating surface 10*a* based on the detection results by the first resistance detection unit 63 and the second resistance detection unit 64. This allows achieving the touch panel 5 having a pressure sensitive function, in addition to the usual position detection function. At this time, in the present embodiment, by the use of a One Glass Solution (OGS) technology forming the four electrodes 22, 32, 42, and 82 on the panel member 10 made from the thin glass plate, the thin touch panel 5 is achieved.

Furthermore, in the present embodiment, the third electrode 42 for achieving the pressure sensitive function and the fourth electrode 82 for temperature compensation of the detection results of the third electrode 42 are adjacently disposed between any of the second electrodes 32 for achieving the position detection function. In other words, by effectively using the regions between the second electrodes 32 adjacent to one another in the Y-axis direction, the third electrodes 42 and the fourth electrodes 82 are disposed in the same plane as the second electrodes 32. Thus, even in a case where the third electrodes 42 and the fourth electrodes 82 are added to provide the pressure sensitive function to the capacitive touch panel 5 including the first electrodes 22 and the second electrodes 32, the thickness as the entire device does not increase. In particular, compared to a case where the pressure sensitive sensor is separately provided so as to be layered, the thickness as the entire device can be significantly reduced. In other words, the touch panel 5 that has the pressure sensitive function and is thinner than the conventional touch panels can be achieved.

In the present embodiment, the plurality of third electrodes 42 are connected to one another, connected to one as a whole, and formed in the zigzag shape in plan view. The on/off control of each of the switches 44*a* to 44*g* switches a mode between a mode for detecting the overall resistance of the plurality of third electrodes 42 (an overall detection mode) and a mode for detecting the individual resistance of each of the third electrodes 42 (an individual detection mode) (see FIG. 7). In the overall detection mode, the magnitude of the pressing force on the operating surface 10*a* can be easily determined in a constant state regardless of the touch position without dynamically controlling the on/off of each of the switches 44*a* to 44*g*. The overall detection mode is effective in the case of the single touch where the operating surface 10*a* is contacted by only one point. On the other hand, for example, in the case of a multi-touch in which the operating surface 10*a* is contacted by multiple points, the mode is switched to the individual detection mode and scanning is performed on the respective third electrodes 42. In this way, the pressing force at each touch position can be individually determined. In other words, multi-force correspondence is possible. By switching the detection mode based on whether the single touch or the multi-touch is performed, the scanning time of the third electrodes 42 can be reduced to the minimum necessary, and the power consumption can be reduced.

Similar to the description in the previous paragraph, the plurality of fourth electrodes 82 are connected to one another, connected to one as a whole, and formed in the zigzag shape in plan view. The on/off control of each of the switches 84*a* to 84*g* switches a mode between the mode for detecting the overall resistance of the plurality of fourth electrodes 82 (the overall detection mode) and the mode for detecting the individual resistance of each of the fourth electrodes 82 (the individual detection mode) (see FIG. 7).

Figure 15:
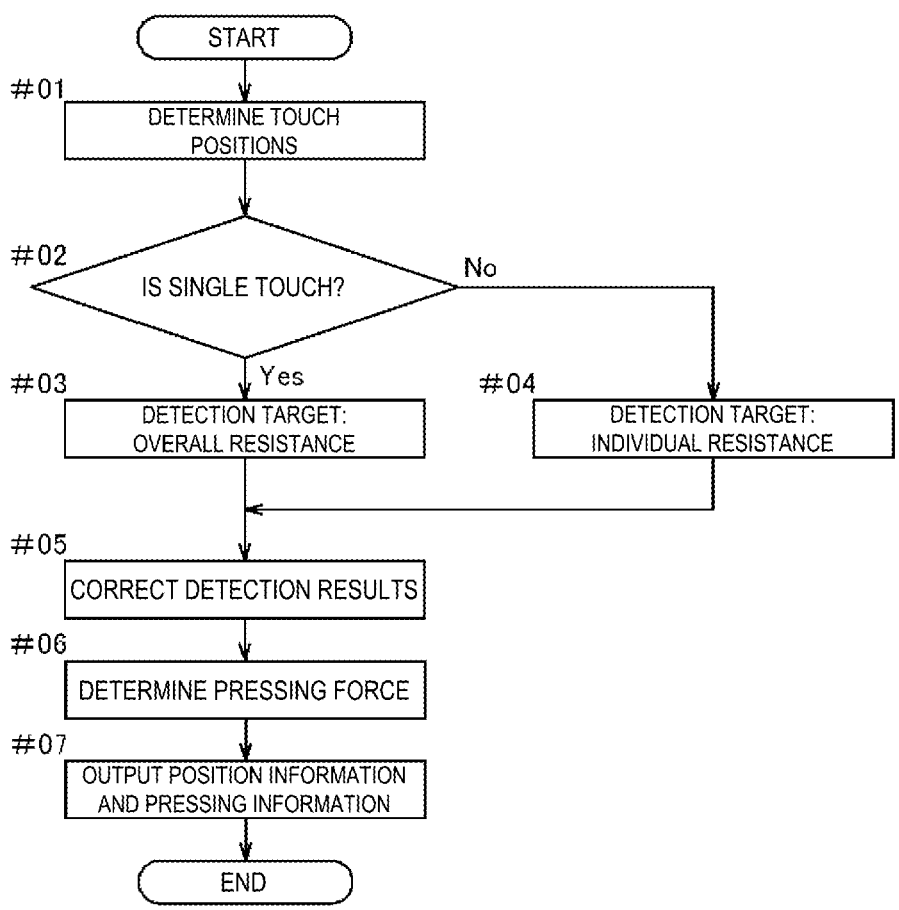
FIG. 15 is a flowchart depicting a flow of detection processes of a pressed position and the pressing force.

The flowchart in FIG. 15 depicts the flow of the detection processes of the pressed position and the pressing force in this case. First, based on the capacitance of each electrode 22, 32, the touch positions and the number of touch positions on the operating surface 10a are determined (step #01). Whether the touch operation on the operating surface 10a is the single touch or not is determined (step #02). In the case of the single touch (step #02: Yes), the switches 44a and 44h and the switches 84a and 84h are set to the on state, and the resistance between both ends of one third electrode 42 as a whole and the resistance between both ends of one fourth electrode 82 as a whole are each detected (step #03). The overall resistance of the third electrodes 42 is corrected by temperature compensation with the overall resistance of the fourth electrodes 82 (step #05). The pressing force on the operating surface 10a is determined based on the overall resistance after correction of the third electrode 42 (step #06). On the other hand, in the case of the multi-touch (step #02: No), the two specified ones among the switches 44a to 44h are sequentially turned on and the resistance between both ends of each of the third electrodes 42 is sequentially detected (step #04). The individual resistance of each third electrode 42 is corrected by temperature compensation with the individual resistance of each fourth electrode 82 (step #05). Based on the individual resistance of each third electrode 42 after correction, the pressing force on the operating surface 10a is determined individually (step #06). The position information and the pressing force information derived in this manner are output to the electronic device 1 (step #07). The electronic device 1 performs various processes according to an application based on the position information and the pressing force information.

2. Second Embodiment

In the first embodiment, the configuration in which the difference of the linear pattern and the zigzag pattern between the third electrodes 42 and the fourth electrodes 82 generates the difference between the resistance change rate of the third electrode 42 and the resistance change rate of the fourth electrode 82 has been described as an example.

However, in the embodiment of the present invention, it is only necessary that the resistance change rate of the fourth electrode 82 due to the temperature change is the same as the resistance change rate of the third electrode due to the temperature change, and the resistance change rate of the fourth electrode 82 due to the posture change is 90% or less of the resistance change rate of the third electrode 42 due to the posture change during the posture change at the normal temperature.

For example, in the present embodiment, when a material having the resistance change rate due to temperature change the same as that of the other electrode material and having a different resistance change rate due to the posture change is used as the electrode material of one of the third electrodes 42 and the fourth electrodes 82, the third electrodes 42 and the fourth electrodes 82 can be a pattern having the same shape and the same size (not illustrated).

3. Third Embodiment

In the present embodiment, among the first electrodes 22 and the second electrodes 32, a pattern of the electrodes formed on the same surface as the third electrodes 42 and the fourth electrodes and 82 (the second electrodes 32 in the examples in FIG. 18 and FIG. 19) is a mesh pattern having rectangular lattices 323 formed of thin lines in the X-axis direction and the Y-axis direction. In the present embodiment, the lattice is a square or a rectangle.

In addition, a rectangular region 823 having one set of the adjacent overlapping portions 821 of the pattern of the fourth electrode 82 as opposed sides and the lattice 323 in the mesh pattern have the same shape or approximate shape and the same or approximate size.

Furthermore, the electrodes having the mesh pattern (the second electrodes 32 in the examples of FIG. 18 and FIG. 19), the third electrodes 42, and the fourth electrodes 82 are in proximity, and the lattices 323 and the rectangular regions 823 are regularly arrayed as a whole.

The other points are similar to the first embodiment.

According to this configuration, the rectangular region 823 having one set of the adjacent overlapping portions 821 of the pattern of the fourth electrode 82 as the opposed sides is visually assimilated with the lattice 323 of the mesh pattern.

Figure 18:
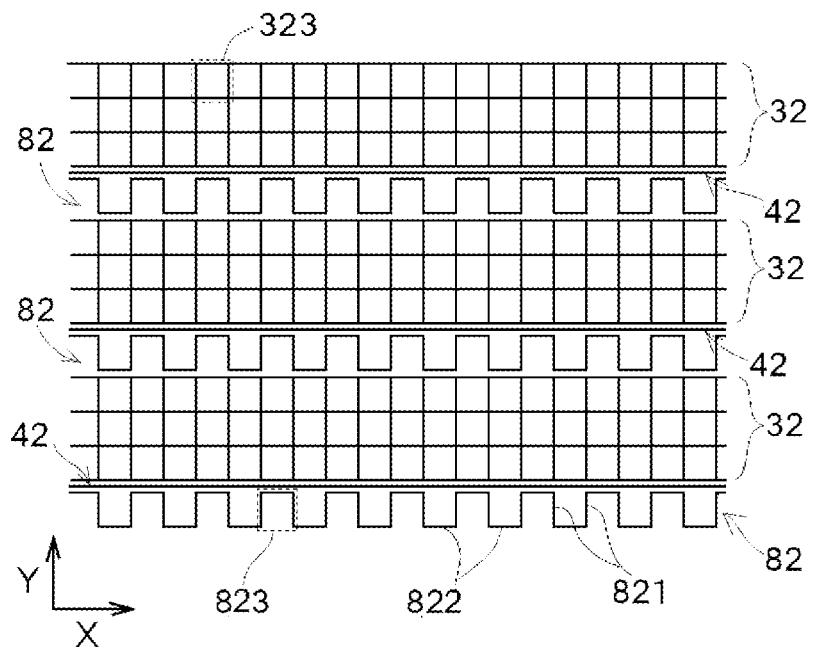
FIG. 18 is a partially enlarged view illustrating an aspect of visual assimilation of the third electrodes and the fourth electrodes with electrodes having a mesh pattern.
Figure 19:
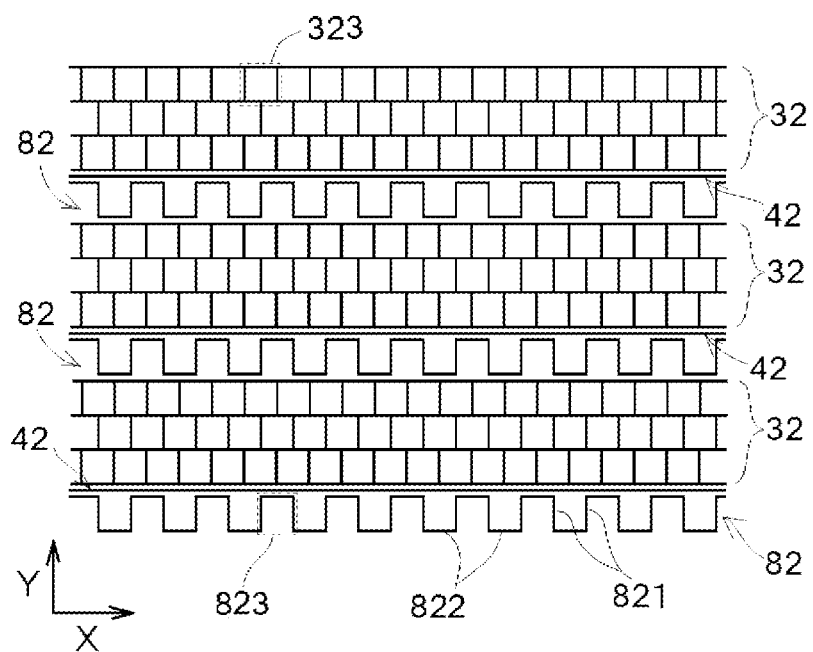
FIG. 19 is a partially enlarged view illustrating another aspect of visual assimilation of the third electrodes and the fourth electrodes with the electrodes having the mesh pattern.

As illustrated in FIG. 18, the array direction of the lattices 323 and the rectangular regions 823 can be, for example, a series array obtained in the X-axis direction and the Y-axis direction. As illustrated in FIG. 19, the array direction of the lattices 323 and the rectangular regions 823 can be staggered. As long as they are regularly arrayed as a whole, the array is not limited to them.

In FIG. 18 and FIG. 19, while the resistance lines constituting the zigzag pattern of the fourth electrodes 82 are drawn at a constant width, they are expressed in the simplified manner for ease of viewing the drawings. Actually, both cases of FIG. 5(a) and FIG. 5(b) are possibly present.

In the sense that the rectangular regions 823 are visually assimilated with the lattices 323 of the mesh pattern, the same width is more preferred as in FIG. 5(a). However, as illustrated in FIG. 5(b), even when the thicknesses differ between the overlapping portion 821 and the folded-back portion 822 of the fourth electrode 82, since the plurality of folded-back portions 822 are not continuous, it is not noticeable so much.

4. Fourth Embodiment

Figure 20:
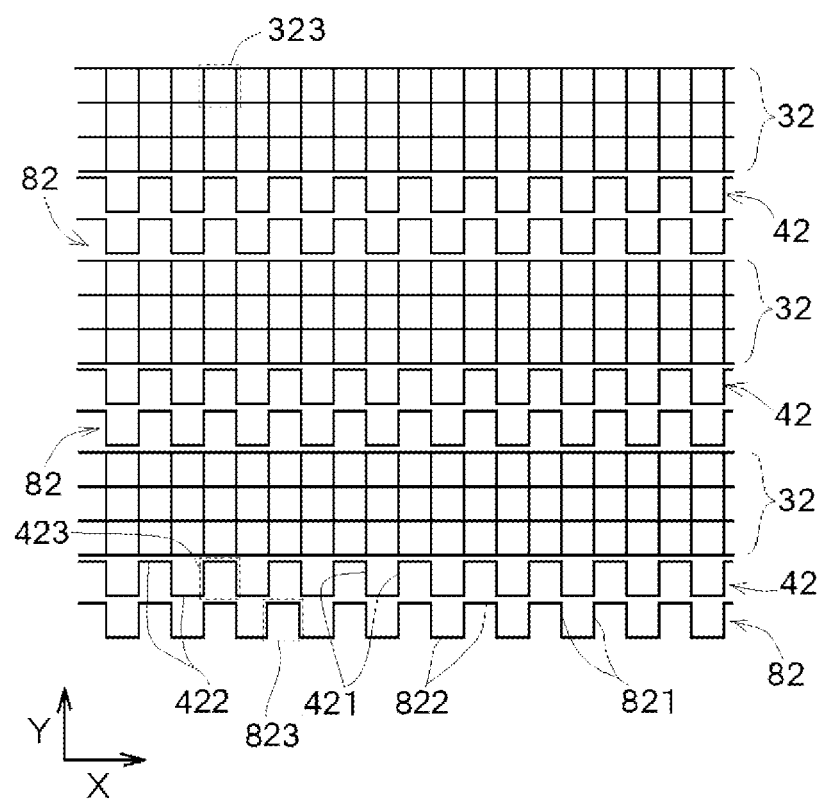
FIG. 20 is a partially enlarged view illustrating another aspect of visual assimilation of the third electrodes and the fourth electrodes with the electrodes having the mesh pattern.

In the present embodiment, as illustrated in FIG. 20, the pattern of the third electrodes 42 includes a plurality of overlapping portions 421 formed in parallel to one another by folding back a resistance line constituting the third electrodes 42 in a zigzag shape in plan view, and the arrangement direction of the plurality of overlapping portions 421 matches the extension direction of the third electrodes 42.

The pattern of the fourth electrodes 82 includes the plurality of overlapping portions 821 formed in parallel to one another by folding back a resistance line constituting the fourth electrodes 82 in a zigzag shape in plan view, and the arrangement direction of the plurality of overlapping portions 821 matches the extension direction of the fourth electrodes 82.

The pattern of the third electrodes 42 and the pattern of the fourth electrodes 82 have a cycle in which the foldings are in synchronization.

Among the first electrodes 22 and the second electrodes 32, a pattern of the electrodes formed on the same surface as the third electrodes 42 and the fourth electrodes 82 (the second electrodes 32 in the example in FIG. 20) is a mesh pattern having rectangular lattices formed of thin lines in the X-axis direction and the Y-axis direction. In the present embodiment, the lattice is a square or a rectangle.

Rectangular regions 423 and 823 having respective one sets of the adjacent overlapping portions 421 and 821 of the patterns of the third electrode 42 and the fourth electrode 82 as the opposed sides and the lattices 323 of the front mesh pattern have the same shape or approximate shape and the same or approximate size.

The electrodes having the mesh pattern (the second electrodes 32, the third electrodes 42, and the fourth electrodes 82 in the example of FIG. 20 are in proximity, and the lattices 323 and the rectangular regions 423 and 823 are regularly arrayed in the X-axis direction and the Y-axis direction as a whole.

Note that the third electrode and the fourth electrode 82 of the present embodiment differ in the materials used. While the patterns of the third electrodes and the fourth electrodes 82 are matched in the zigzag shape, the materials are differentiated. Thus, the resistance change rates of the third electrodes 42 and the fourth electrode 82 due to the temperature change are the same, and the resistance change rate of the fourth electrode 82 due to the posture change is 90% or less of the resistance change rate of the third electrode 42 due to the posture change during the posture change at the normal temperature.

In addition, the resistance lines constituting the zigzag patterns of the third electrodes and the fourth electrodes 82 in the present embodiment have a constant width.

The other points are similar to the first embodiment.

According to this configuration, the rectangular regions 423 and 823 having the pair of adjacent overlapping portions 421 and 821 of the patterns of the third electrode 42 and the fourth electrode 82 as the opposed sides are visually assimilated with the lattices 323 of the mesh pattern.

As illustrated in FIG. 20, the array direction of the lattices 323 and the rectangular regions 423 and 823 is a series array in the X-axis direction and the Y-axis direction.

In FIG. 20, while the resistance lines constituting the zigzag patterns of the third electrodes 42 and the fourth electrode 82 are drawn at a constant width, they are expressed in the simplified manner for ease of viewing the drawings. Accordingly, the drawing is shared with descriptions of the following fifth to seventh embodiments.

5. Fifth Embodiment

In the pattern configuration (see FIG. 20) similar to the fourth embodiment in which the patterns of the third electrodes 42 and the fourth electrodes 82 are both in the zigzag patterns and the pattern of the first electrodes 22 or the second electrodes 32 formed on the same surface as the third electrodes 42 and the fourth electrodes 82 is the mesh pattern, the widths of the resistance lines of the third electrodes 42 and the fourth electrodes 82 are further changed in the present embodiment.

Figure 16A:
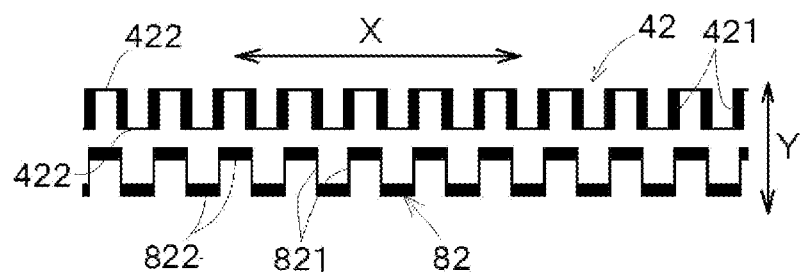
FIGS. 16(a) and 16(b) are enlarged views illustrating another aspect of a pair of patterns including the third electrodes and the fourth electrodes.

Specifically, as illustrated in FIG. 16(a), the width of the resistance line constituting the third electrodes 42 is formed to widen at the overlapping portion 421 and narrow at a folded-back portion 422, which connects the overlapping portions 421. In addition, the width of the resistance line constituting the fourth electrodes 82 is formed to narrow at the overlapping portion 821 and widen at the folded-back portion 822, which connects the overlapping portions 821.

Further, unlike the fourth embodiment, in the present embodiment, the third electrode 42 and the fourth electrode 82 are made of the same electrode material. This point is the same as the first embodiment.

The other points are similar to the fourth embodiment.

According to this configuration, by configuring the width of the folded-back portion 422 of the resistance line constituting the third electrodes 42 narrower than the overlapping portion 421, even when the same material is used, the resistance change rate of the third electrode 42 detected during pressing is larger than the case of the overlapping portion 421 and the folded-back portion 422 having the same width.

For example, assume that a resistance ratio of the overlapping portion 421 to the folded-back portion 422 before pressing is 1:2, the electrical resistance ($R_1'$) after the resistance change of the three electrodes 42, which have the zigzag pattern in which the width of the folded-back portion 422 is narrower than the overlapping portion 421, has the relationship of the following equation with the original electrical resistance ($R_1$), the strain ($\varepsilon$), and the gauge ratio (Ks).

$$R_1'=R_1/3+2R_1/3(1+Ks\times\varepsilon) \qquad \text{(Equation 10)}$$

$R_1/3$ in the former term is the electrical resistance of the overlapping portion 421 after pressing and $2R_1/3(1+Ks\times\varepsilon)$ of the latter term is the resistance of the folded-back portion 422 after pressing. That is, the amount of change in the electrical resistance ($\Delta R_1$) and the resistance change rate ($\Delta R_1/R_1$) are each as in the following equation.

$$\Delta R_1=2R_1/3\times Ks\times\varepsilon \qquad \text{(Equation 11)}$$

$$\Delta R_1/R_1=\tfrac{2}{3}\times Ks\times\varepsilon \qquad \text{(Equation 12)}$$

On the other hand, by widening the width of the folded-back portion 822 of the resistance line constituting the fourth electrodes 82 than the overlapping portion 821, the resistance change rate of the fourth electrode 82 detected during pressing becomes smaller than that in the case where the overlapping portion 821 and the folded-back portion 822 have the same width.

For example, assume that a resistance ratio of the overlapping portion 821 to the folded-back portion 822 is 2:1, the electrical resistance ($R_2'$) after the resistance change of the fourth electrodes 82 having the zigzag pattern in which the width of the folded-back portion 422 is wider than the overlapping portion 421 becomes the above-described Equation 7 to Equation 9.

Therefore, as apparent from Equation 12 and Equation 9, the resistance change rate of the fourth electrode 82 is equivalent to one-half of a half resistance rate of the third electrode 42. In other words, only the difference in pattern can cause a difference between the resistance change rate of the third electrode 42 and the resistance change rate of the fourth electrode 82 during pressing.

6. Sixth Embodiment

In the pattern configuration (see FIG. 20) similar to the fourth embodiment in which the patterns of the third electrodes 42 and the fourth electrodes 82 are both in the zigzag pattern and the pattern of the first electrodes 22 or the second electrodes 32 formed on the same surface as the third electrodes 42 and the fourth electrodes 82 is the mesh pattern, the widths of the resistance lines of the third electrodes 42 and the fourth electrodes 82 are further changed differently from the fifth embodiment in the present embodiment.

Specifically, the line width of the resistance line constituting the third electrodes 42 is formed to widen at the overlapping portion 421 and narrow at the folded-back portion 422, which connects the overlapping portions 421, and the line width of the resistance line constituting the fourth electrodes 82 is formed to be the same width.

In the present embodiment as well, similarly to the fifth embodiment, the third electrode 42 and the fourth electrode 82 are made of the same electrode material.

The other points are similar to the fourth embodiment.

As described in the fifth embodiment, according to this configuration, by configuring the width of the folded-back portion 422 of the resistance line constituting the third electrodes 42 narrower than the overlapping portion 421, the resistance change rate of the third electrode 42 detected during pressing is larger than the case of the overlapping portion 421 and the folded-back portion 422 having the same width. Here, this configuration of the same width is equivalent to the fourth electrode 82 in the present embodiment.

Therefore, even when the third electrode 42 and the fourth electrode 82 use the same material, the difference in pattern can cause a difference between a resistance change rate of the third electrode 42 and a resistance change rate of the fourth electrode 82 during pressing.

7. Seventh Embodiment

In the pattern configuration (see FIG. 20) similar to the fourth embodiment in which the patterns of the third electrodes 42 and the fourth electrodes 82 are both in the zigzag patterns and the pattern of the first electrodes 22 or the second electrodes 32 formed on the same surface as the third electrodes 42 and the fourth electrodes 82 is the mesh pattern, the widths of the resistance lines of the third electrodes 42 and the fourth electrodes 82 are further changed differently from the fifth embodiment and the sixth embodiment in the present embodiment.

Specifically, the line width of the resistance line constituting the third electrodes 42 is formed to be the same width, the line width of the resistance line constituting the fourth electrodes 82 is formed to narrow at the overlapping portion 821 and widen at the folded-back portion 822, which connects the overlapping portions 821. Additionally, in the present embodiment as well, similarly to the fifth embodiment and the sixth embodiment, the third electrode 42 and the fourth electrode 82 are made of the same electrode material.

The other points are similar to the fourth embodiment.

As described in the first embodiment, according to this configuration, by widening the width of the folded-back portion 822 of the resistance line constituting the fourth electrodes 82 than the overlapping portion 821, the resistance change rate of the fourth electrode 82 detected during pressing becomes larger than that in the case where the overlapping portion 821 and the folded-back portion 822 have the same width. Here, this configuration of the same width is equivalent to the third electrode 42 in the present embodiment.

Therefore, even when the third electrode 42 and the fourth electrode 82 use the same material, the difference in pattern can cause a difference between a resistance change rate of the third electrode 42 and a resistance change rate of the fourth electrode 82 during pressing.

8. Eighth Embodiment

In the above-described respective embodiments, the configuration in which the folded-back portions 422 and 822 of the resistance lines constituting the respective third electrodes 42 and fourth electrodes 82 are folded back linearly has been described as an example. However, the embodiments of the present invention are not limited to this. For example, as illustrated in FIG. 16(*b*), the folded-back portions 422 and 822 of the resistance lines constituting the third electrodes 42 and the fourth electrodes 82 may be configured to be folded back in a curved manner.

Figure 16B:
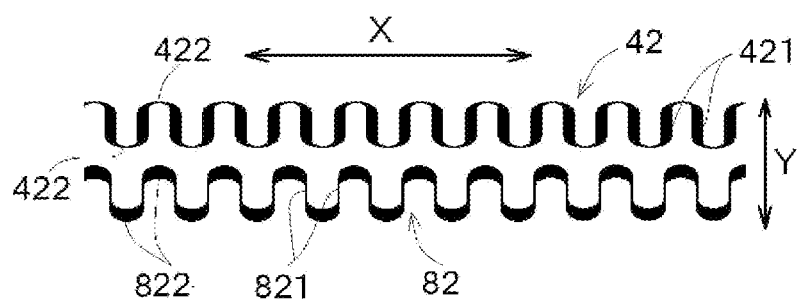

In the example of the third electrodes 42 illustrated in FIG. 16(*b*), the folded-back portion 422 of the resistance line constituting the third electrodes 42 has an outer edge having a semi-elliptical shape and an inner edge having a semi-circular shape. In the example of the fourth electrodes 82 illustrated in FIG. 16(*b*), the folded-back portion 822 of the resistance line constituting the fourth electrodes 82 has an outer edge having a semi-circular shape and an inner edge having a semi-elliptical shape.

According to this configuration, stress concentration when an elongation force is applied to the third electrode 42 and the fourth electrode 82 can be reduced. That is, although stress concentration generates cracks in the folded-back portions 422 and 822, since the folded-back portions 422 and 822 of the resistance lines are folded back in the curved manner, the stress generated in the folded-back portions 422 and 822 is dispersed and weakens, and the cracks can be suppressed.

Note that when the folded-back portions 422 and 822 of the resistance lines are configured to be folded back linearly, the widths in the direction orthogonal to the extension direction (the X-axis direction) of the third electrodes 42 and the fourth electrodes 82 (the Y-axis direction) become smaller than that in the configuration in which the folded-back portions 422 and 822 are folded back in the curved manner, and therefore the second electrodes 32, the third electrodes 42, and the fourth electrodes 82 can be arranged closely. As a result, the detection accuracy of the pressed position and the pressing force can be increased.

9. Modified Examples of First to Eighth Embodiments

Further, the modified examples of the first to eighth embodiments will be described. Note that the configurations disclosed in the following respective modified examples are applicable in combination with the configuration disclosed in the other modified examples as long as they are not inconsistent.

(1) In the above-described respective embodiments, the configuration in which the panel member 10 has the rectangular shape and the short side of the panel member 10 is parallel to the extension direction of the third electrode 42 and the fourth electrode 82 has been described as an example. However, the embodiments of the present invention are not limited to this.

For example, it is sufficient that the panel member 10 has a roughly rectangular shape, such as a shape with rounded corners, a shape in which a part of sides are rounded, a shape in which one of the opposed sides is inclined with respect to the other, and a shape in which outer edges are partially notched or protrude. In addition, the shape of the panel member 10 may be a square.

(2) In the above-described respective embodiments, the configuration in which all of both end portions in the Y-axis direction of the third electrodes 42 and the respective connection wiring lines 45 are connected to the controller 60 via the switches 44, and all of both end portions in the Y-axis direction of the fourth electrodes 82 and the respective connection wiring lines 85 are connected to the controller 60 via the switches 84 has been described as an example. However, the embodiments of the present invention are not limited to this. Only some of them may be connected to the controller 60. For example, in the example illustrated in FIG. 7, only both end portions in the Y-axis direction of the third electrodes 42 and the respective connection wiring lines 45 disposed on one side (for example, the lower side in FIG. 7) in the X-axis direction are connected to the controller 60 via the respective switches 44a, 44c, 44e, 44g, and 44h, or only both end portions in the Y-axis direction of the fourth electrodes 82 and the respective connection wiring lines 85 disposed on one side (for example, the lower side in FIG. 7) in the X-axis direction may be connected to the controller 60 via the respective switches 84a, 84c, 84e, 84g, and 84h. The connection wiring lines 45 and 85 where the connection to the controller 60 is omitted may be set as appropriate. Note that all of the connection wiring lines 45 and 85 are not connected to the controller 60, but only both end portions of the third electrodes 42 and both end portions of the fourth electrodes 82 in the Y-axis direction may be connected to the controller 60 at all times. The configuration does not correspond to the multi-force. However, when the pressure sensitive function needs to be exhibited only during the single touch in the specification, a resistance detection circuit can be significantly simplified and the cost can be reduced.

Figure 17:
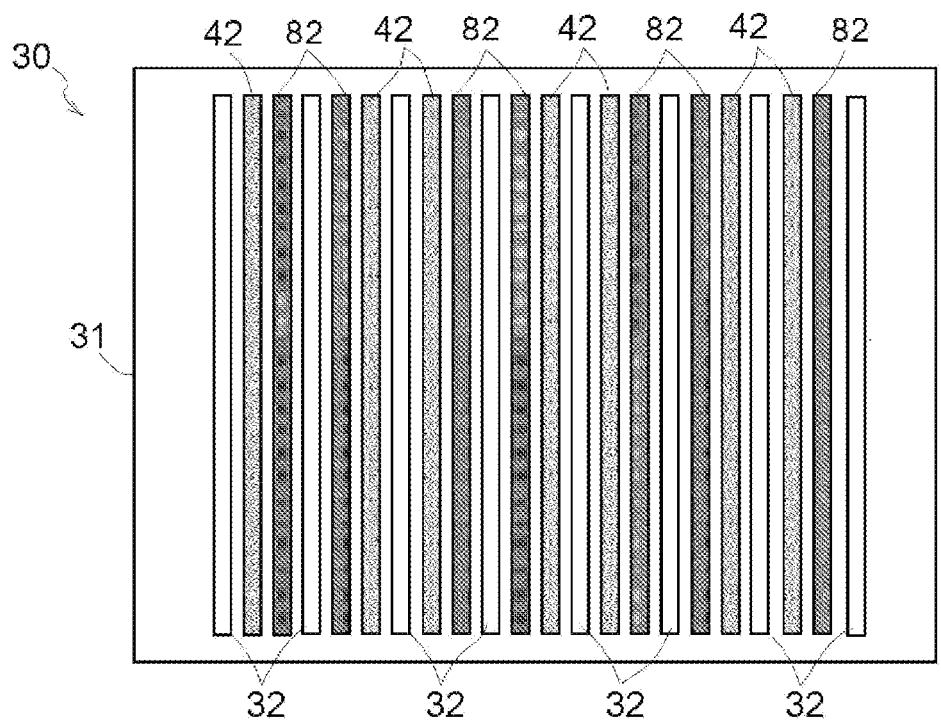
FIG. 17 is a schematic diagram illustrating another aspect of a connection configuration of the plurality of electrodes.

(3) In the above-described respective embodiments, the configuration in which, in the respective third electrodes 42, the electrodes disposed adjacent to one another are connected in alternation by one side end portions and the other side end portions in their extension direction and formed in the zigzag shape as a whole in plan view, and in the respective fourth electrodes 82, the electrodes disposed adjacent to one another are connected in alternation by one side end portions and the other side end portions in their extension direction and formed in the zigzag shape as a whole in plan view has been described as an example. However, the embodiments of the present invention are not limited to this. For example, as illustrated in FIG. 17, the respective third electrodes 42 and the respective fourth electrodes 82 may be disposed on the second substrate 31 to be separated in an island pattern without being connected to one another, similarly to the second electrodes 32. In such a configuration, to determine the magnitude of the pressing force on the operating surface 10a, scanning need to be performed on the respective third electrodes 42 and the respective fourth electrodes 82 at all times. In this case, multi-force correspondence is always possible.

(4) In the above-described respective embodiments, the configuration in which the third electrodes 42 are disposed in parallel to one another on the second substrate 31 so as to be arranged in the Y-axis direction between the second electrodes 32 adjacent to one another has been described as an example. However, the embodiments of the present invention are not limited to this. The third electrodes 42 may be disposed in parallel to one another on the first substrate 21 so as to be arranged in the X-axis direction between the first electrodes 22 adjacent to one another. Even with such a configuration, similarly to the above-described embodiments, the touch panel 5 that has the pressure sensitive function and is thinner than the conventional touch panels can be achieved. When the third electrodes 42 are disposed on the first substrate 21, the fourth electrodes 82 are also disposed on the first substrate 21.

(5) In the above-described respective embodiments, the configuration in which the first electrodes 22 and the second electrodes 32 are formed on the surfaces on the front sides of the first substrate 21 and the second substrate 31, respectively has been described as an example. However, the embodiments of the present invention are not limited to this. For example, the first electrodes 22 and the second electrodes 32 may be formed on the surfaces on the back surface sides of the first substrate 21 and the second substrate 31, respectively. Further, for example, the first electrodes 22 and the second electrodes 32 may be formed on mutually opposed surfaces of the first substrate 21 and the second substrate 31, respectively. However, in this case as well, an insulating layer is provided between both electrodes 22 and 23 so that the first electrodes 22 and the second electrodes 32 do not short. The insulating layer may be an air layer (an air gap) including, for example, a dot-shaped spacer, or may also serve as an adhesive layer. The formation positions of the third electrodes 42 and the fourth electrodes 82 are set according to the formation positions of the first electrodes 22 and the second electrodes 32 in the first substrate 21 and the second substrate 31.

(6) In the above-described respective embodiments, the configuration in which the panel member 10, the first electrode forming member 20, and the second electrode forming member 30 are bonded together has been described as an example. In other words, the configuration in which the panel member 10, the first substrate 21 on which the first electrodes 22 are formed and the second substrate 31 on which the second electrodes 32 are formed are bonded together has been described as an example. However, the embodiments of the present invention are not limited to this. For example, a configuration in which at least the first substrate 21 is omitted, and only the panel member 10, the first electrode 22, and the second electrode 32 is bonded together (the second substrate 31 may be present on the back surface side) may be employed. However, in this case as well, an insulating layer is provided between both electrodes 22 and 23 so that the first electrodes 22 and the second electrodes 32 do not short. The insulating layer may also serve as an adhesive layer.

(7) In the above-described respective embodiments, the description has been given assuming the configuration in which the position determination unit 66 determines the pressed position using the detection result by the capacitance detection unit 62 as is. Similarly, the description has been given assuming the configuration in which the temperature compensation unit 68 corrects the detection result by the first resistance detection unit 63 and then the pressing force determination unit 67 determines the pressing force using the corrected detection result as is. However, the embodiments of the present invention are not limited to this. For example, the position determination unit 66 may determine the pressed position using only a value exceeding a predetermined threshold among the detected values by the capacitance detection unit 62. In addition, the pressing force determination unit 67 may determine the pressing force using only a value exceeding a predetermined threshold among the corrected values of the detection result by the resistance detection unit 63. In this way, a false input based on, for example, unintended contact by the user with the operating surface 10a can be suppressed.

10. Ninth Embodiment

In the above-described respective embodiments and the modified examples thereof, the configuration in which the third electrodes 42 and the fourth electrodes 82 are formed corresponding to the operating surface 10a has been described as an example. However, the embodiments of the present invention are not limited to this. For example, as illustrated in FIG. 21, the configuration in which the third electrode 42 and the fourth electrode 82 are formed corresponding to an outer peripheral area 10*b* as the outer periphery of the operating surface 10*a* to constitute the pressure sensor 5*b*.

(1) Basic Configuration of Touch Panel

In the ninth embodiment, the touch panel 5 includes the touch sensor 5*a* (FIG. 21) that detects a position (referred to as a "touch position") corresponding to, for example, a finger of a user when, for example, the finger of the user or a stylus operated by the user is in proximity to or in contact with the operating surface 10*a* (described later). The touch panel 5 according to the ninth embodiment also includes the pressure sensor 5*b* (FIG. 21) that simultaneously detects the magnitude of the pressing force on the operating surface 10*a* when the user actually touches the operating surface 10*a* with, for example, the finger. In other words, the touch panel 5 according to the ninth embodiment is configured as a touch panel with pressure sensitive function. However, the ninth embodiment differs from the first embodiment in that the pressure sensor 5*b* is formed corresponding to the outer peripheral area 10*b* as the outer periphery of the operating surface 10*a*.

Figure 21:
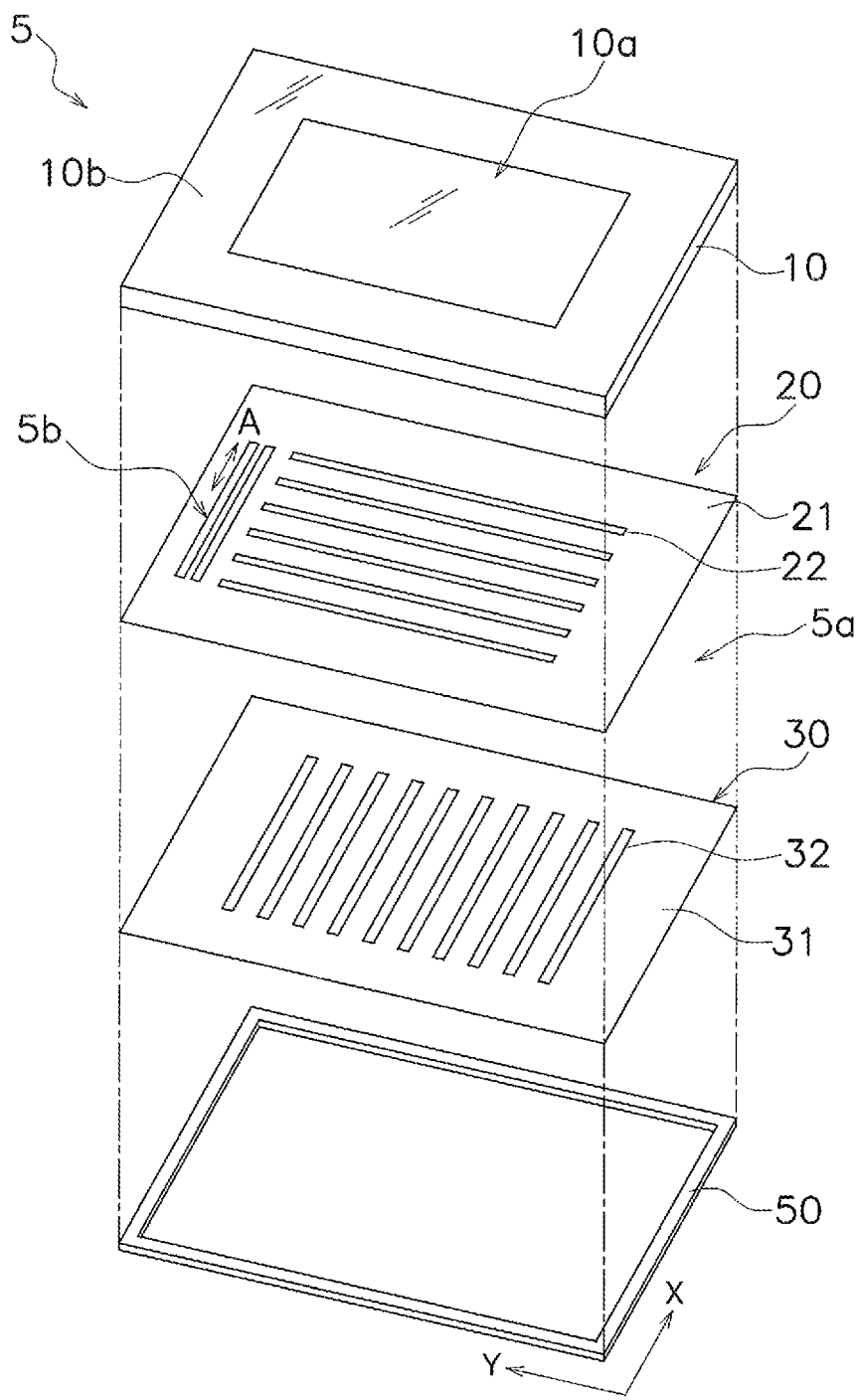
FIG. 21 is an exploded perspective view of a touch panel with pressure sensitive function according to a ninth embodiment.

As illustrated in FIG. 21, the touch sensor 5*a* according to the ninth embodiment includes the panel member 10, the first electrode forming member 20, the second electrode forming member 30, and the support member 50. They are layered in the described order from the front surface side to the back surface side. The support member 50 is disposed on the support portion 3*b* of the housing 3, the second electrode forming member 30 is disposed on the support member 50, the first electrode forming member 20 is disposed on the second electrode forming member 30, and the panel member 10 is disposed on the first electrode forming member 20 (see FIG. 2 similarly to the first embodiment). They are bonded to one another with, for example, a pressure sensitive adhesive (PSA).

The other descriptions overlap with the descriptions in the section of "(1) Basic Configuration of Touch Panel" of the first embodiment, and thus the descriptions thereof will be omitted in this section.

(2) Panel Member

The description overlaps with the description in the section of "(2) Panel Member" of the first embodiment, and thus the description thereof will be omitted in this section.

(3) Touch Sensor

The description overlaps with the description in the section of "(3) Touch Sensor" of the first embodiment, and thus the description thereof will be omitted in this section.

(4) Pressure Sensor

The pressure sensor 5*b* according to the ninth embodiment will be described. As illustrated in FIG. 21, the pressure sensor 5*b* according to the ninth embodiment is formed on the front surface side (the panel member 10 side) of the first substrate 21. The pressure sensor 5*b* according to the ninth embodiment is disposed extending at a position corresponding to the outer peripheral area 10*b* of the panel member 10. Note that in FIG. 21, the pressure sensor 5*b* according to the ninth embodiment is described as a simplified line.

More specifically, in FIG. 21, the pressure sensor 5*b* extends in the X-axis direction (the short side direction) on the short side of the panel member 10 in plan view. This is because, for example, with reference to a distribution of the main strain applied to the first substrate 21 and the second substrate 31 when a person presses the operating surface 10*a* by a finger, the direction of the strain is the short side direction at the center portion of the short side. Note that, at both end portions of the short side, the direction of the strain extends from the short side to the proximate long side, and is the inclined direction.

As described later, the pressure sensor 5*b* according to the ninth embodiment includes the third electrode 42 and the fourth electrode 82 for detecting a strain caused by the pressing force.

The other descriptions overlap with the descriptions in the section of "(1) Basic Configuration of Touch Panel" of the first embodiment, and thus the descriptions thereof will be omitted in this section.

(4-1) Description of Outline of Third Electrode

The description overlaps with the description in the section of "(4-1) Description of Outline of Third Electrode" of the first embodiment, and thus the description thereof will be omitted in this section.

(4-2) Description of Outline of Fourth Electrode

The description overlaps with the description in the section of "(4-2) Description of Outline of Fourth Electrode" of the first embodiment, and thus the description thereof will be omitted in this section.

In the ninth embodiment, the third electrode 42 and the fourth electrode 82 are formed on the same surface of the first substrate 21. According to this configuration, patterning can be performed simultaneously with a printing or an etching process, and the manufacturing process does not increase compared to that of the usual touch panel.

(4-3) Detection Circuit of Pressure Sensor

Figure 24:
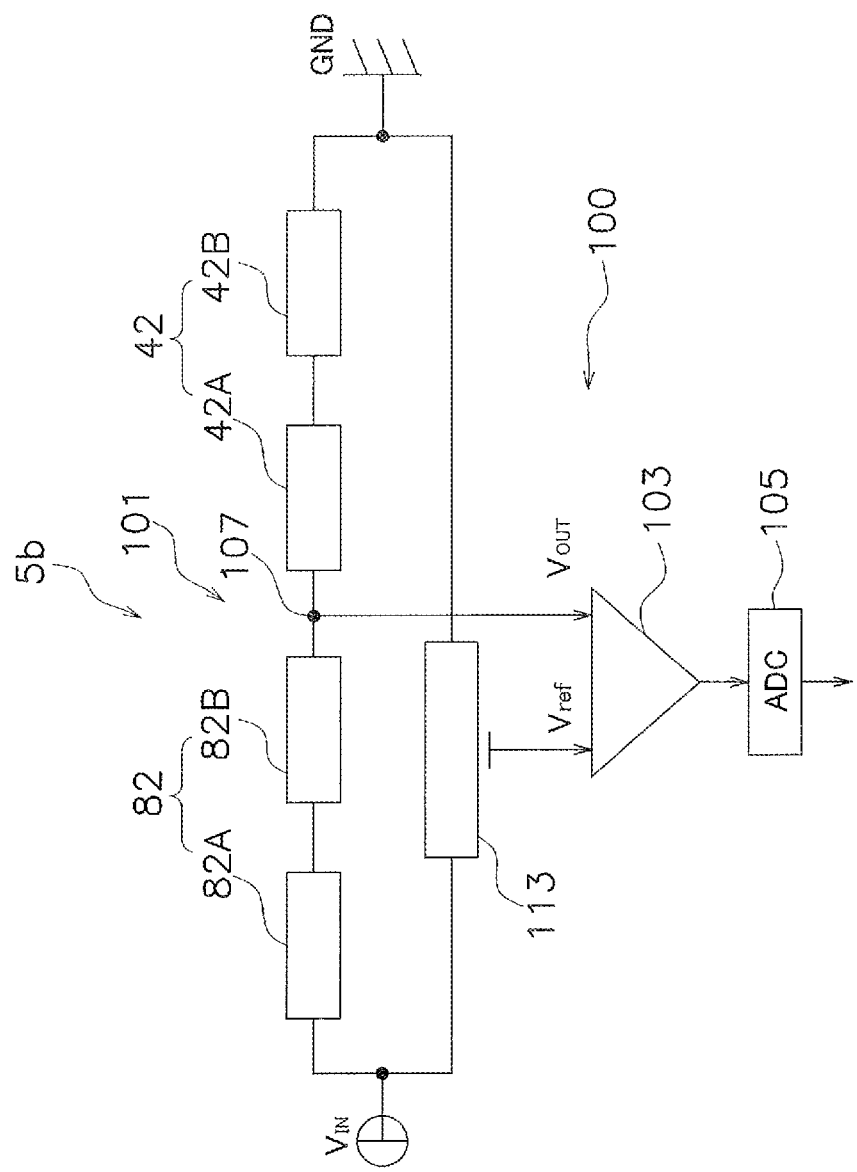
FIG. 24 is a circuit diagram of a pressure sensor.

Using FIG. 24, a pressure detection circuit 100 of the pressure sensor 5*b* according to the ninth embodiment will be described.

The pressure detection circuit 100 includes a Wheatstone bridge circuit 101, an instrumentation amplifier 103, and an analog-to-digital (AD) converter 105.

The Wheatstone bridge circuit 101 includes the third electrode 42 and the fourth electrode 82 as a part. The third electrode 42 and the fourth electrode 82 are connected in series between an input voltage Vin and a ground GND. An output unit 107 that outputs an output voltage Vout is provided between the third electrode 42 and the fourth electrode 82.

The Wheatstone bridge circuit 101 includes a variable resistor 113. As a result, an offset value can be changed by adjusting the variable resistor 113 for a change in a resistance value over time. Consequently, a variation of resistors depending on manufacturing and usage environment can be adjusted, and detection defects can be reduced. Note that a combination of a fixed resistor and a digital potentiometer may be used, instead of the variable resistor.

The output voltage Vout from the output unit 107 and a reference voltage Vref are output to the instrumentation amplifier 103. The instrumentation amplifier 103 calculates a difference between both voltages and outputs the difference to the AD converter 105. The AD converter 105 performs conversion of an analog signal into a digital signal and outputs it to the controller 60 (described later).

(4-4) Schematic Arrangement Relationship Between Both Electrodes

Figure 25:
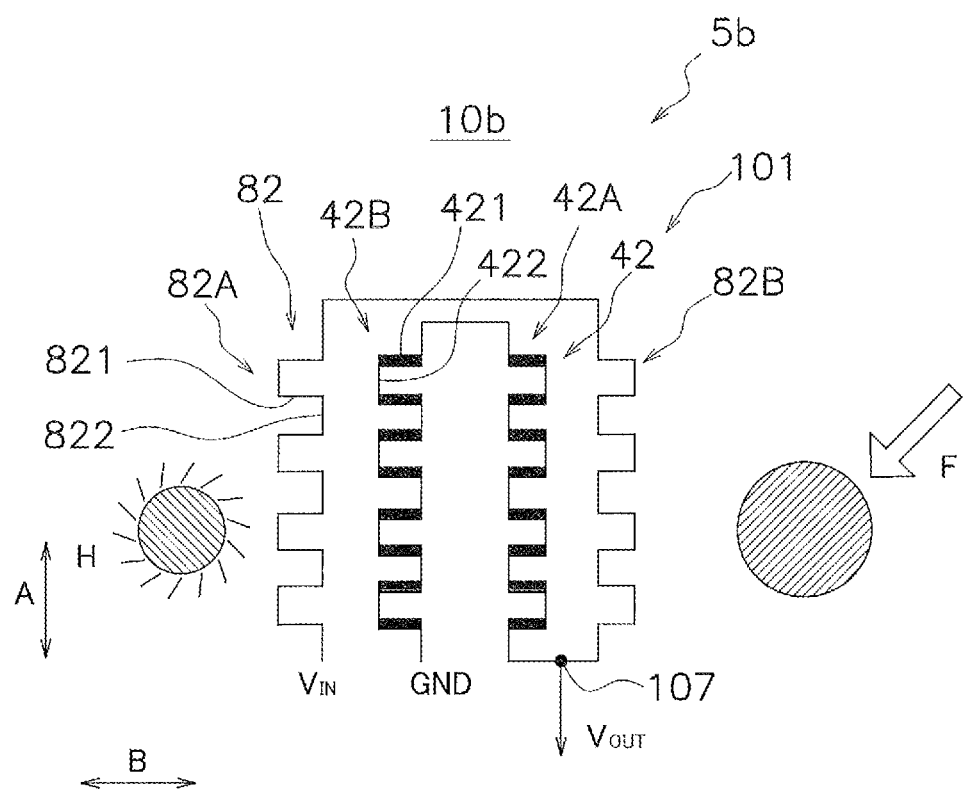
FIG. 25 is a schematic plan view of the pressure sensor.

The third electrode 42 and the fourth electrode 82 according to the ninth embodiment extend along one another at the position corresponding to the outer peripheral area IOb. More specifically, as illustrated in FIG. 25, the fourth electrode 82 includes a first resistor 82A and a second resistor 82B disposed on both sides in a direction orthogonal to the extension direction of the third electrode 42. Note that in the drawing, the extension direction of the third electrode 42 and the fourth electrode 82 is indicated by an arrow A, and a direction orthogonal to the extension direction is indicated by an arrow B. The extension direction and the direction orthogonal thereto may match or may be different from the respective X-axis direction and Y-axis direction. The third electrode 42 includes a third resistor 42A and a fourth resistor 42B arranged in the direction orthogonal to the extension direction. In other words, the third resistor 42A and a fourth resistor 42B of the third electrode 42 are disposed between the first resistor 82A and the second resistor 82B of the fourth electrode 82, and the first resistor 82A, the fourth resistor 42B, the third resistor 42A, and the second resistor 82B are arranged in this order from left to right in FIG. 25.

(4-5) Pattern Shapes of Both Electrodes

In the pattern of the third electrode 42 according to the ninth embodiment, the resistance line constituting the third electrode 42 has a zigzag shape in plan view. More specifically, the pattern of the resistance line of the third electrode 42 is a pattern that includes the plurality of overlapping portions 421 formed in parallel to one another by folding back the resistance line constituting the third electrode 42 in the zigzag shape in plan view, and the arrangement direction of the plurality of overlapping portions 421 matches the extension direction of the third electrode 42. Furthermore, the pattern of the resistance line of the third electrode 42 includes the folded-back portions 422 folded back linearly from the overlapping portions 421.

The pattern of the resistance line of the fourth electrode 82 according to the ninth embodiment is a pattern that includes a plurality of overlapping portions 821 formed in parallel to one another by folding back a resistance line constituting the fourth electrode 82 in a zigzag shape in plan view, and the arrangement direction of the plurality of overlapping portions 821 matches the extension direction of the fourth electrode 82. Furthermore, the pattern of the resistance line of the fourth electrode 82 includes the folded-back portions 822 folded back linearly from the overlapping portions 821.

Note that the pattern of the fourth electrode 82 is different from the pattern of the third electrode 42. Specifically, as illustrated in FIG. 25, while the overlapping portion 821 and the folded-back portion 822 of the fourth electrode 82 have the narrow widths, the third electrode 42 includes the folded-back portion 422 similarly having a narrow width and the overlapping portion 421 having a wide width.

As an example, the width of the folded-back portion 822 of the third electrode 42 and the fourth electrode 82 is in the range of from 1 to 1,000 μm, and the width of the overlapping portion 821 of the fourth electrode is in the range of from 1 to 1,000 μm. In addition, a clearance between the third electrode 42 and the fourth electrode 82 is in the range of from 0.1 to 1,000 μm, and preferably in the range of from 0.1 to 300 μm.

When the pressing force F is applied to the operating surface 10a, the panel member 10 changes its posture, and the third electrode 42 and the fourth electrode 82 according to the ninth embodiment strain so as to be pulled primarily in the extension direction (the arrow A). At this time, the resistances of the third electrode 42 and the fourth electrode 82 increase. The overlapping portion 421 of the third electrode 42 has the width wider than that of the folded-back portion 422, and therefore the resistance value at the same length is low. Accordingly, the rate of change in the resistance value of the fourth electrode 82 is smaller than the rate of change in the resistance value of the third electrode 42. Specifically, the resistance change rate due to the posture change of the fourth electrode 82 is 90% or less of the resistance change rate of the third electrode 42 due to the posture change. More preferably, the resistance change rate of the fourth electrode 82 due to the posture change is 50% or less of the resistance change rate of the third electrode 42 due to the posture change, and is more preferably 10% or less.

(4-6) Detection Principle of Pressure Sensor

When the user touches the operating surface 10a of the panel member 10 with, for example, a finger, the panel member 10 elastically deforms, and in accordance with the deformation, the third electrode 42 and the fourth electrode 82 according to the ninth embodiment also deform. At this time, the electrical resistances of the third electrode 42 and the fourth electrode 82 change according to the deformation (the posture change), and the electrical resistances also change according to the temperature change at the same time.

However, as described above, the resistance change rate of the fourth electrode 82 due to the temperature change is the same as the resistance change rate of the third electrode 42 due to the temperature change, and the resistance change rate of the fourth electrode 82 due to the posture change is 90% or less of the resistance change rate of the third electrode 42 due to the posture change during the posture change at the normal temperature. Therefore, the detection result including the change in the electrical resistance of the third electrode 42 caused by the temperature change can be corrected (temperature compensation). As a result, the magnitude of the pressing force on the operating surface 10a can be appropriately determined.

Figure 26:
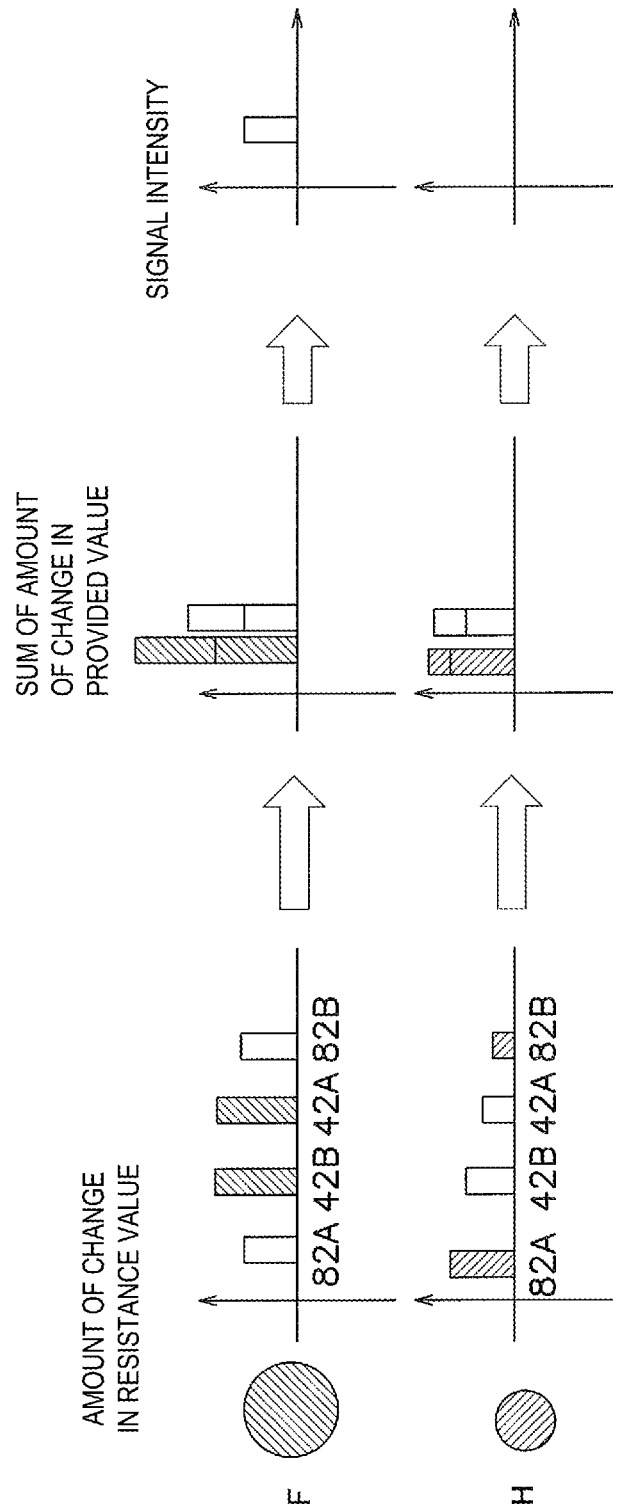
FIG. 26 is a conceptual diagram describing intensities of output signals by a pressing and a local heat source.

As an example, as illustrated in FIG. 25, an example in which the pressing force F acts on one outside of the fourth resistor 42B of the third electrode 42, and a local heat source H is generated on the other outside of the third electrode 42 is considered. In this case, as illustrated in FIG. 26, the amount of change in the resistance value due to the pressing force F in the third electrode 42 is smaller than that of the fourth electrode 82. Accordingly, based on the difference, a detection signal is determined. On the other hand, the amount of change in the resistance value due to the local heat source H decreases in the order of the first resistor 82A of the fourth electrode 82, the fourth resistor 42B of the third electrode 42, the third resistor 42A of the third electrode 42, and the second resistor 82B of the fourth electrode 82. In other words, the amount of change in the resistance value of the first resistor 82A is large, and the amount of change in the resistance value of the second resistor 82B is small. Accordingly, the amount of change in the resistance value of the third electrode 42 and the amount of change in the resistance value of the fourth electrode 82 are around the same. As a result, the output signal caused by the temperature is zero or nearly zero. Consequently, the temperature-compensated detection signal is output from the pressure detection circuit 100.

Even when the pressing force F and the local heat source H are at the same position or close positions, that is, at the same outside position of the first resistor or two resistors of the fourth electrode, effects similar to those described above can be obtained.

(4-7) Other Effects

Since the third electrode 42 and the fourth electrode 82 of the pressure sensors 5b according to the ninth embodiment are provided at the position corresponding to the outer peripheral area 10b in plan view, the third electrode 42 and the fourth electrode 82 are not exposed to a user and are excellent in designability. In addition, since the third electrode 42 and the fourth electrode 82 are formed on the same surface as the first electrodes or the second electrodes, patterning can be performed simultaneously with a printing or an etching process, and the manufacturing process does not increase compared to that of the usual touch panel.

Since the third electrode 42 and the fourth electrode 82 are in close contact, a local heat can be canceled.

Since the shape of the fourth electrode 82 is the zigzag shape, changing the resistance change rate with respect to the posture change of the fourth electrode 82 is easy.

Since the folded-back portions 422 and 822 of the resistance line are folded back linearly, the width in the direction orthogonal to the extension direction of the third electrode 42 and the fourth electrode 82 is smaller than that of a configuration in which the folded-back portions 422 and 822 are folded back in a curved manner, leading to space saving.

(5) Support Member

The support member 50 supports the panel member 10 from the back surface side.

The support member 50 supports the panel member 10 from the back surface side via the first electrode forming member 20 in which the first electrodes 22 are formed and the second electrode forming member 30. The support member 50 is formed in a frame shape.

The other descriptions overlap with the descriptions in the section of "(5) Support Member" of the first embodiment, and thus the description thereof will be omitted in this section.

(6) Control Device of Touch Sensor

The control device of the touch sensor 5a according to the ninth embodiment will be described.

Figure 22:
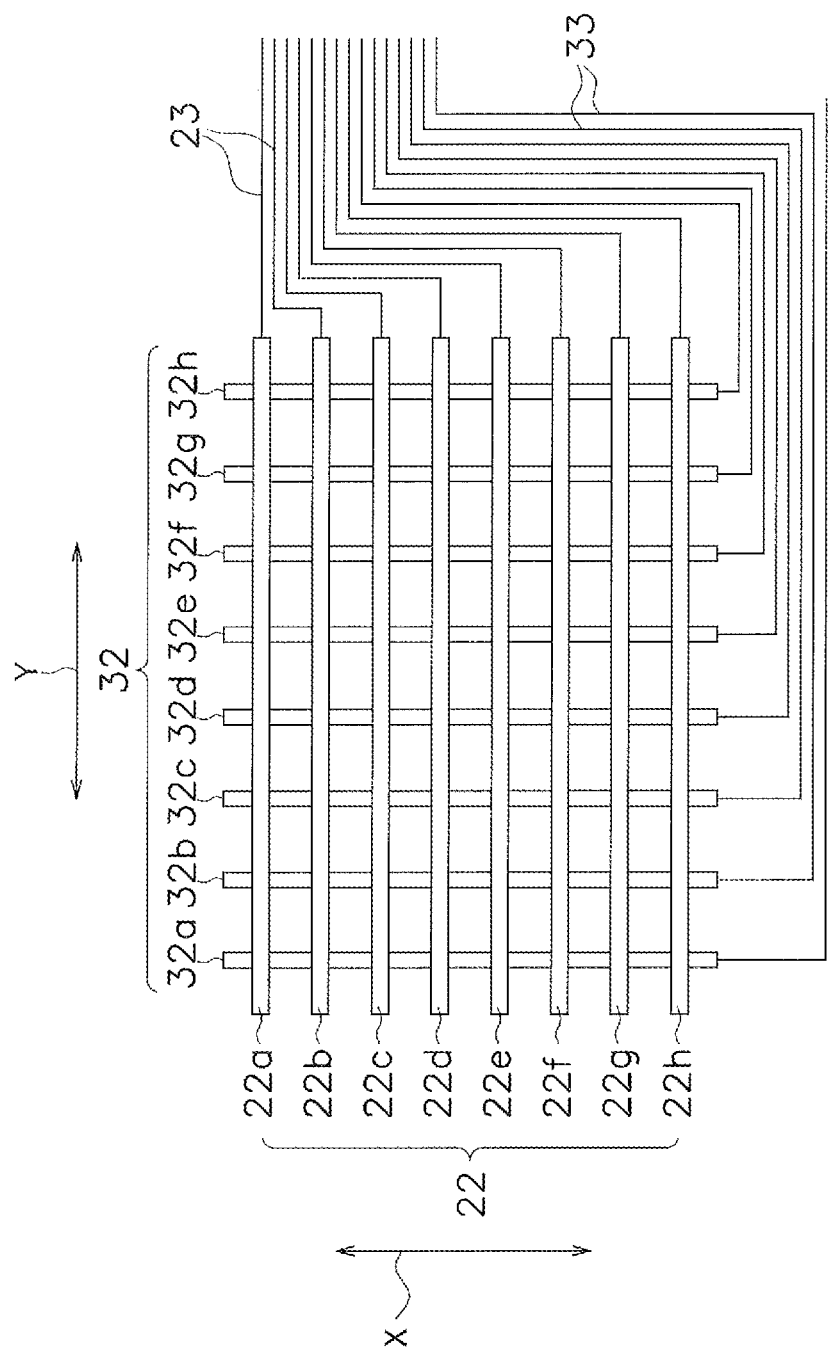
FIG. 22 is a schematic diagram illustrating one aspect of a connection configuration of a touch sensor.

As illustrated in FIG. 22, each of the plurality of first electrodes 22 is connected to the controller 60 (FIG. 23) via the lead wiring line 23. Each of the plurality of second electrodes 32 is connected to the controller 60 via the lead wiring line 33.

Compared to FIG. 6 described in the first embodiment, the configuration illustrated in FIG. 22 is simplifies a circuit by the absence of the switches 24 and the switches 34 are not provided. Obviously, the configuration illustrated in FIG. 22 is applicable to the first to eighth embodiments and the modified examples.

Note that the lead wiring lines 23 and 33 are configured using a metal such as gold, silver, copper, and nickel, or a conductive paste such as carbon.

(6-1) Controller

Figure 23:
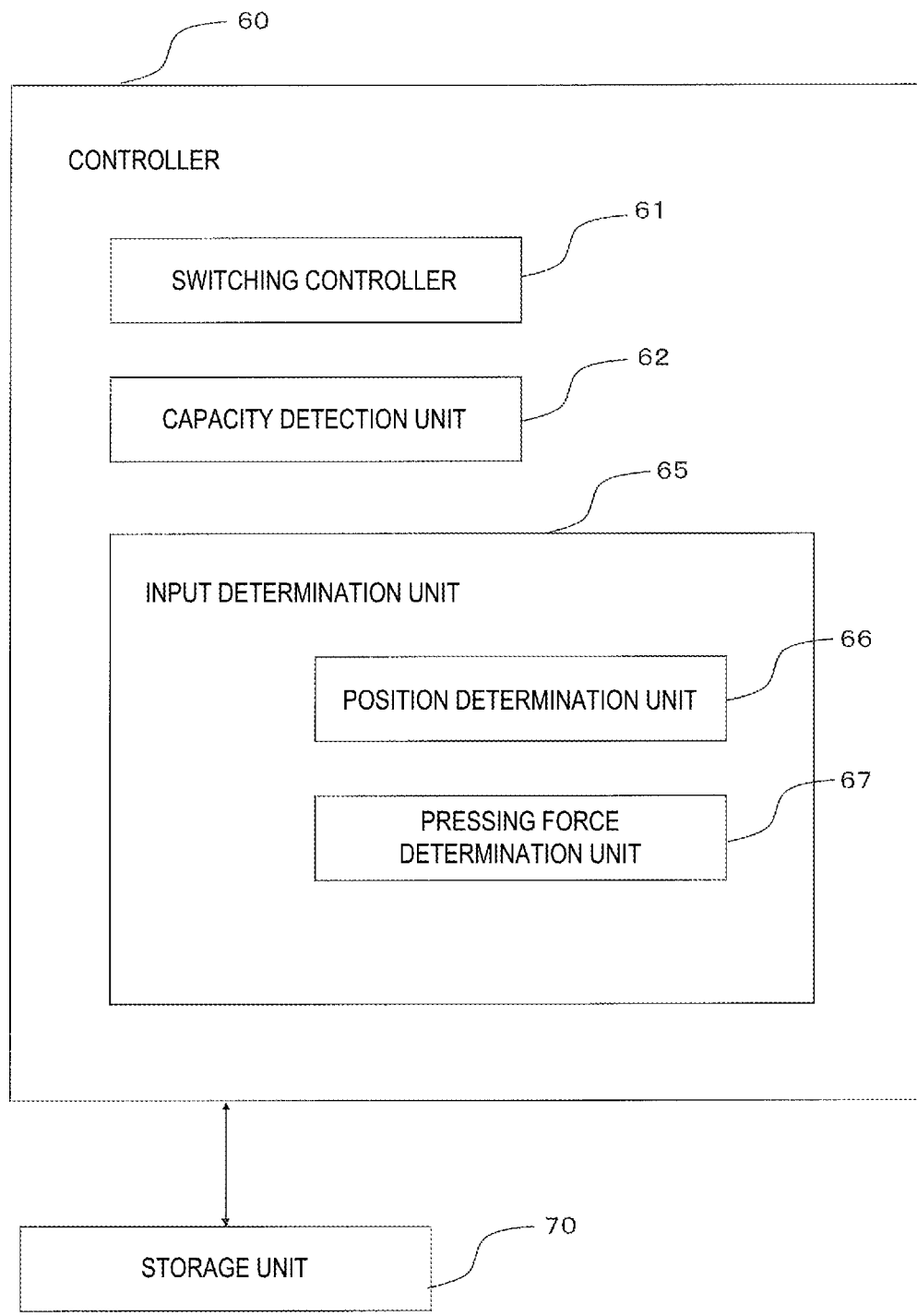
FIG. 23 is a schematic diagram illustrating a configuration of a controller in the touch sensor.

The controller 60 includes an arithmetic processing device, such as a central processing unit (CPU), as a core member, and is configured by hardware or software (programs) or both of them as a function unit for performing various processes on input data. As illustrated in FIG. 23, the controller 60 includes the capacitance detection unit 62 and the input determination unit 65. The input determination unit 65 includes the position determination unit 66 and the pressing force determination unit 67. Furthermore, the controller 60 is connected to the storage unit 70 to ensure communications of information. The storage unit 70 is constituted of a memory, such as Random Access Memory (RAM) and Electrically Erasable Programmable Read Only Memory (EEPROM).

(6-1-1) Capacitance Detection Unit

In the present embodiment, the capacitance detection unit 62 detects a capacitance (a self-capacitance) of each of the plurality of first electrodes 22 and the plurality of second electrodes 32. As such, the capacitance detection unit 62 is configured including the known capacitance detection circuit. The capacitance detection unit 62 sequentially detects the capacitance of each of the first electrodes 22a to 22h. The capacitance detection unit 62 sequentially detects the capacitance of each of the second electrodes 32a to 32h. Scanning of each of the first electrodes 22 and scanning of each of the second electrodes 32 may be performed in synchronization or in alternation.

Note that a detection method of a mutual method may be employed. In this case, the capacitance detection unit 62 detects a capacitance (a mutual capacitance) between each of the first electrodes 22 and each of the second electrodes 32. The use of the mutual method allows multi-touch correspondence. The information of the detected value by the capacitance detection unit 62 is transmitted to the input determination unit 65 (the position determination unit 66).

(6-1-2) Position Determination Unit

The description overlaps with the description in the section of "(6-2-5) Position Determination Unit" of the first embodiment, and thus the description thereof will be omitted in this section.

(6-1-3) Pressing Force Determination Unit

The pressing force determination unit 67 included in the input determination unit 65 determines the pressing force on the operating surface 10a based on the detection signal from the pressure detection circuit 100.

In this way, the input determination unit 65 determines the pressed position on the X-Y coordinate system on the operating surface 10a based on the detection result by the capacitance detection unit 62, and determines the pressing force on the operating surface 10a based on the detection signal from the pressure detection circuit 100. This allows achieving the touch panel 5 having a pressure sensitive function, in addition to the usual position detection function.

(7) Modified Examples of Pattern Shapes of Third Electrode and Fourth Electrode

The pattern shapes of the third electrode and the fourth electrode are not limited to the embodiments described above.

In the ninth embodiment, part of the fourth electrode (the first resistor), the third electrode, and the other part of the fourth electrode (the second resistor) are arranged in this order in the direction orthogonal to the extension direction. However, as described above, as long as the periodicity in which the third electrode and the fourth electrode are arranged in alternation is at least partially achieved, a temperature gradient with respect to the local heat source is achieved and therefore is preferred. Accordingly, part of the third electrode, the fourth electrode, and the other part of the third electrode may be arranged in this order in the direction orthogonal to the extension direction.

Figure 27:
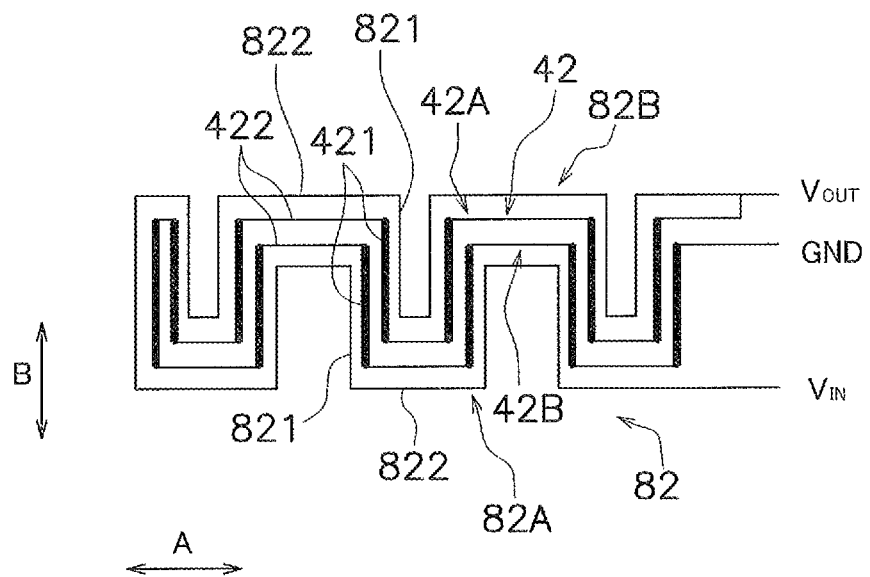
FIG. 27 is a schematic plan view of a resistance line pattern of the pressure sensor (a first modified example).

In a first modified example illustrated in FIG. 27, the fourth electrode 82 includes the first resistor 82A and the second resistor 82B folded back and extending in the same direction. The third electrode 42 includes the third resistor 42A and the fourth resistor 42B folded back and extending in the same direction. The third resistor 42A and the fourth resistor 42B are in proximity to one another, the overlapping portion 421 of the third resistor 42A and the overlapping portion 421 of the fourth resistor 42B are in proximity to one another, and the folded-back portion 422 of the third resistor 42A and the folded-back portion 422 of the fourth resistor 42B are in proximity to one another. Further, the overlapping portion 821 of the first resistor 82A is in proximity to the overlapping portion 421 of the fourth resistor 42B, and the folded-back portion 822 of the first resistor 82A is in proximity to the folded-back portion 422 of the fourth resistor 42B. Further, the overlapping portion 821 of the second resistor 82B is in proximity to the overlapping portion 421 of the fourth resistor 42B, and the folded-back portion 822 of the second resistor 82B is in proximity to the folded-back portion 422 of the third resistor 42A. The fourth electrode 82 includes the overlapping portion 821 and the folded-back portion 822, each pair of the overlapping portions 821 are in proximity to the overlapping portions 421 of the third electrode 42, and each pair of the folded-back portions 822 are in proximity to the folded-back portions 422 of the third electrode 42.

Note that the pattern of the fourth electrode 82 is different from the pattern of the third electrode 42. Specifically, as illustrated in FIG. 27, while the overlapping portion 821 and the folded-back portion 822 of the fourth electrode 82 have the narrow widths, the third electrode 42 includes the folded-back portion 422 similarly having the narrow width and the overlapping portion 421 having a wide width.

Figure 28:
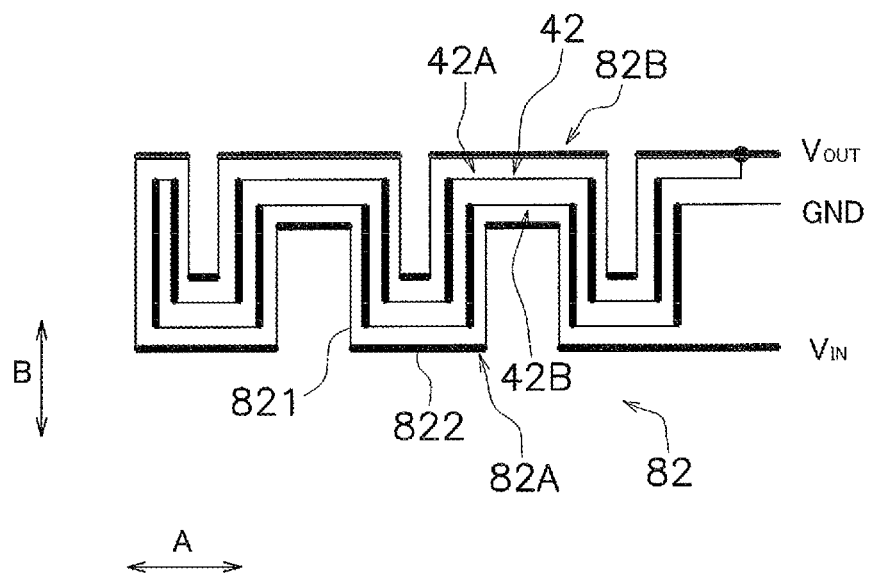
FIG. 28 is a schematic plan view of a resistance line pattern of the pressure sensor (a second modified example).

In a second modified example illustrated in FIG. 28, similarly to the first modified example, the third electrode 42 is disposed along the shape of the fourth electrode 82. In this modified example, unlike the first modified example, the folded-back portion 822 of the fourth electrode 82 is wider than the overlapping portion 821.

Figure 29:
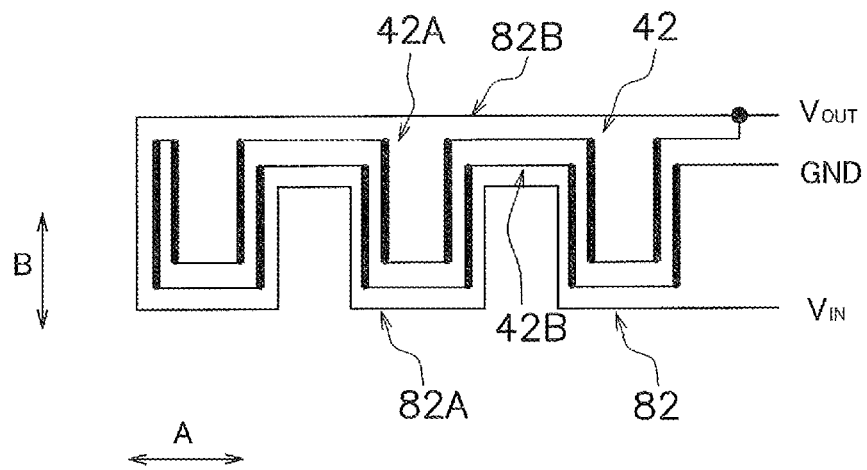
FIG. 29 is a schematic plan view of a resistance line pattern of the pressure sensor (a third modified example).

In a third modified example illustrated in FIG. 29, the first resistor 82A of the fourth electrode 82 includes the overlapping portion 821 and the folded-back portion 822, and is disposed along the shape of the third electrode 42. However, unlike the first modified example, the second resistor 82B linearly extends.

Figure 30:
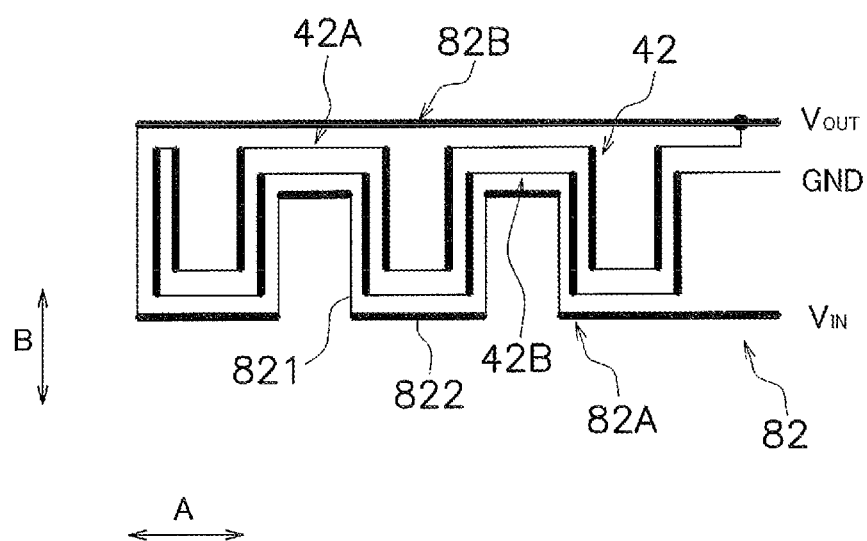
FIG. 30 is a schematic plan view of a resistance line pattern of the pressure sensor (a fourth modified example).

In a fourth modified example illustrated in FIG. 30, unlike the third modified example, the folded-back portion 822 of the first resistor 82A and the second resistor 82B of the fourth electrode 82 are wider than the overlapping portion 821.

Figure 31:
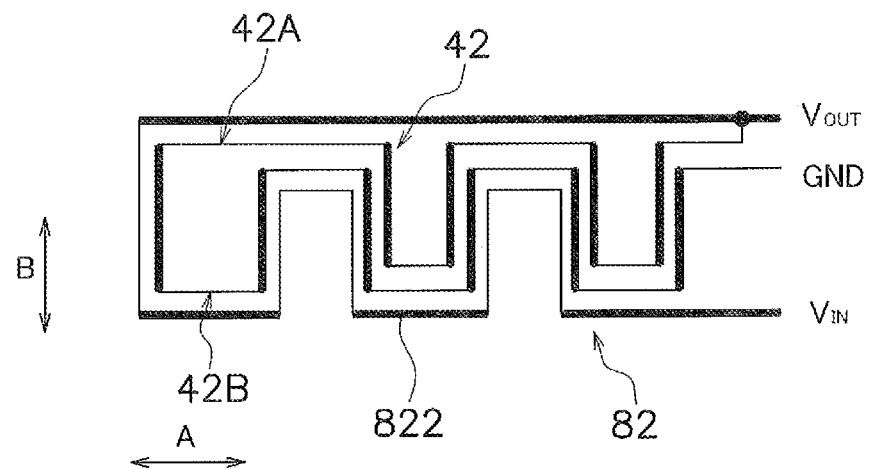
FIG. 31 is a schematic plan view of a resistance line pattern of the pressure sensor (a fifth modified example).

In a fifth modified example illustrated in FIG. 31, unlike the fourth modified example, part of the third resistor 42A of the third electrode 42 is not in proximity to the fourth resistor 42B.

Figure 32:
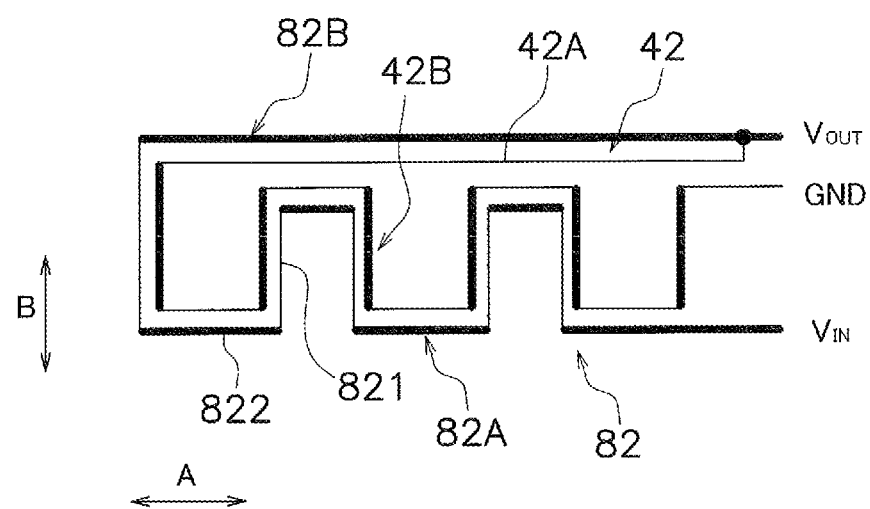
FIG. 32 is a schematic plan view of a resistance line pattern of the pressure sensor (a sixth modified example).

In a sixth modified example illustrated in FIG. 32, unlike the fifth modified example, the folded-back portion 822 of the first resistor 82A and the second resistor 82B of the fourth electrode 82 are wider than the overlapping portion 821. In addition, the third resistor 42A of the third electrode 42 has a linear shape.

Figure 33:
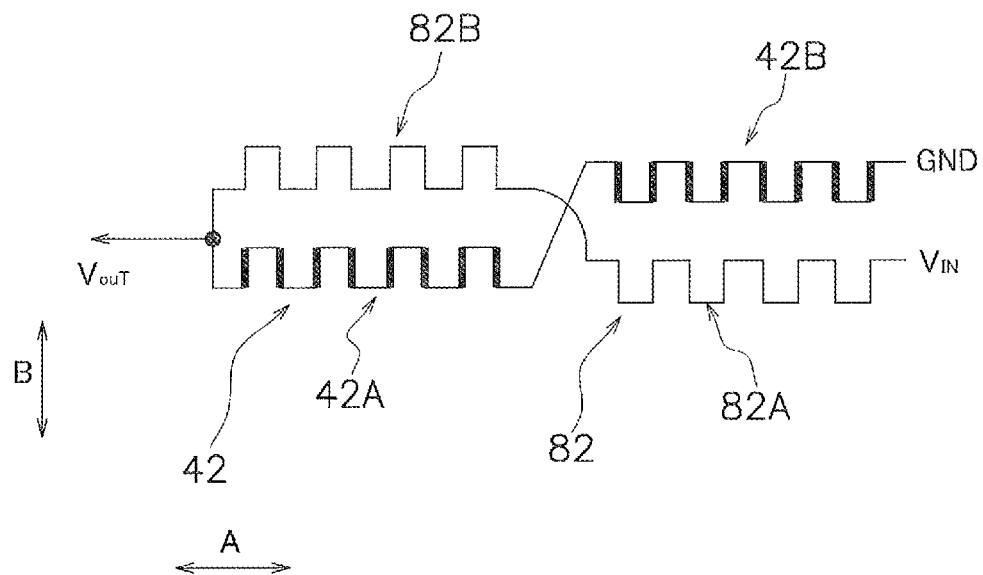
FIG. 33 is a schematic plan view of a resistance line pattern of the pressure sensor (a seventh modified example).

In a seventh modified example illustrated in FIG. 33, the fourth electrode 82 includes the first resistor 82A and the second resistor 82B, and the third electrode 42 includes the third resistor 42A and the fourth resistor 42B.

The first resistor 82A and the fourth resistor 42B are in proximity in a direction orthogonal to the extension direction, and the third electrode 42 and the fourth electrode 82 are disposed so as to intersect by bridge such that the second resistor 82B and the fourth resistor 42B are in proximity.

According to this modified example as well, the same effects as in the ninth embodiment can be obtained. In other words, in the seventh modified example as well, the electrical resistances of the third electrode and the fourth electrode change due to the posture change, but a total distance from the local heat source to the third electrode and a total distance from the local heat source to the fourth electrode become approximately equal, thus ensuring the corrected resistance change due to temperature change.

Furthermore, pattern shapes of ninth to fifteenth modified examples described later are applicable to this modified example.

Note that in the ninth to fifteenth modified examples, the third electrode and the fourth electrode are in proximity to one another, but may be disposed to be separated from one another while the shapes are the same.

The eighth to eleventh modified examples described below are embodiments in which the third electrode and the fourth electrode are disposed to be the closest. These modified examples may be applied to the detection circuit according to the ninth embodiment or may be applied to other detection circuits. In this modified example, space saving is achieved. In addition, since a temperature gradient is less likely to occur between the third electrode 42 and the fourth electrode 82, temperature compensation can be accurately performed.

Figure 34:
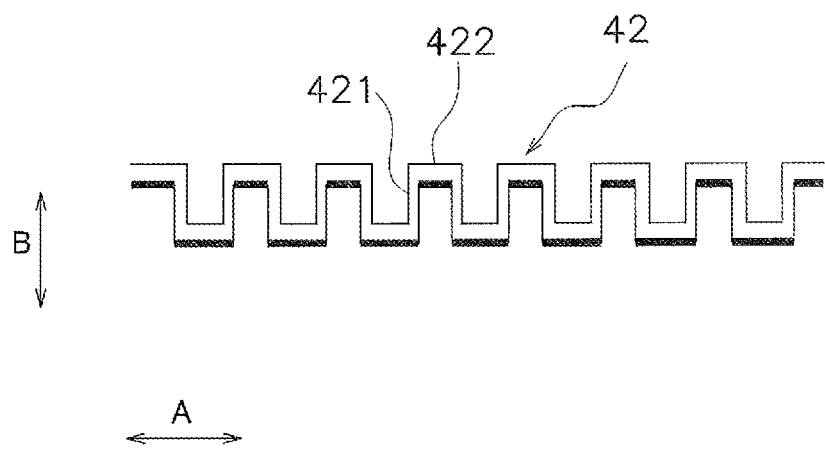
FIG. 34 is a schematic plan view of a resistance line pattern of the pressure sensor (an eighth modified example).

In the eighth modified example illustrated in FIG. 34, the third electrode 42 and the fourth electrode 82 extend in the extension direction. The third electrode 42 is disposed along the shape of the fourth electrode 82. Specifically, the third electrode 42 and the fourth electrode 82 have the zigzag shape that has been already described, and the respective overlapping portions 421 and folded-back portions 422 of the third electrode 42 extend parallel to and are in proximity to the overlapping portions 821 and the folded-back portions 822 of the fourth electrode 82. Note that the folded-back portion 822 of the fourth electrode 82 is wider than the overlapping portion 821.

Figure 35:
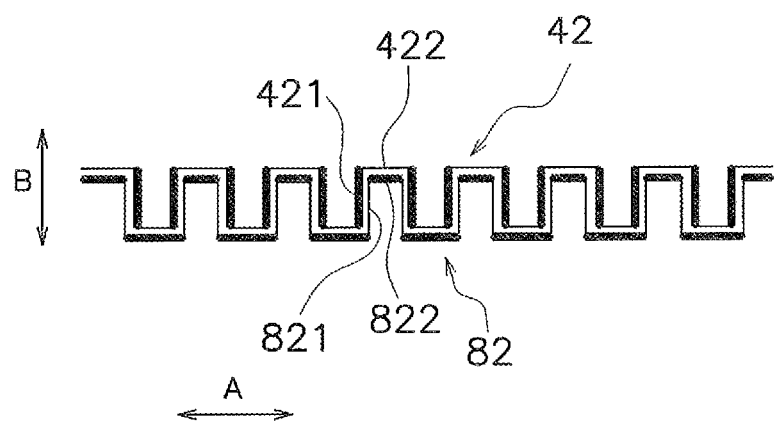
FIG. 35 is a schematic plan view of a resistance line pattern of the pressure sensor (a ninth modified example).

In the ninth modified example illustrated in FIG. 35, unlike the eighth modified example, the overlapping portion 421 of the third electrode 42 is wider than the folded-back portion 422.

Figure 36:
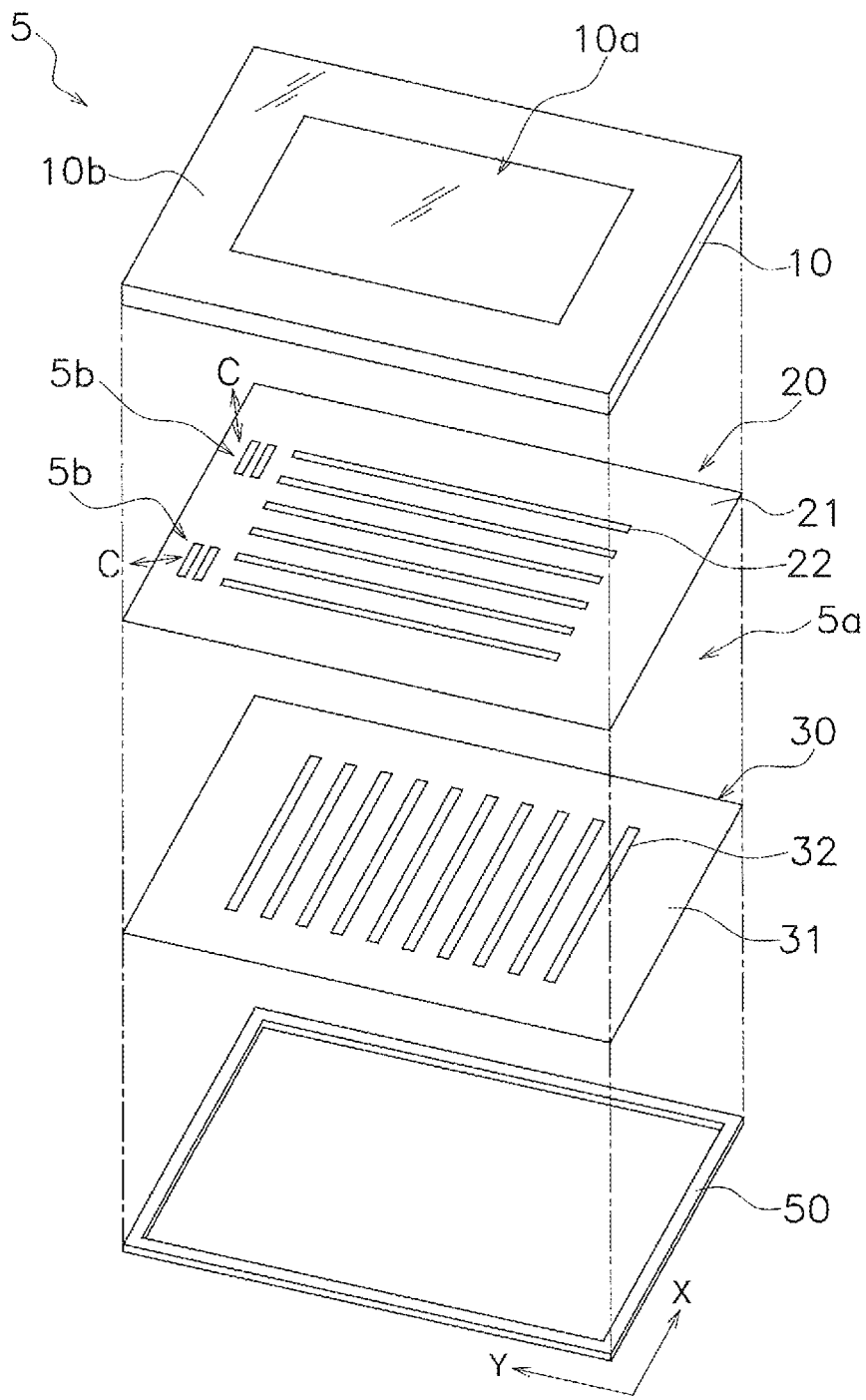
FIG. 36 is an exploded perspective view of the touch panel (a tenth change model example).
Figure 37:
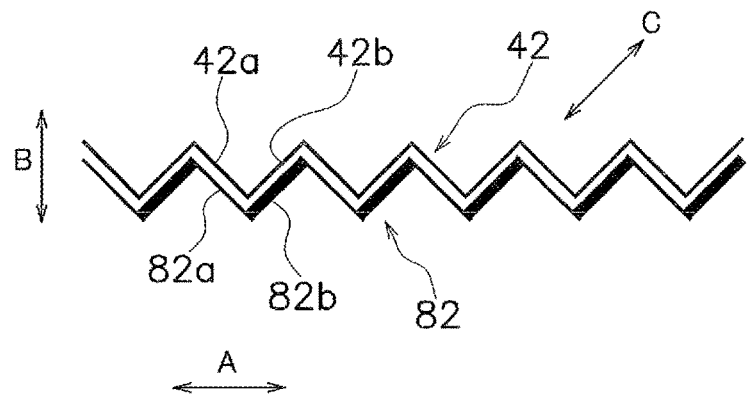
FIG. 37 is a schematic plan view of a resistance line pattern of the pressure sensor (a tenth modified example).

In the tenth modified example illustrated in FIG. 36 and FIG. 37, the pressure sensor 5b includes two sets of the third electrodes 42 and the fourth electrodes 82, and the respective sets are disposed at both ends in the short side direction of the short side at a position corresponding to the outer peripheral area 10b. In each set, the third electrode 42 and the fourth electrode 82 extend in the short side direction. Note that in FIG. 36, the third electrode 42 and the fourth electrode 82 (no reference numeral in FIG. 36) of the pressure sensor 5b are each described as a linear shape in a simplified manner.

The third electrode 42 is disposed along the shape of the fourth electrode 82. Specifically, the third electrode 42 and the fourth electrode 82 have peak (triangular) shapes repeated in alternation. The third electrode 42 has first diagonal portions 42a and second diagonal portions 42b arranged in alternation, and the fourth electrode 82 has third diagonal portions 82a and fourth diagonal portions 82b arranged in alternation. The first diagonal portion 42a and the third diagonal portion 82a are parallel to and in proximity to one another. The second diagonal portion 42a and the fourth diagonal portion 82a are parallel to and in proximity to one another.

Note that the fourth diagonal portion 82b of the fourth electrode 82 is wider than the third diagonal portion 82a.

Note that since the triangular wave shapes are formed as described above, strain stress acting in a direction (an arrow C) oblique to the extension direction of the third electrode 42 and the fourth electrode 82 can be measured.

Figure 38:
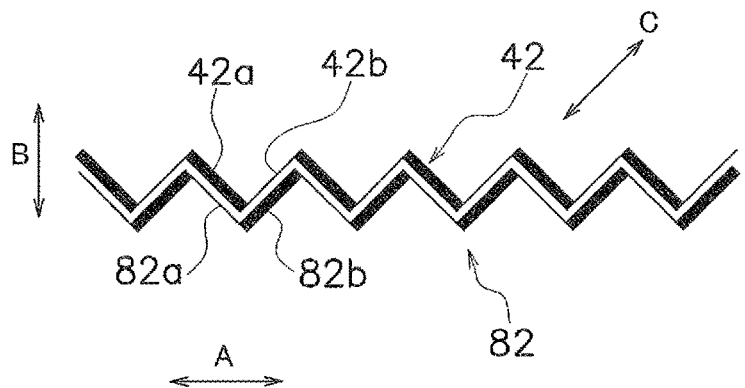
FIG. 38 is a schematic plan view of a resistance line pattern of the pressure sensor (an eleventh modified example).

In the eleventh modified example illustrated in FIG. 38, unlike the tenth modified example, the first diagonal portion 42a (the portion in proximity to the third diagonal portion 82a of the fourth electrode 82) of the third electrode 42 is wider than the second diagonal portion 42b.

Further, the pattern shapes of FIG. 34, FIG. 35, and FIG. 37, and FIG. 38 are applicable to the first to eighth embodiments in which the third electrode 42 and the fourth electrode 82 are provided in a viewing area 10a.

Twelfth to fifteenth modified examples described below are embodiments in which the third electrode and the fourth electrode are disposed in proximity to some extent. These modified examples may be applied to the detection circuit according to the ninth embodiment or may be applied to other detection circuits.

Figure 39:
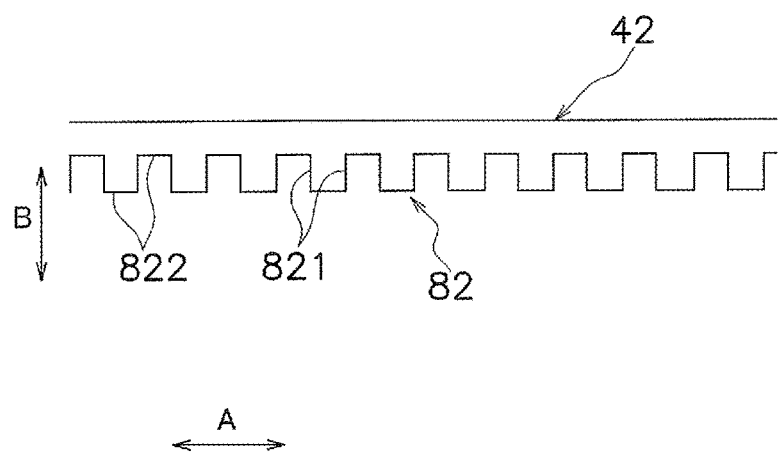
FIG. 39 is a schematic plan view of a resistance line pattern of the pressure sensor (a twelfth modified example).

In the twelfth modified example illustrated in FIG. 39, the third electrode 42 has a linear pattern. The pattern of the fourth electrode 82 is the zigzag shape described above.

According to this configuration, in the fourth electrode 82, in a case where strain stress acting in the extension direction of the electrode is measured, an electrical resistance does not change according to the posture change in the overlapping portion 821, and an electrical resistance changes according to the posture change only in the folded-back portion 822. Thus, even when the third electrode 42 and the fourth electrode 82 are the same material as described above, the resistance change rate of the fourth electrode 82 detected during pressing becomes smaller than the resistance change rate of the third electrode 42 in the linear pattern.

Figure 40:
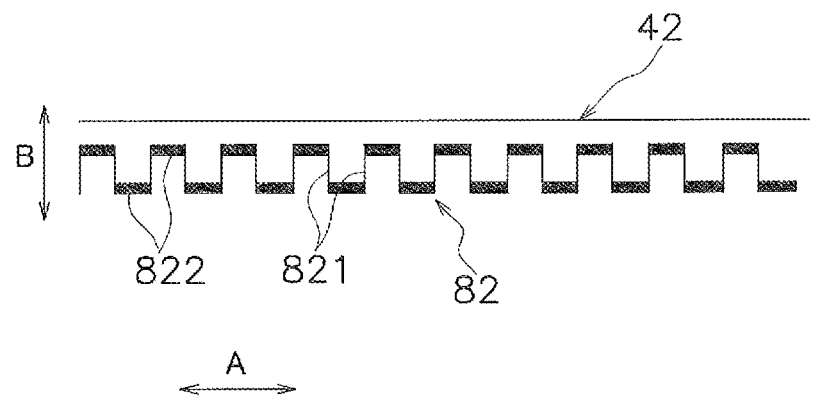
FIG. 40 is a schematic plan view of a resistance line pattern of the pressure sensor (a thirteenth modified example).

In the thirteenth modified example illustrated in FIG. 40, the width of the resistance line constituting the fourth electrode 82 is narrowed at the overlapping portion 821 and widened at the folded-back portion 822. Thus, the resistance change rate of the fourth electrode 82 detected during pressing becomes smaller than the case where the overlapping portion 821 and the folded-back portion 822 have the same width.

Figure 41:
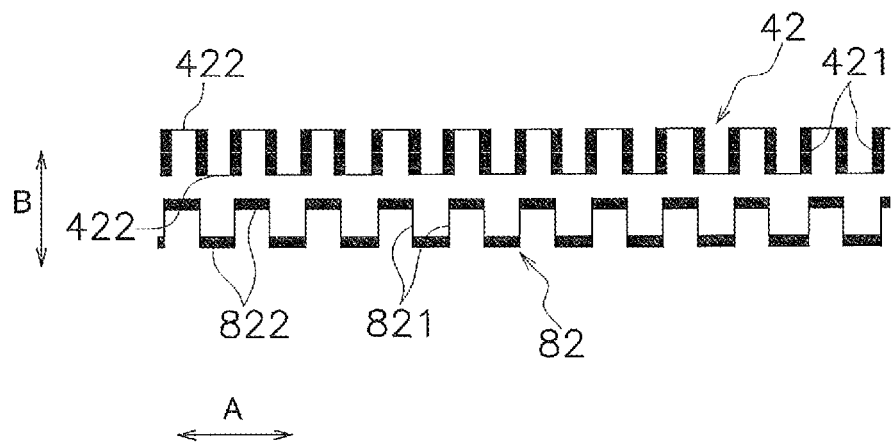
FIG. 41 is a schematic plan view of a resistance line pattern of the pressure sensor (a fourteenth modified example).

In the fourteenth modified example illustrated in FIG. 41, the patterns of the third electrode 42 and the fourth electrode 82 are the zigzag shapes described above. The width of the resistance line constituting the third electrode 42 is formed to widen at the overlapping portion 421 and narrow at the folded-back portion 422. The width of the resistance line constituting the fourth electrode 82 is formed to narrow at the overlapping portion 821 and widen at the folded-back portion 822.

According to this configuration, by configuring the width of the folded-back portion 422 narrower than the overlapping portion 421, even when the same material is used, the resistance change rate of the third electrode 42 detected during pressing is larger than that in the case of the overlapping portion 421 and the folded-back portion 422 having the same width.

Figure 42:
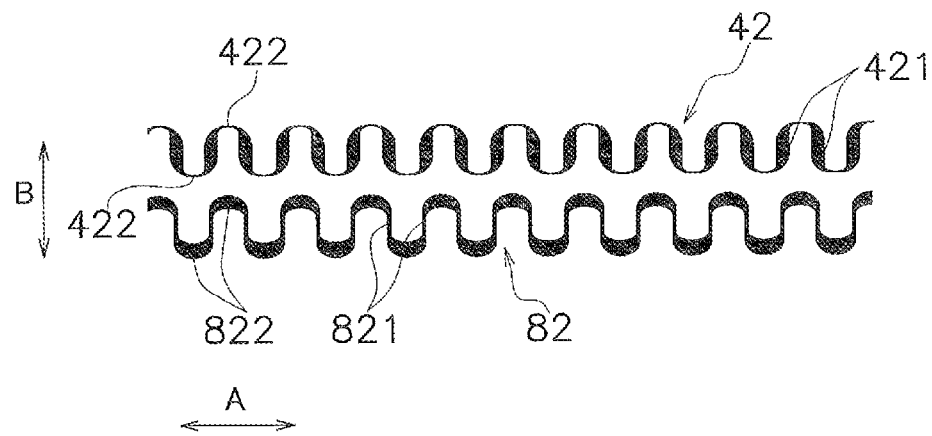
FIG. 42 is a schematic plan view of a resistance line pattern of the pressure sensor (a fifteenth modified example).

In the fifteenth modified example illustrated in FIG. 42, the patterns of the third electrode 42 and the fourth electrode 82 are the zigzag shapes described above. The folded-back portions 422 and 822 of the resistance lines constituting the third electrode 42 and the fourth electrode 82 are folded back in a curved manner. Specifically, the folded-back portion 422 has an outer edge having a semi-elliptical shape and an inner edge having a semi-circular shape. The folded-back portion 822 has an outer edge having a semi-circular shape and an inner edge having a semi-elliptical shape.

According to this configuration, stress concentration when an elongation force is applied to the third electrode 42 and the fourth electrode 82 can be reduced. That is, although stress concentration generates cracks in the folded-back portions 422 and 822, since the folded-back portions 422 and 822 of the resistance lines are folded back in the curved manner, the stress generated in the folded-back portions 422 and 822 is dispersed and weakens, and the cracks can be suppressed.

11. Tenth Embodiment

Although one pressure detection circuit outputs the temperature-compensated detection signal in the ninth embodiment, a plurality of pressure detection circuits may be used to perform temperature compensate on the detection signals.

Such an embodiment will be described as the tenth embodiment. Note that the basic configuration and the operation of the touch sensor are the same as those in the ninth embodiment. Hereinafter, different points will be mainly described.

(1) Basic Configuration of Pressure Detection Circuit

Figure 43:
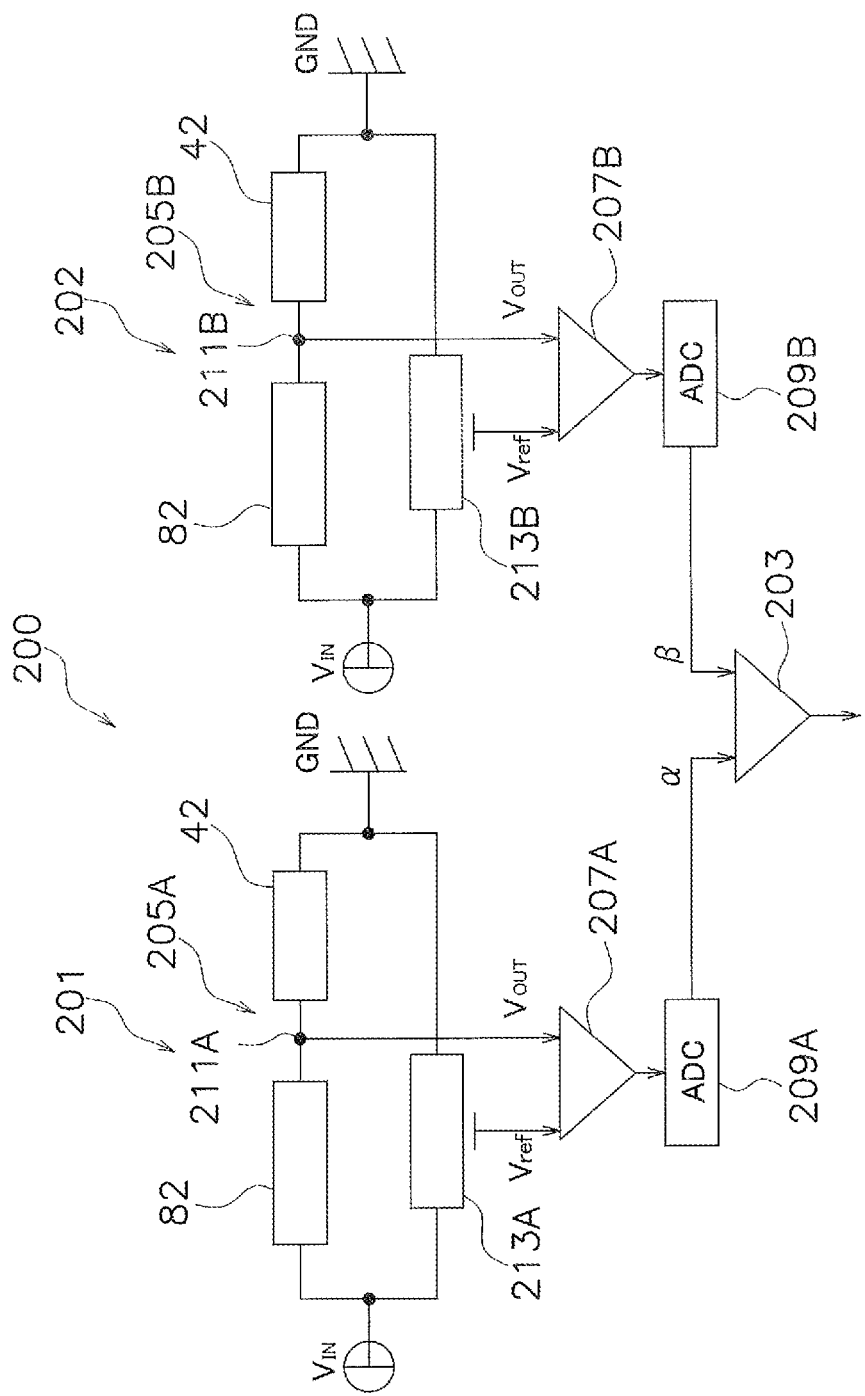
FIG. 43 is a circuit diagram of a pressure sensor according to a tenth embodiment.

As illustrated in FIG. 43, a pressure detection circuit 200 includes a first detection circuit 201, a second detection circuit 202, and an adder 203.

The first detection circuit 201 includes a first Wheatstone bridge circuit 205A, a first instrumentation amplifier 207A, and a first AD converter 209A.

The first Wheatstone bridge circuit 205A includes the third electrode 42 and the fourth electrode 82 as a part. The third electrode 42 and the fourth electrode 82 are connected in series between the input voltage Vin and the ground GND. A first output unit 211A that outputs the output voltage Vout is provided between the third electrode 42 and the fourth electrode 82.

The first Wheatstone bridge circuit 205A includes a first variable resistor 213A.

The output voltage Vout from the first output unit 211A and the reference voltage Vref are output to the first instrumentation amplifier 207A. The first instrumentation amplifier 207A calculates a difference between both voltages and outputs the difference to the first AD converter 209A. The first AD converter 209A converts an analog signal into a digital signal and outputs an output signal $\alpha$ to the adder 203. The second detection circuit 202 includes a second Wheatstone bridge circuit 205B, a second instrumentation amplifier 207B, and a second AD converter 209B.

The second Wheatstone bridge circuit 205B includes the third electrode 42 and the fourth electrode 82 as a part. The third electrode 42 and the fourth electrode 82 are connected in series between the input voltage Vin and the ground GND. A second output unit 211B that outputs the output voltage Vout is provided between the third electrode 42 and the fourth electrode 82.

The second Wheatstone bridge circuit 205B includes a second variable resistor 213B.

The output voltage Vout from the second output unit 211B and the reference voltage Vref are output to the second instrumentation amplifier 207B. The second instrumentation amplifier 207B calculates a difference between both voltages and outputs the difference to the second AD converter 209B. The second AD converter 209B converts an analog signal into a digital signal and outputs an output signal $\beta$ to the adder 203.

The adder 203 adds the output signal $\alpha$ of the first Wheatstone bridge circuit 205A and the output signal $\beta$ of the second Wheatstone bridge circuit 205B to output the final detection signal.

Figure 44:
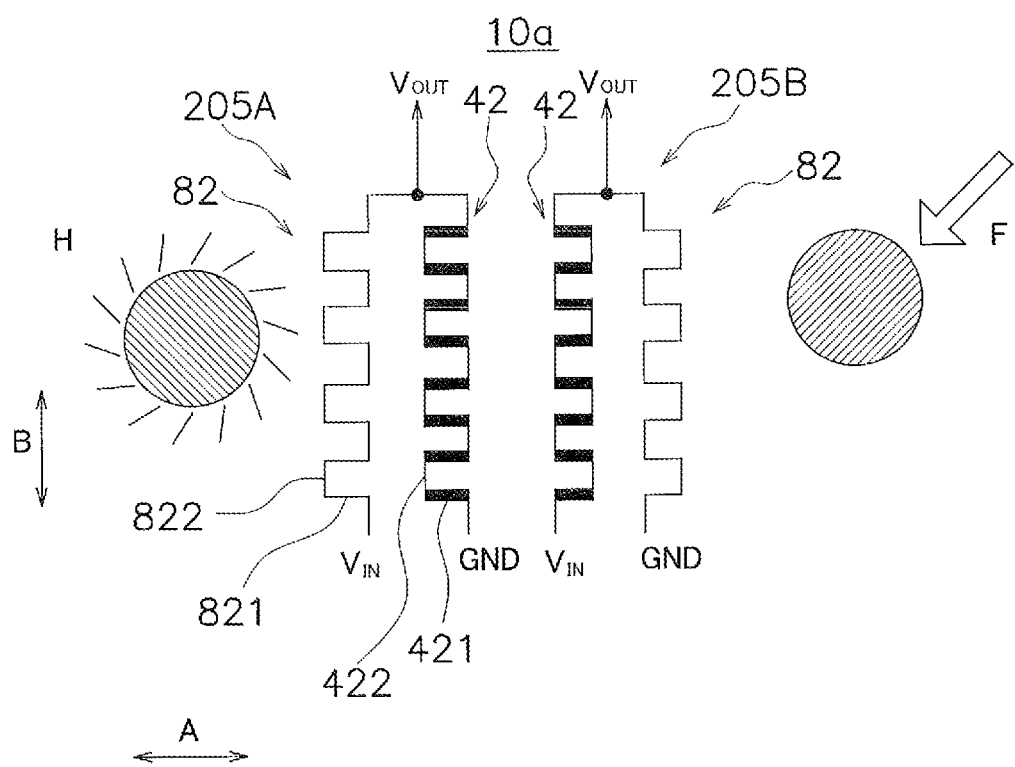
FIG. 44 is a schematic plan view illustrating the pressure sensor.

As illustrated in FIG. 44, in each of the first Wheatstone bridge circuit 205A and the second Wheatstone bridge circuit 205B, the fourth electrode 82 is disposed extending along the third electrode 42.

Furthermore, (a first set of) the third electrode 42 and the fourth electrode 82 of the first Wheatstone bridge circuit 205A and (a second set of) the third electrode 42 and the fourth electrode 82 of the second Wheatstone bridge circuit 205B are disposed in proximity to one another and linearly symmetrical.

As a result, the fourth electrode 82 of the first Wheatstone bridge circuit 205A and the fourth electrode 82 of the second Wheatstone bridge circuit 205B are disposed on both sides in the direction orthogonal to the extension direction of the third electrode 42 and are arranged in the order of, from the left to the right in FIG. 44, the fourth electrode 82 of the first Wheatstone bridge circuit 205A, the third electrode 42 of the first Wheatstone bridge circuit 205A, the third electrode 42 of the second Wheatstone bridge circuit 205B, and the fourth electrode 82 of the second Wheatstone bridge circuit 205B.

(2) Pattern Shapes of Both Electrodes

In the pattern of the fourth electrode 82, the resistance line constituting the fourth electrode 82 has a zigzag shape in plan view. More specifically, the pattern of the resistance line of the fourth electrode 82 has a pattern in which the plurality of overlapping portions 821 are provided by folding back the resistance line constituting the fourth electrode 82 in a zigzag shape in plan view to be parallel to one another and the arrangement direction of the plurality of overlapping portions 821 matches the extension direction of the fourth electrode 82. Furthermore, the pattern of the resistance line of the fourth electrode 82 includes the folded-back portions 822 folded back linearly from the overlapping portions 821.

The pattern of the resistance line of the third electrode 42 is a pattern that includes the plurality of overlapping portions 421 formed in parallel to one another by folding back the resistance line constituting the third electrode 42 in a zigzag shape in plan view, and the arrangement direction of the plurality of overlapping portions 421 matches the extension direction of the third electrode 42. Furthermore, the pattern of the resistance line of the third electrode 42 includes the folded-back portions 422 folded back linearly from the overlapping portions 421.

Note that the pattern of the fourth electrode 82 is different from the pattern of the third electrode 42. Specifically, the overlapping portion 421 of the third electrode 42 is wider than the folded-back portion 422.

According to this configuration, in the third electrode 42, the electrical resistance does not change according to the posture change in the plurality of overlapping portions 421, and the electrical resistance changes according to the posture change only in folded-back portions 422. Thus, even when the third electrode 42 and the fourth electrode 82 are the same material as described above, the resistance change rate of the fourth electrode 82 becomes smaller than the resistance change rate of the third electrode 42 during pressing. Specifically, the resistance change rate due to the posture change of the fourth electrode 82 is 90% or less of the resistance change rate of the third electrode 42 due to the posture change during the posture change at the normal temperature. More preferably, the resistance change rate of the fourth electrode 82 due to the posture change is 50% or less of the resistance change rate of the third electrode 42 due to the posture change during posture change at the normal temperature. More preferably, it is 10% or less.

(3) Detection Principle of Pressure Sensor

When the user touches the operating surface 10*a* of the panel member 10 with, for example, the finger, the panel member 10 elastically deforms, and in accordance with the deformation, the third electrode 42 and the fourth electrode 82 also deform. At this time, the electrical resistances of the third electrode 42 and the fourth electrode 82 change according to the deformation (the posture change), and the electrical resistances also change according to the temperature change at the same time.

However, as described above, the resistance change rate of the fourth electrode 82 due to the temperature change is the same as the resistance change rate of the third electrode 42 due to the temperature change, and the resistance change rate of the fourth electrode 82 due to the posture change is 90% or less of the resistance change rate of the third electrode 42 due to the posture change during the posture change at the normal temperature. Therefore, the detection result including the change in the electrical resistance of the third electrode 42 caused by the temperature change can be corrected (temperature compensation). As a result, the magnitude of the pressing force on the operating surface 10*a* can be appropriately determined.

Figure 45:
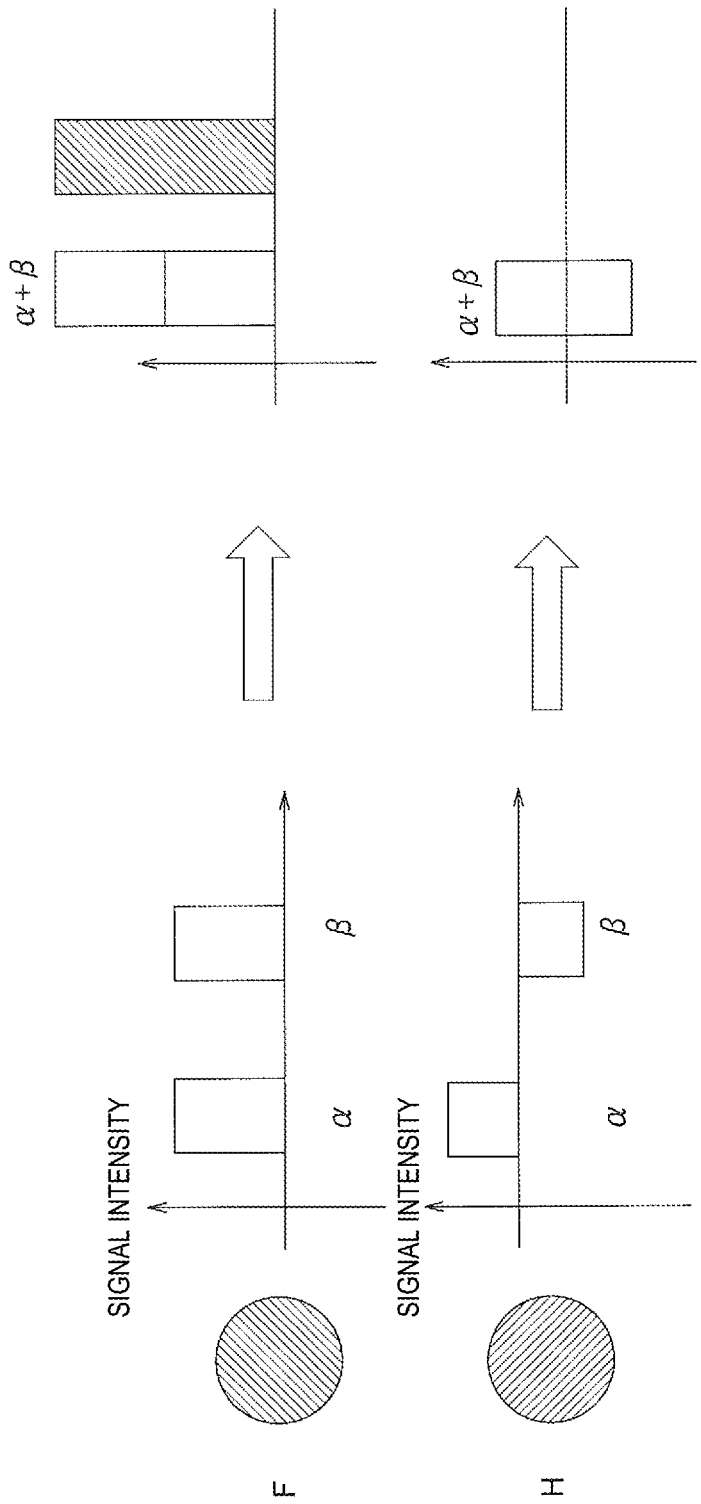
FIG. 45 is a conceptual diagram describing intensities of output signals due to a pressing and a local heat source.

As an example, as illustrated in FIG. 44, an example in which the pressing force F acts on the outside of the fourth electrode 82 of the second Wheatstone bridge circuit 205B, and the local heat source H is generated on the outside of the fourth electrode 82 of the first Wheatstone bridge circuit 205A will be considered. In this case, as illustrated in FIG. 45, an intensity of a signal generated by the pressing force F is around the same between the first detection circuit 201 and the second detection circuit 202, and they are added by the adder 203. On the other hand, the intensities of the signals generated by the local heat source H are approximately the same magnitude in the first detection circuit 201 and the second detection circuit 202 and become signals of opposite phases. Therefore, when they are added, the result becomes zero or nearly zero. The reason for producing opposite-phase signals is as follows. The fourth electrode 82 is closer to the local heat source H than the third electrode 42 in the first Wheatstone bridge circuit 205A, and therefore the resistance value increases and the potential of the output signal α decreases. On the other hand, the third electrode 42 is closer to the local heat source H than the fourth electrode 82 in the second Wheatstone bridge circuit 205B, and therefore the resistance value increases and the potential of the output signal α increases.

Consequently, the pressure detection circuit 200 outputs the temperature-compensated detection signal.

The change in the signal intensity with respect to a time in the case where the pressing force F is actually applied based on the detection principle described above will be described. As illustrated in FIG. 45, the intensity of the output signal α of the first detection circuit 201 and the intensity of the output signal β of the second detection circuit 202 caused by the pressing force F are added to produce the detection signal. On the other hand, since the intensity of the output signal α of the first detection circuit 201 and the intensity of the output signal β of the second detection circuit 202 caused by the local heat source H are the opposite phases, the addition of them turns out to be zero or nearly zero. Consequently, the temperature-compensated detection result is obtained.

Figure 46:
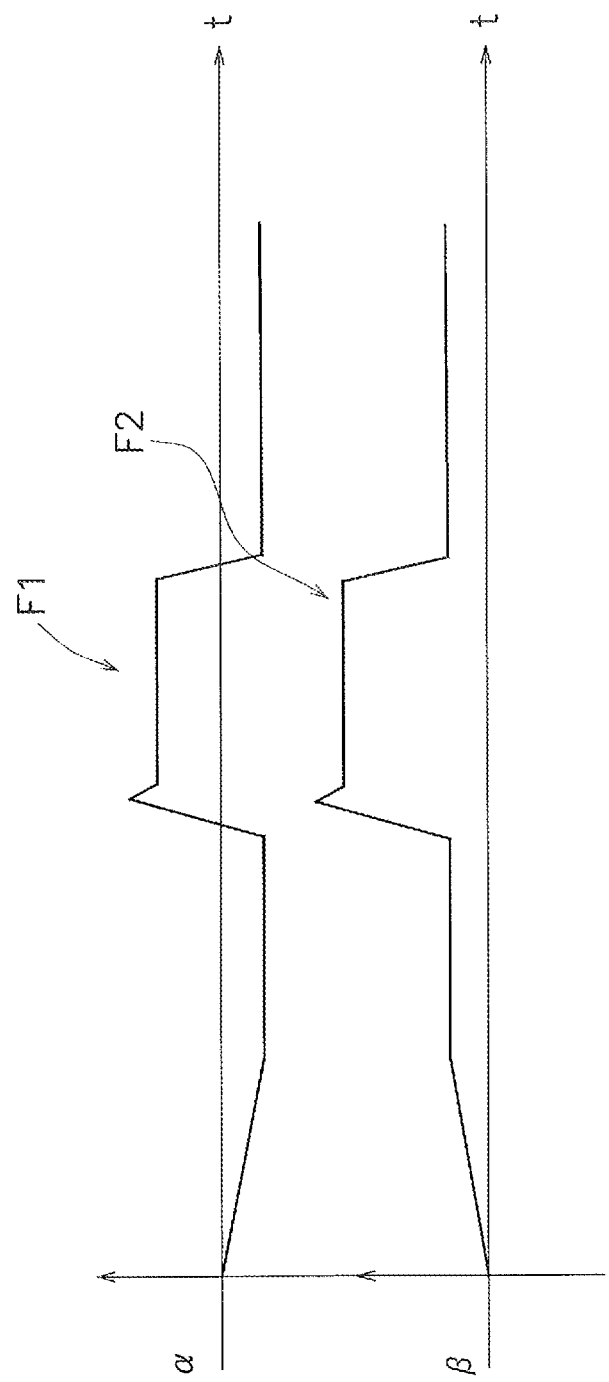
FIG. 46 is a graph illustrating detection signals of a first detection circuit and a second detection circuit.
Figure 47:
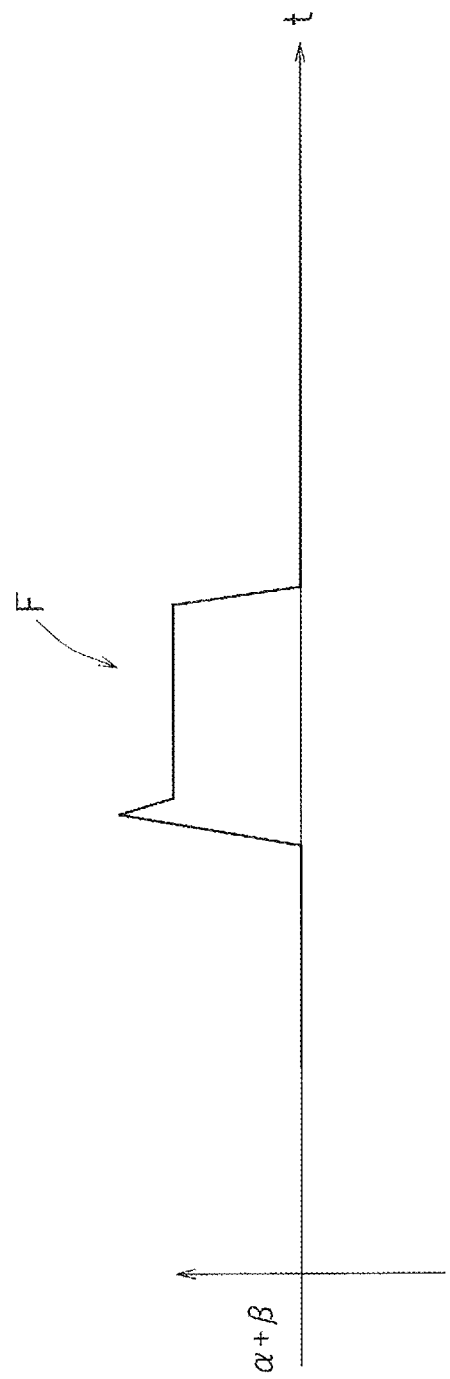
FIG. 47 is a graph illustrating a detection signal output from an adder.

FIG. 46 illustrates states (arrows F1 and F2) in which the output signal α and the output signal β are the opposite phases (resulting in signal outputs in the opposite directions) by the local heat source H, and then change in the same direction by the pressing force F. FIG. 47 illustrates that a temperature-compensated (only by the pressing force F) detection signal (an arrow F) is obtained by adding the output signal α and the output signal β.

(4) Modified Examples of Pattern Shapes of Third Electrode and Fourth Electrode

The pattern shapes of the third electrode and the fourth electrode are not limited to the embodiments described above.

The first pressure detection circuit and the second pressure detection circuit may be disposed, for example, so as to be point symmetrical on the upper surface and the bottom surface of the first substrate 21 or the second substrate 31. In this case, the third electrode of the first set and the fourth electrode of the second set are arranged vertically, and the fourth electrode of the first set and the third electrode of the second set are arranged vertically.

In the second embodiment described above, the third electrodes and the fourth electrodes in each of the detection circuits have the pattern shapes extending only one in the extension direction, but the pattern shapes of the third electrodes and the fourth electrodes are not particularly limited. Hereinafter, in first to fifth modified examples of the tenth embodiment illustrated in FIG. 48 to FIG. 52, modified examples of pattern shapes of the third electrode and the fourth electrode in one detection circuit will be described.

Note that, in the modified examples described below, unlike the ninth embodiment, the third electrode and the fourth electrode are not in configurations in which the third electrode and the fourth electrode are periodically arranged in the extension directions.

Figure 48:
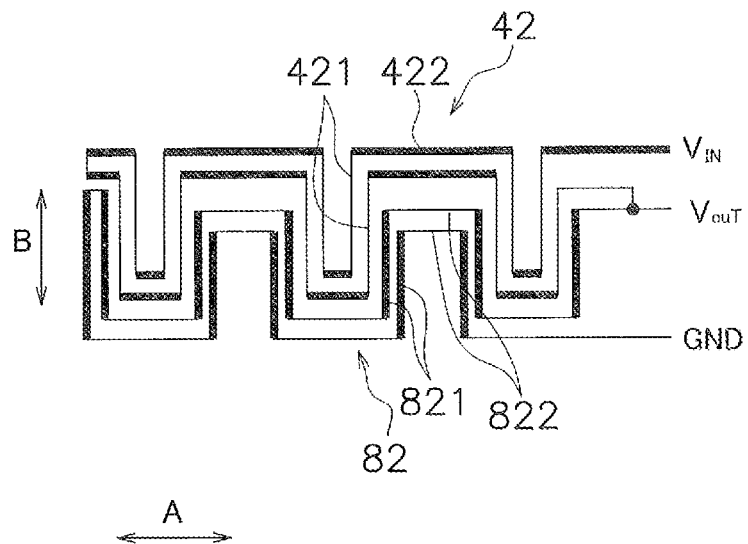
FIG. 48 is a schematic plan view of a resistance line pattern of the pressure sensor (a first modified example of the tenth embodiment).

In the first modified example of the tenth embodiment illustrated in FIG. 48, the respective third electrode 42 and fourth electrode 82 reciprocate, and the reciprocating portions are in proximity to one another. Furthermore, the third electrode 42 and the fourth electrode 82 are in proximity to one another.

Specifically, the third electrode 42 and the fourth electrode 82 have the zigzag shapes as described above, and the respective overlapping portions 421 and folded-back portions 422 of the third electrode 42 are in proximity to and corresponding to the overlapping portions 821 and the folded-back portions 822 of the fourth electrode 82.

More specifically, in the third electrode 42, the width of the folded-back portion 422 is wider than the width of the overlapping portion 421. Also, in the fourth electrode 82, the width of the overlapping portion 821 is wider than the width of the folded-back portion 822.

Figure 49:
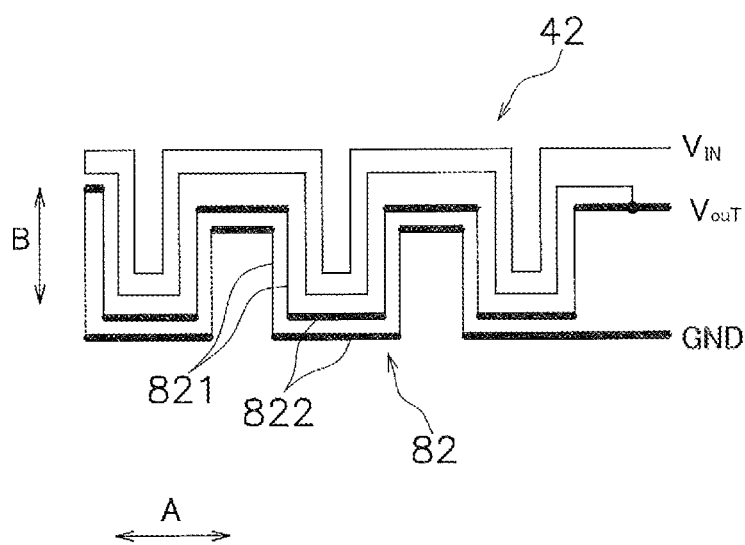
FIG. 49 is a schematic plan view of a resistance line pattern of the pressure sensor (a second modified example of the tenth embodiment).

In the second modified example of the tenth embodiment illustrated in FIG. 49, similarly to the first modified example of the tenth embodiment, the third electrode 42 is disposed along the shape of the fourth electrode 82. In this modified example, unlike the first modified example of the tenth embodiment, the folded-back portion 822 of the fourth electrode 82 is wider than the overlapping portion 821.

Figure 50:
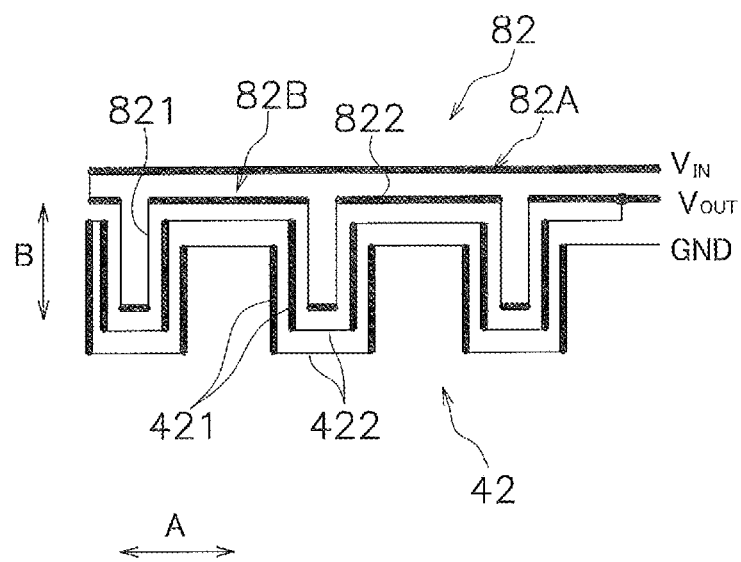
FIG. 50 is a schematic plan view of a resistance line pattern of a pressure sensor (a third modified example of the tenth embodiment).

In the third modified example of the tenth embodiment illustrated in FIG. 50, the second resistor 82B of the fourth electrode 82 is disposed along the shape of the third electrode 42. However, the first resistor 82A linearly extends. In this modified example, the folded-back portion 822 of the second resistor 82B and the first resistor 82A of the fourth electrode 82 are wider than the overlapping portion 821. In addition, the overlapping portion 421 of the third electrode 42 is wider than the folded-back portion 422.

Figure 51:
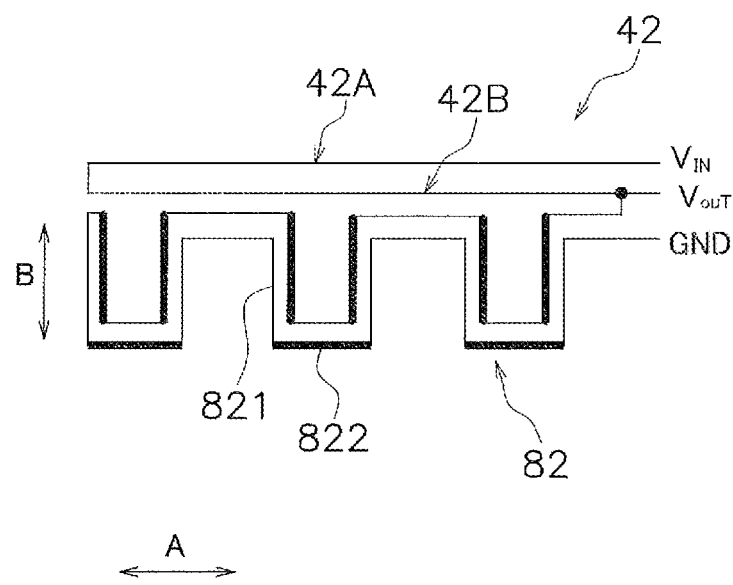
FIG. 51 is a schematic plan view of a resistance line pattern of the pressure sensor (a fourth modified example of the tenth embodiment).

In the fourth modified example of the tenth embodiment illustrated in FIG. 51, the third resistor 42A and the fourth resistor 42B of the third electrode 42 linearly extend.

Figure 52:
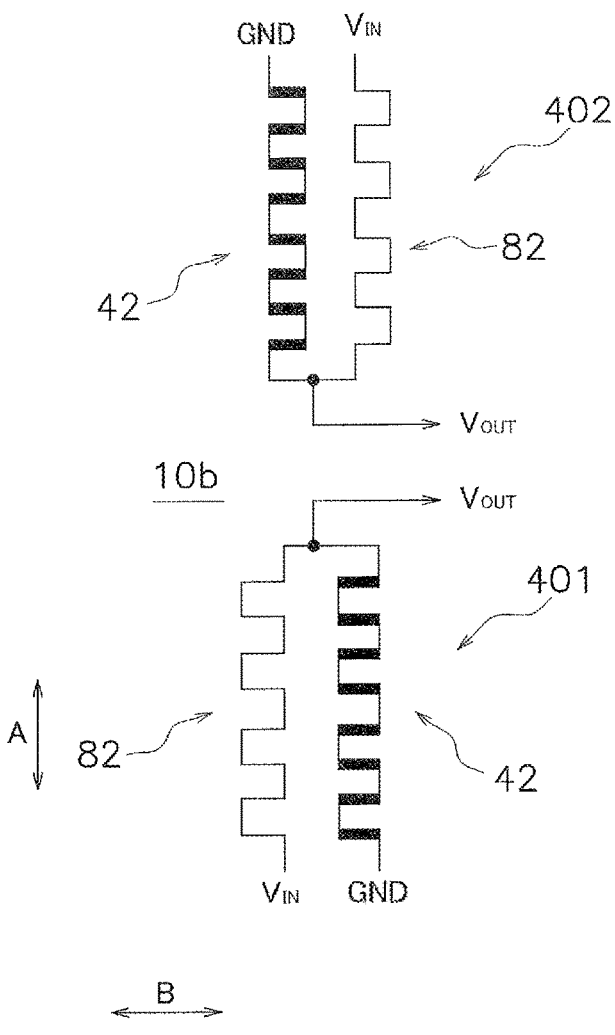
FIG. 52 is a schematic plan view of a resistance line pattern of the pressure sensor (a fifth modified example of the tenth embodiment).

In the fifth modified example of the tenth embodiment illustrated in FIG. 52, a first pressure detection circuit 401 and a second pressure detection circuit 402 are disposed in proximity in plan view. The first pressure detection circuit 401 includes the third electrode 42 and the fourth electrode 82 arranged in the direction orthogonal to the extension direction. The second pressure detection circuit 402 includes the third electrode 42 and the fourth electrode 82 arranged in the direction orthogonal to the extension direction.

The first pressure detection circuit 401 and the second pressure detection circuit 402 are arranged in the extension direction and disposed to be point symmetrical. Specifically, the fourth electrode 82 of the first pressure detection circuit 401 and the third electrode 42 of the second pressure detection circuit 402 are arranged in proximity in the extension direction, and the third electrode 42 of the first pressure detection circuit 401 and the fourth electrode 82 of the second pressure detection circuit 402 are arranged in proximity in the extension direction.

According to this modified example as well, the same effects as in the tenth embodiment can be obtained.

Further, the pattern shapes of the first to fourth modified examples of the tenth embodiment and the pattern shapes of FIG. 34, FIG. 35, and FIG. 37 to FIG. 42 are applicable to this modified example.

12. Eleventh Embodiment

Figure 53:
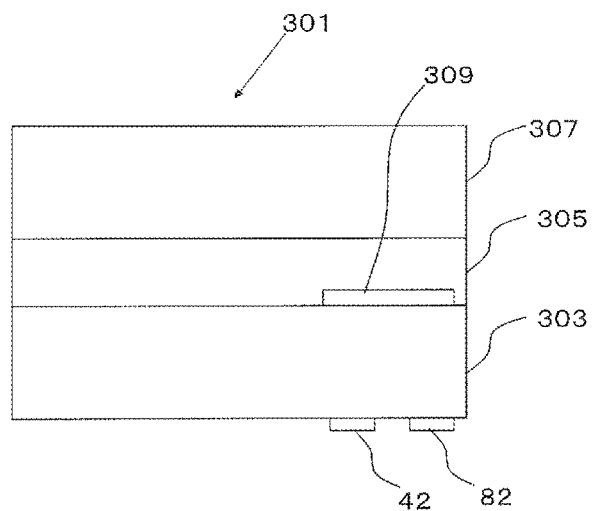
FIG. 53 is a schematic cross-sectional view of a pressure sensor according to an eleventh embodiment.

FIG. 53 illustrates a pressure sensor 301. The pressure sensor 301 includes a resin sheet 303 (corresponding to the first substrate 21 of the ninth embodiment) as an insulating substrate, and a panel member 307 (corresponding to the panel member 10 of the ninth embodiment) provided above the resin sheet 303 via an optically clear adhesive (OCA) 305.

The third electrode 42 and the fourth electrode 82 are provided in an outer peripheral area of the lower surface of the resin sheet 303.

The pressure sensor 301 includes a metal plate 309. The metal plate 309 is provided at the position corresponding to the outer peripheral area of the upper surface of the resin sheet 303 as an insulator and the position corresponding to the third electrode 42 and the fourth electrode 82 in plan view. In other words, the metal plate 309 preferably completely covers the third electrode 42 and the fourth electrode 82 in plan view.

According to this configuration, thermal diffusion is performed on heat from the panel member 307 and the housing side by the metal plate 309, and thus a temperature difference between the third electrode 42 and the fourth electrode 82 decreases. Thus, the temperature compensation is accurate.

Figure 54:
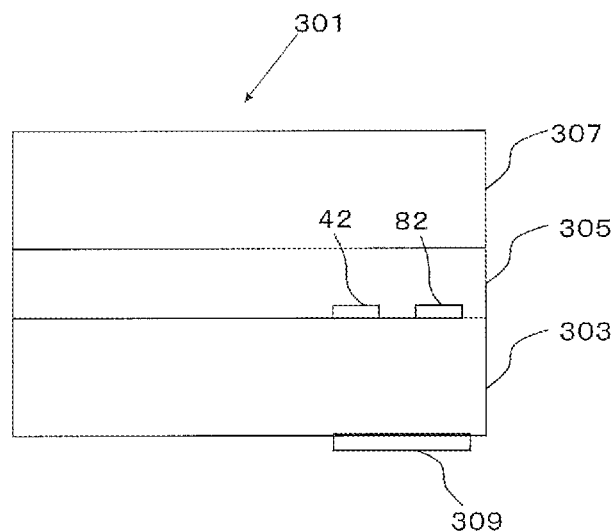
FIG. 54 is a schematic cross-sectional view of a pressure sensor according to a modified example of the eleventh embodiment.

In the modified example illustrated in FIG. 54, the third electrode 42 and the fourth electrode 82 are provided in an outer peripheral area of the upper surface of the resin sheet 303 as the insulator.

The metal plate 309 is provided at the position corresponding to the third electrode 42 and the fourth electrode 82 in plan view in the outer peripheral area of the lower surface of the resin sheet 303. The metal plate 309 preferably at least partially or completely covers the third electrode 42 and the fourth electrode 82 in plan view.

Note that the third electrode, the fourth electrode, and the metal plate may be provided on the second substrate according to the ninth embodiment. Furthermore, the third electrode, the fourth electrode, and the metal plate may be provided on any of the first substrate and the second substrate according to the ninth embodiment.

In addition, to reduce an influence from an electrical noise, the metal plate is preferably fixed to a constant potential electrically. For example, the metal plate is connected to a ground potential.

13. Twelfth Embodiment

A material that has the resistance change rate due to temperature change the same as that of the other electrode material and the resistance change rate due to the posture change different from that of the other electrode material may be used as one of the electrode materials of the third electrode 42 and the fourth electrode 82. In this case, the third electrode 42 and the fourth electrode 82 can be a pattern having the same shape and the same size.

14. Thirteenth Embodiment

Figure 55:
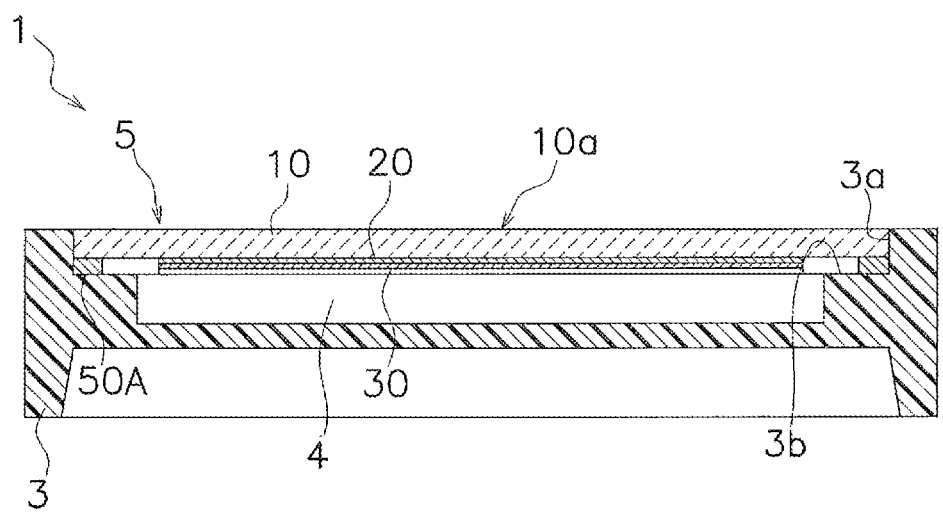
FIG. 55 is a cross-sectional view of an electronic device according to a thirteenth embodiment.

A thirteenth embodiment will be described using FIG. 55. FIG. 55 is a cross-sectional view of an electronic device according to the thirteenth embodiment. The thirteenth embodiment is a modified example of a panel member support structure of the electronic device.

A support member 50A supports the panel member 10 from the back surface side. Unlike the respective embodiments described above, the support member 50A supports the panel member 10 from the back surface side without via the first electrode forming member 20 on which the first electrodes 22 are formed and the second electrode forming member 30.

The support member 50A is formed in a frame shape. The support member 50A is formed in a rectangular frame shape in plan view so as to correspond to the shape of the support portion 3b of the housing 3. The support member 50A is provided to support peripheral edge portions (near the respective sides) of the panel member 10 and the respective electrode forming members 20 and 30 formed in the rectangular shape.

For example, the arrangements, the shapes, and the numbers of the third electrodes and the fourth electrodes according to the ninth to the twelfth embodiments are also applicable to the thirteenth embodiment.

15. Other Embodiments Including Pressure Sensors in Outer Peripheral Areas

The other embodiments that include the pressure sensors of the touch panels according to the present invention in the outer peripheral areas will be described. Note that the configurations disclosed in the following respective embodiments are applicable in combination with the other configurations that include the pressure sensors in the outer peripheral areas disclosed in the other embodiments as long as they are not inconsistent.

A plurality of pressure sensors may be formed.

The plurality of pressure sensors may be disposed so as to surround the view area at, for example, two sides, three sides, or four sides of the outer peripheral area. In the case where the pressure sensor is a plurality, for example, in the case of the multi-touch in which the operating surface 10a is contacted by multiple points, pressures can be detected based on detection signals from the respective pressure sensors, and pressing forces at the respective touch positions can be individually determined. In other words, multi-force correspondence is possible.

The pressure sensor may be formed on the front surface or the back surface of the first substrate 21 or the front surface or the back surface of the second substrate 31. In the case where the pressure sensors are plural, a pressure sensor provided on a different surface among the plurality of surfaces described above may be provided. Additionally, in each pressure sensor, the respective third electrodes and fourth electrodes may be formed on the mutually opposed surfaces of the first substrate 21 and the second substrate 31. In this case, the third electrode and the fourth electrode are connected by means, such as a through-hole.

The third electrode and the fourth electrode may be formed in the same layer as the first electrode or the second electrode. In this case, the third electrode and the fourth electrode can be formed by printing or etching simultaneously with the lead wires (typically copper or a silver paste) using the same material as the lead wires connected to the first electrode and the second electrode.

The shapes of the panel member, the first substrate, and the second substrate are not particularly limited and may be, for example, square shapes.

One or both of the first substrate and the second substrate may be omitted.

The panel member is not limited to a planar member, but may have a curved surface.

In the above-described respective embodiments, the example in which the touch panel according to the present invention is applied to a multifunctional mobile phone as one type of the electronic device 1 has been described. However, the embodiments of the present invention are not limited to this. In addition to the multifunctional mobile phone, examples of the electronic device 1 include a conventional mobile phone, a Personal Digital Assistant (PDA)), a portable music player, an on-vehicle navigation device, a Portable Navigation Device (PND), a digital camera, a digital video camera, a portable gaming device, and a tablet. The touch panel according to the present invention is also preferably applicable to these electronic devices 1. Also, as described first, not limited to the electronic device 1, but the touch panel according to the present embodiment is preferably applicable to an on-vehicle display used as an interior of an automobile, such as a Center Information Display (CID), a Cluster (Instrument Cluster), and Rear Seat Entertainment (RSE).

It should be understood that regarding other configurations, the embodiments disclosed herein are illustrative in all respects, and the scope of the present invention is not limited thereto. Those skilled in the art will readily appreciate that modifications can be appropriately made without departing from the gist of the present invention. Accordingly, other embodiments modified within the scope not departing from the gist of the present invention are obviously included in the scope of the present invention.

INDUSTRIAL APPLICABILITY

The present invention can be used for, for example, a touch panel mounted on a multifunctional mobile phone.

REFERENCE CHARACTER LIST

1: Electronic device
3: Housing
4: Display device
5: Touch panel
5a: Touch Sensor
5b: Pressure sensor
10: Panel member
10a: Operating surface
10b: Outer peripheral area
20: First electrode forming member
21: First substrate
22: First electrode
23: Wiring line
30: Second electrode forming member
31: Second substrate
32: Second electrode
323: Lattice
33: Wiring line
42: Third electrode
421: Overlapping portion
422: Folded-back portion 423: Rectangular region
45: Connection wiring line
50: Support member
60: Controller
62: Capacitance detection unit
63: First resistance detection unit
64: Second resistance detection unit
65: Input determination unit
66: Position determination unit
67: Pressing force determination unit
68: Temperature compensation unit
70: Storage unit
82: Fourth electrode
821: Overlapping portion
822: Folded-back portion
823: Rectangular region
85: Connection wiring line
101: Wheatstone bridge circuit
103: Instrumentation amplifier
105: AD converter
107: Output unit

The invention claimed is:

1. A touch panel comprising:
an elastically deformable panel member having an operating surface;
a plurality of first electrodes disposed in parallel to one another to be arranged at predetermined intervals in an X-axis direction on a side opposite to the operating surface of the panel member, the plurality of first electrodes having a self-capacitance or a mutual capacitance changing according to a proximity/separation of an object to be detected;
a plurality of second electrodes opposed to the plurality of first electrodes and disposed in parallel to one another to be arranged at predetermined intervals in a Y-axis direction intersecting with the X-axis direction, the plurality of second electrodes having a self-capacitance or a mutual capacitance changing according to the proximity/separation of the object to be detected;
a plurality of third electrodes disposed in parallel to one another to be arranged in the X-axis direction between the plurality of first electrodes, or disposed in parallel to one another to be arranged in the Y-axis direction between the plurality of second electrodes, the plurality of third electrodes having electrical resistances changing according to a posture change and a temperature change; and
a plurality of fourth electrodes disposed so as to extend along the plurality of respective third electrodes, the plurality of fourth electrodes having electrical resistances changing according to the posture change and the temperature change, wherein
a resistance change rate of each fourth electrode due to the temperature change is the same as a resistance change rate of each third electrode due to the temperature change;
the resistance change rate of each fourth electrode due to the posture change is 90% or less of the resistance change rate of each third electrode due to the posture change during the posture change at a normal temperature;
a pattern of the third electrodes is a linear pattern;
a pattern of the fourth electrodes includes a plurality of overlapping portions formed in parallel to one another by folding back a resistance line constituting the fourth electrodes in a zigzag shape in plan view; and
an arrangement direction of the plurality of overlapping portions matches an extension direction of the fourth electrodes in the pattern.

2. The touch panel according to claim 1, wherein
the resistance line constituting the fourth electrodes has a line width that narrows at the overlapping portion and widens at a folded-back portion that connects the overlapping portions.

3. The touch panel according to claim 1, wherein
among the first electrodes and the second electrodes, a pattern of electrodes formed on a same surface as the third electrodes and the fourth electrodes is a mesh pattern having rectangular lattices formed of thin lines in the X-axis direction and the Y-axis direction;
a rectangular region having one set of the adjacent overlapping portions of the pattern of the fourth electrodes as opposed sides and the lattice in the mesh pattern have a same shape or an approximate shape and a same or an approximate size;
the electrodes having the mesh pattern, the third electrodes, and the fourth electrodes are in proximity; and
the lattices and the rectangular regions are regularly arrayed as a whole.

4. The touch panel according to claim 1, wherein
the fourth electrodes are configured using a same material as the third electrodes having a pattern different from a pattern of the fourth electrodes.

5. A touch panel comprising:
an elastically deformable panel member having an operating surface;
a plurality of first electrodes disposed in parallel to one another to be arranged at predetermined intervals in an X-axis direction on a side opposite to the operating surface of the panel member, the plurality of first electrodes having a self-capacitance or a mutual capacitance changing according to a proximity/separation of an object to be detected;
a plurality of second electrodes opposed to the plurality of first electrodes and disposed in parallel to one another to be arranged at predetermined intervals in a Y-axis direction intersecting with the X-axis direction, the plurality of second electrodes having a self-capacitance or a mutual capacitance changing according to the proximity/separation of the object to be detected;
a plurality of third electrodes disposed in parallel to one another to be arranged in the X-axis direction between the plurality of first electrodes, or disposed in parallel to one another to be arranged in the Y-axis direction between the plurality of second electrodes, the plurality of third electrodes having electrical resistances changing according to a posture change and a temperature change; and
a plurality of fourth electrodes disposed so as to extend along the plurality of respective third electrodes, the plurality of fourth electrodes having electrical resistances changing according to the posture change and the temperature change, wherein
a resistance change rate of each fourth electrode due to the temperature change is the same as a resistance change rate of each third electrode due to the temperature change;
the resistance change rate of each fourth electrode due to the posture change is 90% or less of the resistance change rate of each third electrode due to the posture change during the posture change at a normal temperature;

a pattern of the third electrodes is a pattern that includes a plurality of overlapping portions formed in parallel to one another by folding back a resistance line constituting the third electrodes in a zigzag shape in plan view, and an arrangement direction of the plurality of overlapping portions matches an extension direction of the third electrodes;

a pattern of the fourth electrodes is a pattern that includes a plurality of overlapping portions formed in parallel to one another by folding back a resistance line constituting the fourth electrodes in a zigzag shape in plan view, and an arrangement direction of the plurality of overlapping portions matches an extension direction of the fourth electrodes;

the pattern of the third electrodes and the pattern of the fourth electrodes have a cycle in which foldings are in synchronization;

among the first electrodes and the second electrodes, a pattern of electrodes formed on a same surface as the third electrodes and the fourth electrodes is a mesh pattern having rectangular lattices formed of thin lines in the X-axis direction and the Y-axis direction;

rectangular regions having respective one sets of the adjacent overlapping portions of the patterns of the third electrodes and the fourth electrodes as opposed sides and the lattice in the mesh pattern have a same shape or an approximate shape and a same or an approximate size;

the electrodes having the mesh pattern, the third electrodes, and the fourth electrodes are in proximity; and the lattices and the rectangular regions are regularly arrayed in the X-axis direction and the Y-axis direction as a whole.

6. The touch panel according to claim 5, wherein
a line width of the resistance line constituting the third electrodes is formed to widen at the overlapping portion and narrow at a folded-back portion that connects the overlapping portions; and
a line width of the resistance line constituting the fourth electrodes is formed to narrow at the overlapping portion and widen at a folded-back portion that connects the overlapping portions.

7. The touch panel according to claim 5, wherein
a line width of the resistance line constituting the third electrodes is formed to widen at the overlapping portion and narrow at a folded-back portion that connects the overlapping portions; and
a line width of the resistance line constituting the fourth electrodes is formed to be a same width.

8. The touch panel according to claim 5, wherein
a line width of the resistance line constituting the third electrodes is formed to be a same width; and
a line width of the resistance line constituting the fourth electrodes is formed to narrow at the overlapping portion and widen at a folded-back portion that connects the overlapping portions.

9. The touch panel according to claim 5, wherein
the folded-back portions of the resistance lines folded back in the zigzag shape in plan view constituting the respective third electrodes and fourth electrodes are folded back in a curved manner.

10. The touch panel according to claim 5, wherein
the folded-back portions of the resistance lines folded back in the zigzag shape in plan view constituting the respective third electrodes and fourth electrodes are folded back linearly.

11. A touch panel comprising:
a panel member that includes a viewing area and an outer peripheral area on an outside of the viewing area;
a plurality of first electrodes disposed in parallel to one another to be arranged at predetermined intervals in a first direction at a position corresponding to the viewing area, the plurality of first electrodes having a self-capacitance or a mutual capacitance changing according to a proximity or separation of an object to be detected;
a plurality of second electrodes opposed to the plurality of first electrodes and disposed in parallel to one another to be arranged at predetermined intervals in a second direction intersecting with the first direction at a position corresponding the viewing area, the plurality of second electrodes having a self-capacitance or a mutual capacitance changing according to the proximity/separation of the object to be detected;
a third electrode extending at a position corresponding to the outer peripheral area, the third electrode having an electrical resistance changing according to a posture change and a temperature change; and
a fourth electrode extending along the third electrode at a position corresponding to the outer peripheral area, the fourth electrode having an electrical resistance changing according to the posture change and the temperature change, wherein
a resistance change rate of the fourth electrode due to the temperature change is the same as a resistance change rate of the third electrode due to the temperature change; and
the resistance change rate of the fourth electrode due to the posture change is 90% or less of the resistance change rate of the third electrode due to the posture change during the posture change at a normal temperature.

12. The touch panel according to claim 11, wherein
the resistance line of the third electrode includes first portions extending in an extension direction and second portions extending in a direction orthogonal to the extension direction in alternation;
the resistance line of the fourth electrode includes third portions extending in an extension direction and fourth portions extending in a direction orthogonal to the extension direction in alternation; and
the third portion or the fourth portion is wider than at least one of the first portion and the second portion.

13. The touch panel according to claim 12, wherein
the third electrode and the fourth electrode constitute a part of a Wheatstone bridge;
the third electrode and the fourth electrode are connected in series between an input voltage and a ground;
an output unit that outputs an output voltage is provided between the third electrode and the fourth electrode;
a part of the fourth electrode, at least a part of the third electrode, and another part of the fourth electrode are arranged in the order in a direction orthogonal to an extension direction, or a part of the third electrode, at least a part of the fourth electrode, and another part of the third electrode are arranged in the order in the direction orthogonal to the extension direction;
the third electrode is one of two third electrodes, the fourth electrode is one of two fourth electrodes, each one of the two third electrodes being provide in a set with a corresponding one of the fourth electrodes, such that two sets of the third electrodes and the fourth electrodes are provided; and the two sets have pattern shapes of a line symmetry or a point symmetry in plan view.

14. The touch panel according to claim 12, wherein
the third electrode and the fourth electrode constitute a part of a Wheatstone bridge;
the third electrode and the fourth electrode are connected in series between an input voltage and a ground;
an output unit that outputs an output voltage is provided between the third electrode and the fourth electrode;
the fourth electrode includes a first resistor and a second resistor, and the second resistor is connected in series with the first resistor, folded back from the first resistor, and extends parallel to the first resistor;
the third electrode includes a third resistor and a fourth resistor, and the fourth resistor is connected in series with the third resistor, folded back from the third resistor, and extends parallel to the third resistor;
the first resistor and second resistor are each disposed on both sides in the direction orthogonal to the extension direction of the third resistor and the fourth resistor;
the third electrode is one of two third electrodes, the fourth electrode is one of two fourth electrodes, each one of the two third electrodes being provide in a set with a corresponding one of the fourth electrodes, such that two sets of the third electrodes and the fourth electrodes are provided; and
the two sets are disposed at point symmetric positions on both surfaces of an insulating substrate.

15. The touch panel according to claim 12, wherein
the third electrode and the fourth electrode constitute a part of a Wheatstone bridge;
the third electrode and the fourth electrode are connected in series between an input voltage and a ground;
an output unit that outputs an output voltage is provided between the third electrode and the fourth electrode;
the fourth electrode includes a first resistor and a second resistor, and the second resistor is connected in series with the first resistor, folded back from the first resistor, and extends parallel to the first resistor;
the third electrode includes a third resistor and a fourth resistor, and the fourth resistor is connected in series with the third resistor, folded back from the third resistor, and extends parallel to the third resistor;
the first resistor and second resistor are each disposed on both sides in the direction orthogonal to the extension direction of the third resistor and the fourth resistor;
the third electrode is one of two third electrodes, the fourth electrode is one of two fourth electrodes, each one of the two third electrodes being provide in a set with a corresponding one of the fourth electrodes, such that two sets of the third electrodes and the fourth electrodes are provided; and
the two sets have pattern shapes of a line symmetry or a point symmetry in plan view.

16. The touch panel according to claim 11, wherein
the resistance line of the third electrode includes first portions and second portions that extend diagonally in alternation and form triangular wave shapes;
the resistance line of the fourth electrode includes third portions and fourth portions that extend diagonally in alternation and form triangular wave shapes; and
the third portions or the fourth portions are wider than at least one of the first portions and the second portions.

17. The touch panel according to claim 16, wherein
the third electrode and the fourth electrode constitute a part of a Wheatstone bridge;
the third electrode and the fourth electrode are connected in series between an input voltage and a ground;
an output unit that outputs an output voltage is provided between the third electrode and the fourth electrode;
a part of the fourth electrode, at least a part of the third electrode, and another part of the fourth electrode are arranged in the order in a direction orthogonal to an extension direction, or a part of the third electrode, at least a part of the fourth electrode, and another part of the third electrode are arranged in the order in the direction orthogonal to the extension direction;
the third electrode is one of two third electrodes, the fourth electrode is one of two fourth electrodes, each one of the two third electrodes being provide in a set with a corresponding one of the fourth electrodes, such that two sets of the third electrodes and the fourth electrodes are provided; and
the two sets have pattern shapes of a line symmetry or a point symmetry in plan view.

18. The touch panel according to claim 16, wherein
the third electrode and the fourth electrode constitute a part of a Wheatstone bridge;
the third electrode and the fourth electrode are connected in series between an input voltage and a ground;
an output unit that outputs an output voltage is provided between the third electrode and the fourth electrode;
the fourth electrode includes a first resistor and a second resistor, and the second resistor is connected in series with the first resistor, folded back from the first resistor, and extends parallel to the first resistor;
the third electrode includes a third resistor and a fourth resistor, and the fourth resistor is connected in series with the third resistor, folded back from the third resistor, and extends parallel to the third resistor;
the first resistor and second resistor are each disposed on both sides in the direction orthogonal to the extension direction of the third resistor and the fourth resistor;
the third electrode is one of two third electrodes, the fourth electrode is one of two fourth electrodes, each one of the two third electrodes being provide in a set with a corresponding one of the fourth electrodes, such that two sets of the third electrodes and the fourth electrodes are provided; and
the two sets have pattern shapes of a line symmetry or a point symmetry in plan view.

19. The touch panel according to claim 16, wherein
the third electrode and the fourth electrode constitute a part of a Wheatstone bridge;
the third electrode and the fourth electrode are connected in series between an input voltage and a ground;
an output unit that outputs an output voltage is provided between the third electrode and the fourth electrode;
the fourth electrode includes a first resistor and a second resistor, and the second resistor is connected in series with the first resistor, folded back from the first resistor, and extends parallel to the first resistor;
the third electrode includes a third resistor and a fourth resistor, and the fourth resistor is connected in series with the third resistor, folded back from the third resistor, and extends parallel to the third resistor;
the first resistor and second resistor are each disposed on both sides in the direction orthogonal to the extension direction of the third resistor and the fourth resistor;
the third electrode is one of two third electrodes, the fourth electrode is one of two fourth electrodes, each one of the two third electrodes being provide in a set with a corresponding one of the fourth electrodes, such that two sets of the third electrodes and the fourth electrodes are provided; and the two sets are disposed at point symmetric positions on both surfaces of an insulating substrate.

* * * * *